(12) United States Patent
Brannon et al.

(10) Patent No.: US 7,971,643 B2
(45) Date of Patent: Jul. 5, 2011

(54) METHODS AND COMPOSITIONS OF A STORABLE RELATIVELY LIGHTWEIGHT PROPPANT SLURRY FOR HYDRAULIC FRACTURING AND GRAVEL PACKING APPLICATIONS

(75) Inventors: Harold Dean Brannon, Magnolia, TX (US); William Dale Wood, Spring, TX (US); Allan Ray Rickards, Tomball, TX (US); Christopher John Stephenson, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/951,229

(22) Filed: Dec. 5, 2007

(65) Prior Publication Data
US 2008/0087429 A1     Apr. 17, 2008

Related U.S. Application Data

(60) Division of application No. 10/899,823, filed on Jul. 27, 2004, now abandoned, which is a continuation-in-part of application No. 10/113,844, filed on Apr. 1, 2002, now Pat. No. 6,772,838, and a continuation-in-part of application No. 10/653,521, filed on Sep. 2, 2003, now Pat. No. 7,426,961, said application No. 10/113,844 is a continuation-in-part of application No. 09/579,147, filed on May 25, 2000, now Pat. No. 6,364,018, and a continuation-in-part of application No. 09/579,146, filed on May 25, 2000, now Pat. No. 6,749,025, said application No. 09/579,147 is a continuation-in-part of application No. 09/519,238, filed on Mar. 6, 2000, now Pat. No. 6,330,916, which is a continuation-in-part of application No. 09/085,416, filed on May 27, 2008, now Pat. No. 6,059,034, which is a continuation-in-part of application No. 08/756,414, filed on Nov. 27, 1996, now abandoned, said application No. 09/579,146 is a continuation-in-part of application No. 09/519,238, filed on Mar. 6, 2000, now Pat. No. 6,330,916.

(60) Provisional application No. 60/569,067, filed on May 7, 2004, provisional application No. 60/428,836, filed on Nov. 25, 2002, provisional application No. 60/407,734, filed on Sep. 3, 2002.

(51) Int. Cl.
*E21B 43/267* (2006.01)
(52) U.S. Cl. .................. 166/280.1; 166/308.1
(58) Field of Classification Search .................. None
See application file for complete search history.

(56) References Cited

U.S. PATENT DOCUMENTS

| | | | | |
|---|---|---|---|---|
| 3,399,727 A | * | 9/1968 | Graham et al. | 166/280.1 |
| 3,489,394 A | * | 1/1970 | Labyer et al. | 166/305.1 |

(Continued)

*Primary Examiner* — Zakiya W Bates
*Assistant Examiner* — Angela M Ditrani
(74) *Attorney, Agent, or Firm* — John Wilson Jones; Jones & Smith, LLP

(57) ABSTRACT

Methods and compositions useful for subterranean formation treatments, such as hydraulic fracturing treatments and sand control that utilize relatively lightweight and/or substantially neutrally buoyant particulates. Particles that may be employed include particulates of naturally occurring materials that may be optionally strengthened or hardened by exposure to a modifying agent; porous materials including selectively configured porous material particles manufactured and/or treated with selected glazing materials, coating materials and/or penetrating materials; and well treating aggregates composed of an organic lightweight material and a weight modifying agent. The relatively lightweight particulate may be suspended as a substantially neutral buoyant particulate and stored with a carrier fluid as a pumpable slurry.

25 Claims, 23 Drawing Sheets

U.S. PATENT DOCUMENTS

| | | | |
|---|---|---|---|
| 4,068,718 A * | 1/1978 | Cooke et al. | 166/280.2 |
| 4,493,875 A * | 1/1985 | Beck et al. | 428/403 |
| 4,733,729 A * | 3/1988 | Copeland | 166/276 |
| 4,850,430 A * | 7/1989 | Copeland et al. | 166/276 |
| 4,938,286 A * | 7/1990 | Jennings, Jr. | 166/280.1 |
| 5,131,472 A * | 7/1992 | Dees et al. | 166/308.1 |
| 5,582,250 A * | 12/1996 | Constien | 166/280.1 |
| 5,799,734 A * | 9/1998 | Norman et al. | 166/278 |
| 6,173,778 B1 * | 1/2001 | Rae et al. | 166/293 |
| 6,364,018 B1 * | 4/2002 | Brannon et al. | 166/280.2 |
| 2003/0008780 A1 * | 1/2003 | Chowdhary et al. | 507/209 |

* cited by examiner

METHODS AND COMPOSITIONS OF A STORABLE RELATIVELY LIGHTWEIGHT PROPPANT SLURRY FOR HYDRAULIC FRACTURING AND GRAVEL PACKING APPLICATIONS

The present application is a divisional application of U.S. patent application Ser. No. 10/899,823, filed on Jul. 27, 2004 now abandoned, which is a continuation-in-part application of U.S. patent application Ser. No. 10/113,844, filed Apr. 1, 2002, which issued as U.S. Pat. No. 6,772,838. In addition, U.S. patent application Ser. No. 10/899,823 is a continuation-in-part application of U.S. patent application Ser. No. 10/653,521, filed on Sep. 2, 2003 now U.S. Pat. No. 7,426,961. Further, the present application claims the benefit of U.S. patent application Ser. No. 60/569,067, filed on May 7, 2004. U.S. patent application Ser. No. 10/653,521 claims benefit to U.S. Patent Application Ser. Nos. 60/428,836, filed on Nov. 25, 2002 and 60/407,734, filed on Sep. 3, 2002. U.S. patent application Ser. No. 10/113,844 is a continuation-in-part of U.S. patent application Ser. No. 09/579,147, filed May 25, 2000, which issued as U.S. Pat. No. 6,364,018, and U.S. patent application Ser. No. 09/579,146, filed May 25, 2000 now U.S. Pat. No. 6,749,025, both of which being a continuation-in-part of U.S. patent application Ser. No. 09/519,238, filed Mar. 6, 2000, which issued as U.S. Pat. No. 6,330,916; which is a continuation-in-part of U.S. patent application Ser. No. 09/085,416, filed May 27, 1998, which issued as U.S. Pat. No. 6,059,034; which is a continuation-in-part of U.S. patent application Ser. No. 08/756,414, filed Nov. 27, 1996, now abandoned, and which also claims priority to Danish patent application S/N 1333/97 filed Nov. 21, 1997; the entire disclosures of each of the foregoing applications being incorporated herein by reference.

FIELD OF THE INVENTION

This invention relates generally to methods and compositions useful for subterranean formation treatments, such as hydraulic fracturing treatments and sand control. In particular, this invention relates to use of relatively lightweight and/or substantially neutrally buoyant particles as proppant material in hydraulic fracturing treatments and as particulate material in sand control methods such as gravel packing, frac pack treatments, etc. In addition, this invention relates to a storable pumpable proppant suspension containing the relatively lightweight proppant particles.

BACKGROUND OF THE INVENTION

Hydraulic fracturing is a common stimulation technique used to enhance production of fluids from subterranean formations. In a typical hydraulic fracturing treatment, fracturing treatment fluid containing a solid proppant material is injected into the wellbore at high pressures. Once natural reservoir pressures are exceeded, the fluid induces fractures in the formation and proppant is deposited in the fracture, where it remains after the treatment is completed. The proppant material serves to hold the fracture open, thereby enhancing the ability of fluids to migrate from the formation to the wellbore through the fracture. Because fractured well productivity depends on the ability of a fracture to conduct fluids from a formation to a wellbore, fracture conductivity is an important parameter in determining the degree of success of a hydraulic fracturing treatment.

The solid proppant materials are typically mixed with a gelled carrier fluid (e.g., aqueous-based fluid such as gelled brine) and injected into the well in order to create the high conductivity channel. Gelling agents for proppant carrier fluids may provide a source of proppant pack and/or formation damage, and settling of proppant may interfere with proper placement downhole. Formation damage may also be caused by gelled carrier fluids used to place particulates downhole for purposes such as for sand control, e.g., gravel packs, frac packs, etc.

Formulation of gelled carrier fluids usually requires equipment and mixing steps designed for this purpose. At the time of proppant addition, the carrier fluid exhibits poor solid suspending properties and vigorous agitation is required to prevent gravity segregation of the solids. A typical equipment set-up for hydraulic fracturing is set forth in FIG. 1, wherein the carrier fluid is delivered either from one or more pre-gelled tanks or customized hydration units, 10A, 10B and 10C. The carrier fluid is mixed in mixing unit 40 with buffers, breakers, surfactants and other additives which may be required during treatment. The proppant is delivered from one or more storage bins or silos, 20A and 20B, by gravity and added to the fluid by way of conveyors or augers, 30. The operation of combining the proppant with the fluid involves the use of slurry blender 50, a relatively sophisticated and costly piece of equipment. The slurry blender homogenizes the mix of proppant and carrier fluid and allows the addition of viscosifying enhancing agents, such as crosslinking agents, thus improving proppant transport. Further, it feeds at least one high pressure pump, shown as a series of pumps 60A, 60B and 60C, which are used to inject the proppant slurry into the wellhead 70. The need to "ramp" or step-up the concentration of proppant, as the operation proceeds, requires considerable operator expertise and/or requires the use of an array of process control equipment to enable accurate proportioning of all the components at various rates. Any operational failure, such as tub overflow, improper amount of viscosity enhancer, breaker, etc., jeopardizes the operation or its results.

Attempts have been made with conventional proppants to obtain pumpable formulations for use on the fly. Unfortunately, such formulations require a high degree of fluid gellation to maintain suspension of the heavy particles. Even with heavy gellation, such suspensions are further subject to particle settling within a matter of hours, particularly in the presence of vibration. This necessitates well defined mixing capabilities in order to homogeneously re-suspend the proppants in high viscosity suspension gels on-site. Significant costs are further incurred for the chemicals, equipment and processing time in order to gel the carrier fluid. Pumpable suspensions which do not exhibit particle settling are therefore desired.

SUMMARY OF THE INVENTION

In the disclosed method, the application of relatively lightweight and/or substantially neutrally buoyant particulate material as a fracture proppant particulate advantageously may provide for substantially improved overall system performance in hydraulic fracturing applications, or in other well treating applications such as sand control.

As used herein, the following terms shall have the designated meanings:

"relatively lightweight" shall refer to a particulate that has an apparent specific gravity (ASG) (API RP 60) that is substantially less than a conventional particulate material employed in hydraulic fracturing or sand control operations, e.g. sand (having an ASG, API RP 60, of 2.65) or an ASG similar to these materials. The term "relatively lightweight"

shall include ultra lightweight (ULW) density particulates having an ASG less than or equal to 2.45. Included within such ULW particulates are selectively configured porous particulate materials, non-selectively configured porous particulate materials, and well treating aggregates, as defined herein;

"substantially neutrally buoyant" shall refer to a relatively lightweight particulate that has an ASG sufficiently close to the ASG of a selected ungelled or weakly gelled carrier fluid (e.g., ungelled or weakly gelled completion brine, other aqueous-based fluid, slick water, or other suitable fluid) which allows pumping and satisfactory placement of the proppant/particulate using the selected ungelled or weakly gelled carrier fluid. For example, urethane resin-coated ground walnut hulls having an ASG of from about 1.25 to about 1.35 may be employed as a substantially neutrally buoyant proppant/particulate in completion brine having an ASG of about 1.2. It will be understood that these values are exemplary only;

"weakly gelled" carrier fluid shall refer to a carrier fluid having minimum sufficient polymer, viscosifier or friction reducer to achieve friction reduction when pumped downhole (e.g., when pumped down tubing, work string, casing, coiled tubing, drill pipe, etc.), and/or may be characterized as having a polymer or viscosifier concentration of from greater than about 0 pounds of polymer per thousand gallons of base fluid to about 10 pounds of polymer per thousand gallons of base fluid, and/or as having a viscosity of from about 1 to about 10 centipoises, an "ungelled carrier fluid" is a carrier fluid having no polymer or viscosifer. The ungelled carrier fluid may contain a friction reducer known in the art;

"porous particulate material" shall refer to a porous ceramic or porous organic polymeric material. Examples of types of materials suitable for use as a porous particulate material include those particulates having a porous matrix;

"selectively configured porous particulate material" shall refer to any porous particulate material, natural or non-natural, which has been chemically treated, such as treatment with a coating material; treatment with a penetrating material; or modified by glazing. The term shall include, but not be limited to, those porous particulate materials which have been altered to achieve desired physical properties, such as particle characteristics, desired strength and/or ASG in order to fit downhole conditions for well treating such as hydraulic fracturing treatments and sand control treatments;

"non-selectively configured porous particulate material" shall refer to any porous natural particulate material, including porous natural ceramic materials such as lightweight volcanic rocks, like pumice, as well as perlite and other porous "lavas" like porous (vesicular) Hawaiian Basalt, porous Virginia Diabase, and Utah Rhyolite. Further, inorganic ceramic materials, such as alumina, magnetic glass, titanium oxide, zirconium oxide, and silicon carbide may also be used. In addition, the term shall refer to a synthetic porous particulate material which has not been chemically treated and which imparts desired physical properties, such as particle characteristics, desired strength and/or ASG in order to fit downhole conditions for well treating; and "well treating aggregate" shall refer to a relatively lightweight particulate composed of at least one organic lightweight material and a weight modifying agent.

The disclosed relatively lightweight and/or substantially neutrally buoyant particulate/proppant materials may be employed with carrier fluids that are gelled, non-gelled, or that have a reduced or lighter gelling requirement as compared to carrier fluids employed with conventional fracture treatment/sand control methods. In one embodiment employing one or more of the disclosed substantially neutrally buoyant particulate materials and a brine carrier fluid, mixing equipment need only include such equipment that is capable of (a) mixing the brine (dissolving soluble salts), and (b) homogeneously dispersing in the substantially neutrally buoyant particulate material.

Examples of suitable relatively lightweight and/or substantially neutrally buoyant materials for use in aqueous based carrier fluids include, but are not limited to, ground or crushed nut shells, ground or crushed seed shells, ground or crushed fruit pits, processed wood, or a mixture thereof as. Protective and/or hardening coatings may be selected to modify or customize the ASG of a selected base particulate/proppant material. Modification of particulate specific gravity (i.e., to have a greater or lesser specific gravity) may be advantageously employed, for example, to provide proppant or sand control particulates of customized specific gravity for use as a substantially neutrally buoyant particulate with a variety of different weight or specific gravity carrier fluids. In yet another embodiment, protective and/or hardening-type coatings may be optionally curable to facilitate proppant pack/sand control particulate consolidation after placement. In this regard, curable resins are known to those of skill in the art, and with benefit of this disclosure may be selected to fit particular applications accordingly.

Protective coatings for coating at least a portion of individual particles of such relatively lightweight and/or substantially neutrally buoyant materials include, but are not limited to at least one of phenol formaldehyde resin, melamine formaldehyde resin, urethane resin, or a mixture thereof. Other optional coating compositions known in the art to be useful as hardeners for such materials (e.g., coating materials that function or serve to increase the elastic modulus of the material) may be also employed in conjunction or as an alternative to protective coatings, and may be placed underneath or on top of one or more protective coatings. It will be understood by those of skill in the art that such protective and/or hardening coatings may be used in any combination suitable for imparting desired characteristics to a relatively lightweight and/or substantially neutrally buoyant particulate/proppant material, including in two or more multiple layers. In this regard successive layers of protective coatings, successive layers of hardening coatings, alternating layers of hardening and protective coatings, etc. are possible. Mixtures of protective and hardening coating materials may also be possible.

Suitable relatively lightweight and/or substantially neutrally buoyant particulate materials coated with a resin may have a specific gravity of from about 1.25 to about 1.35, and a bulk density of about 0.67. In one exemplary case, size of such a material may be about 12/20 US mesh size. In another exemplary case, sizes may range from about 4 mesh to about 100 mesh. Advantageously, in some embodiments, ground walnut shells may serve to attract fines and formation particles by their resinous nature.

In one particularly preferred embodiment, an optional hardener may be applied to a ground walnut shell material first followed by a urethane coating as described elsewhere herein that may vary in amount as desired. For example, such a coating material may be present in an amount of from about 1% to about 20%, alternatively from about 10% to about 20% by weight of total weight of individual particles. Alternatively, such a coating material may be present in an amount of from about 2% to about 12% by weight of total weight of individual particles. The amount of resin may depend, for example, on price and application. In this regard, particulates may be first sprayed or otherwise coated with a hardener, and a coating may be applied to be about 12% by weight of total weight of the particle.

In a further embodiment, individual particles (e.g. granules) of naturally occurring materials (e.g., made from naturally occurring materials or derivatives of naturally occurring materials including, but not limited to, plant-based or agricultural-based materials such as nut hulls, seed shells, processed wood materials, derivatives of such plant-based or agricultural-based materials, etc.) may be optionally treated by exposure to a modifying agent that is capable of interacting with compounds present in or on a natural material in a way that acts to increase the ability of the naturally occurring material to resist deformation (e.g., by increasing the elastic modulus or otherwise strengthening and/or hardening the naturally occurring material). Examples of suitable modifying agents include, but are not limited to, any compound or other material capable of modifying (e.g., crosslinking, coupling or otherwise reacting with) one or more components present in the naturally occurring material (e.g., natural resins, lignins and/or cellulosic fibers). Specific examples of suitable modifying agents include, but are not limited to, agents including polyisocyanates, silanes, siloxanes, and combinations thereof. Selected modifying agent/s may be advantageously used to increase the elastic modulus of a given naturally occurring material, for example, to make particles of a given naturally occurring material more suitable (e.g., having increased hardness or strength to resist or prevent deformation under downhole in situ conditions of formation temperature and formation closure stress) for use as a relatively lightweight and/or substantially neutrally buoyant fracture proppant or sand control particulate material having increased effectiveness when exposed to higher closure stresses or other mechanical stresses that may be encountered downhole during a well treatment such as a hydraulic fracturing or sand control treatment.

Effectiveness of modifying agents may be optionally enhanced, for example, by facilitating interaction between a modifying agent and one or more components present in a naturally occurring material. In this regard interaction between a modifying agent and components present in a naturally occurring material may be facilitated using one or more enhancing agents (e.g., swelling agents, penetrating agents, etc.) and/or by exposing a naturally occurring material to one or more interaction-enhancing conditions that serve to enhance interaction with a modifying agent (e.g., vacuum and/or pressure impregnation of the modifying agent into a naturally occurring material, etc.). Examples of suitable enhancing agents include, but are not limited to, liquid or gaseous ammonia, dimethyl sulfoxide ("DMSO"), methyl pyrrolidone, etc.

In one exemplary embodiment, the modifying process may include exposing particles of the naturally occurring material to a modifying agent (e.g. that includes an aqueous mixture of alkyl silanes, such as aminopropyltriethoxy silane) to strengthen the naturally occurring material against deformation under closure stress. The modifying agent may be exposed to the naturally occurring materials using any suitable method, including soaking or spraying, and may be allowed to interact or react with the naturally occurring material with or without heating. The particles of naturally occurring material may also be optionally exposed to an enhancing agent (e.g., liquid ammonia) to allow deeper penetration and interaction of the modifying agent with components of the naturally occurring material, thus providing more uniform crosslinking or coupling of these components with less modifying agent and also helping to minimize or avoid localized crosslinking or coupling within the particles. A coating or layer of a material such as resin or epoxy may be added after treatment with a modifying agent to further enhance or increase strength of the naturally occurring material, and/or to minimize downhole fluid incompatibilities.

Also disclosed herein is a method of using modified particles of naturally occurring material as a relatively lightweight particulate material that may be introduced as part of a treating fluid into a well down wellbore tubulars (e.g., tubing, workstring, casing, drillpipe) or down coiled tubing, for example at concentrations of about 0.25 to about 15 pounds per gallon of treating fluid. In one exemplary embodiment, specific gravity of the particles of modified naturally occurring material may be about 1.3, and therefore they may be used as a substantially neutrally buoyant proppant or sand control particulate in light or heavy brines, thus eliminating the need for complex crosslinked fracturing or sand control carrier fluids.

The relatively lightweight and/or substantially neutrally buoyant particle may further be a porous ceramic or organic polymeric particulates and, in particular, selectively configured porous particulate material or a non-selectively configured porous particulate material, as defined herein.

The porous particulate material may be selectively configured with a non-porous penetrating material, coating layer or glazing layer. In a preferred embodiment, the porous particulate material is a selectively configured porous particulate material wherein (a) the ASG of the selectively configured porous particulate material is less than the ASG of the porous particulate material; (b) the permeability of the selectively configured porous particulate material is less than the permeability of the porous particulate material; or (c) the porosity of the selectively configured porous particulate material is less than the porosity of the porous particulate material.

In a preferred embodiment, the penetrating material and/or coating layer and/or glazing layer of the selectively configured porous particulate material is capable of trapping or encapsulating a fluid having an ASG less than the ASG of the carrier fluid. Further, the coating layer and/or penetrating material and/or glazing material may be a liquid having an ASG less than the ASG of the matrix of the porous particulate material.

The strength of the selectively configured porous particulate material is typically greater than the strength of the porous particulate material per se.

In a preferred mode, the porous particulate composition is a suspension of porous particulates in a carrier fluid. The suspension preferably forms a pack of particulate material that is permeable to fluids produced from the wellbore and substantially prevents or reduces production of formation materials from the formation into the wellbore.

Further, the porous particulate material may exhibit a porosity and permeability such that a fluid may be drawn at least partially into the porous matrix by capillary action. Preferably, the porous particulate material has a porosity and permeability such that a penetrating material may be drawn at least partially into the porous matrix of the porous particulate material using a vacuum and/or may be forced at least partially into the porous matrix under pressure.

The selectively configured porous particulate material may consist of a multitude of coated particulates bonded together. In such manner, the porous material is a cluster of particulates coated with a coating or penetrating layer or glazing layer. Suitable coating layers or penetrating materials include liquid and/or curable resins, plastics, cements, sealants, or binders such as a phenol, phenol formaldehyde, melamine formaldehyde, urethane, epoxy resin, nylon, polyethylene, polystyrene or a combination thereof. In a preferred mode, the coating layer or penetrating material is an ethyl carbamate-based resin.

Further, the relatively lightweight and/or substantially neutrally buoyant particles may be a well treating aggregate composed of an organic lightweight material and a weight modifying agent. The ASG of the organic lightweight material is either greater than or less than the ASG of the well treating aggregate depending on if the weight modifying agent is a weighting agent or weight reducing agent, respectively.

Where the weight modifying agent is a weighting agent, the ASG of the well treating aggregate is at least one and a half times the ASG of the organic lightweight material, the ASG of the well treating aggregate preferably being at least about 1.0, preferably at least about 1.25. In a preferred embodiment, the ASG of the organic lightweight material in such systems is approximately 0.7 and the ASG of the well treating aggregate is between from about 1.05 to about 1.20.

Where the weight modifying agent is a weight reducing agent, the ASG of the weight reducing agent is less than 1.0 and the ASG of the organic lightweight material is less than or equal to 1.1.

In a preferred mode, the organic lightweight material forms the continuous (external) phase for the well treating aggregate, whereas the weight modifying agent forms the discontinuous (internal) phase.

The weight modifying agent may be sand, glass, hematite, silica, sand, fly ash, aluminosilicate, and an alkali metal salt or trimanganese tetraoxide. Further, the weight modifying agent may be a cation selected from alkali metal, alkaline earth metal, ammonium, manganese, and zinc and an anion selected from a halide, oxide, a carbonate, nitrate, sulfate, acetate and formate. Glass bubbles and fly ash are preferred when the weight modifying agent is a weight reducing agent. The organic lightweight material is preferably a thermosetting resin.

The relatively lightweight particulates of the invention exhibit crush resistance under conditions as high as 10,000 psi closure stress, API RP 56 or API RP 60.

In one embodiment, the disclosed relatively lightweight particulate may be introduced or pumped into a well as neutrally buoyant particles in, for example, a saturated sodium chloride solution carrier fluid or a carrier fluid that is any other completion or workover brine known in the art, for example, having an ASG of from about 1 to about 1.5, alternatively from about 1.2 to about 1.5, further alternatively about 1.2, thus eliminating the need for damaging polymer or fluid loss material. In one embodiment, such a material may be employed as proppant/sand control particulate material at temperatures up to about 150° F., and pressures up to about 1500 psi. However, these ranges of temperature and closure stress are exemplary only, it being understood that the disclosed materials may be employed as proppant/sand control materials at temperatures greater than about 150° F. and/or at closure stresses greater than about 1500 psi. For example, particles of naturally occurring material may be exposed to suitable modifying agents, with or without enhancing agents and/or conditions, in one embodiment to form relatively lightweight particulate materials that may be employed as proppant or sand control particulate at temperatures up to about 300° F., and/or at closure stresses up to about 10,000 psi, with temperatures greater than about 300° F. and/or closure stresses greater than about 10,000 psi also being possible. In any event, it will be understood with benefit of this disclosure that core and/or layer material/s (when present) and/or interaction-enhancing materials/conditions may be selected by those of skill in the art to meet and withstand anticipated downhole conditions of a given application.

In still another respect, the relatively lightweight particulate may be advantageously pre-suspended as a substantially neutrally buoyant particulate and stored in the carrier fluid (e.g., brine of near or substantially equal density), and then pumped or placed downhole as is, or diluted on the fly. In a preferred embodiment, the particulate is an ultra lightweight (ULW) proppant and is suspended in either a weighted carrier fluid or a weakly gelled carrier fluid. When suspended in the weighted carrier fluid, the ASG of the ULW proppant in the weighted carrier fluid is the same as, but no greater than 0.25 higher than, the ASG of the carrier fluid.

The carrier fluid may be a completion or workover brine, salt water, fresh water, a liquid hydrocarbon, or a gas such as nitrogen or carbon dioxide.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
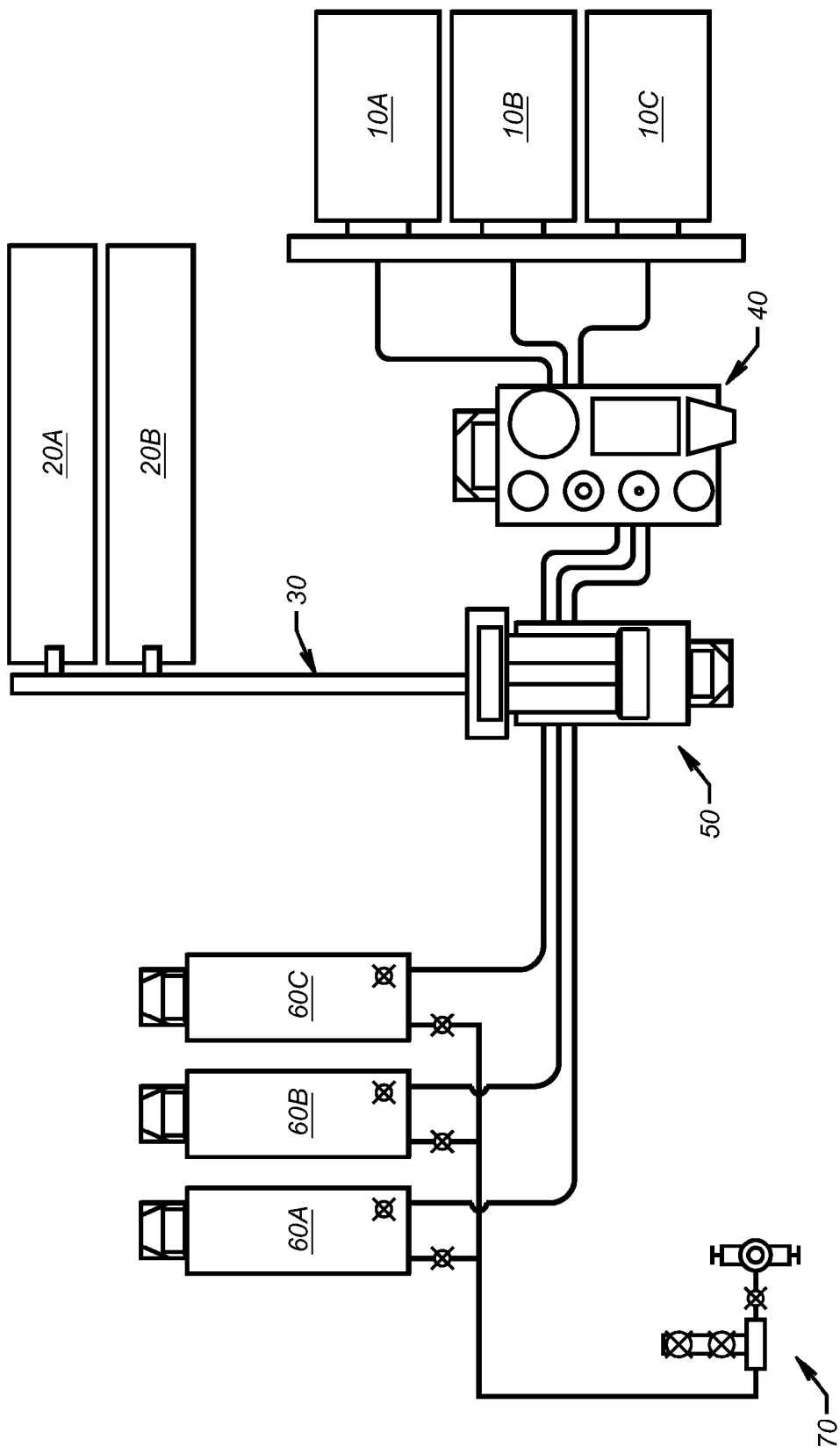
FIG. 1 shows an exemplary hydraulic fracturing equipment set-up used in the prior art.

The invention employs relatively lightweight and/or substantially neutrally buoyant proppant or sand control particulates for treating a well penetrating subterranean formation.

In a preferred embodiment of the invention, the proppant/particulate is an ultra lightweight (ULW) proppant/particulate having an apparent specific gravity (ASG) less than or equal to 2.45. Generally, the ASG of the ULW proppant is less than or equal to 2.25, more preferably less than or equal to 2.0, even more preferably less than or equal to 1.75, most preferably less than or equal to 1.25.

The relatively lightweight particulate is preferably selected from a modified naturally occurring material resistant to deformation, a porous particulate treated with a non-porous penetrating coating and/or glazing material or is a well treating aggregate of an organic lightweight material and a weight modifying agent or is a mixture thereof.

Such relatively lightweight particulate materials may be easier to place within a targeted zone due to lessened settling constraints. The reduced mass of such relatively lightweight particulate materials is generally required to fill an equivalent volume than is required with conventional sand control particulates used, for example, for gravel packing purposes.

Elimination of the need to formulate a complex suspension gel may mean a reduction in tubing friction pressures, particularly in coiled tubing and in the amount of on-location mixing equipment and/or mixing time requirements, as well as reduced costs. Furthermore, when treated to have sufficient strength (e.g., by substantially filling the permeable porosity of a porous particle with resin or hardener), the disclosed relatively lightweight particulates may be employed to simplify hydraulic fracturing treatments or sand control treatments performed through coil tubing, by greatly reducing fluid suspension property requirements. Downhole, a much reduced propensity to settle (as compared to conventional proppant or sand control particulates) may be achieved, particularly in highly deviated or horizontal wellbore sections. In this regard, the disclosed substantially neutral buoyancy particulates may be advantageously employed in any deviated well having an angle of deviation of between about 0° and about 90° with respect to the vertical. However, in one embodiment, the disclosed particulate material may be advantageously employed in horizontal wells, or in deviated wells having an angle with respect to the vertical of between about 30° and about 90°, alternatively between about 75° and about 90°.

The relatively lightweight particulate exhibits crush resistance under conditions as high as 10,000 psi closure stress, API RP 56 or API RP 60, generally between from about 250 to about 8,000 psi closure stress.

The low ASG of the relatively lightweight and/or substantially neutrally buoyant particulate may result in a larger fracture or frac pack width for the same loading (i.e., pound per square foot of proppant) to give much larger total volume and increased width for the same mass. Alternatively, this characteristic allows for smaller masses of proppant or sand control particulates to be pumped while still achieving an equivalent width.

Such materials may be employed in a manner that eliminates the need for gellation of carrier fluid, thus eliminating a source of potential proppant pack and/or formation damage and enhancement of well productivity.

Alternatively, in one embodiment, the relatively lightweight particulate may be introduced or pumped into a well as neutrally buoyant particles in the carrier fluid, eliminating the need for damaging polymer or fluid loss material. In one embodiment, such a material may be employed as proppant/sand control particulate material at temperatures up to about 700° F., and closure stresses up to about 8000 psi. However, these ranges of temperature and closure stress are exemplary only, it being understood that the disclosed materials may be employed as proppant/sand control materials at temperatures greater than about 700° F. and/or at closure stresses greater than about 8000 psi.

The disclosed particulates may be mixed with a carrier fluid in any manner suitable for delivering the mixture to a wellbore and/or subterranean formation. In one embodiment, the disclosed particulates may be injected into a subterranean formation in conjunction with a hydraulic fracturing treatment or other treatment at pressures sufficiently high enough to cause the formation or enlargement of fractures, or to otherwise expose the particles to formation closure stress. Such other treatments may be near wellbore in nature (affecting near wellbore regions) and may be directed toward improving wellbore productivity and/or controlling the production of fracture proppant or formation sand. Particular examples include gravel packing and "frac-packs." Moreover, such particulates may be employed alone as a fracture proppant/sand control particulate, or in mixtures in amounts and with types of fracture proppant/sand control materials, e.g., conventional fracture or sand control particulate. Further information on hydraulic fracturing methods and materials for use therein may be found in U.S. Pat. No. 6,059,034 and in U.S. Pat. No. 6,330,916, which are incorporated herein by reference.

The particulates are mixed at their desired concentration with a carrier fluid. The ASG of the particulate is less than or equal to the ASG of the carrier fluid. Any carrier fluid suitable for transporting the particulate into a well and/or subterranean formation fracture in communication therewith may be employed including, but not limited to, carrier fluids including a completion or workover brine, salt water, fresh water, potassium chloride solution, a saturated sodium chloride solution, liquid hydrocarbons, and/or nitrogen, carbon dioxide or other gases.

Modified Naturally Occurring Materials

Suitable relatively lightweight and/or substantially neutrally buoyant proppant or sand control particulates include naturally occurring materials. Such naturally occurring materials may be strengthened or hardened by use of modifying agents to increase the ability of the naturally occurring material to resist deformation.

Examples of such naturally occurring materials include, but are not limited to, any naturally occurring material that contains naturally occurring and crosslinkable molecules or compounds (e.g., mixtures of naturally occurring resins, lignins and/or polymers that may be crosslinked). In this regard, examples of naturally occurring and cross-linkable molecules or compounds include, but are not limited to, those molecules having available hydroxyl groups suitable for crosslinking with one or more crosslinking agent/s. Specific examples of such molecules include, but are not limited to, polysaccharides found in plants that serve to enhance strength of plant materials including, but not limited to, polysaccharides containing Beta (1-4) linked sugars. Specific examples include, but are not limited to, cellulose and mannans. Other examples of suitable molecules or components include, but are not limited to, natural resins and ligands, specific substances such as polyphenolic esters of glucosides found in tannin from walnut hulls, etc. It will be understood that the term "naturally occurring material" is used herein to describe any material based on a naturally occurring substance having the characteristics as described further herein. Materials based on naturally occurring materials include, but are not limited to, both underived and/or unprocessed naturally occurring materials, as well as materials based on naturally occurring materials that have been processed (e.g., mechanically or chemically processed) and/or derived (e.g., derivatives of naturally occurring materials).

Specific examples of naturally occurring particulate materials suitable for treatment with modifying agent/s and/or suitable for use as relatively lightweight and/or substantially neutrally buoyant proppant or sand control particulates include, but are not limited to, ground or crushed shells of nuts such as walnut, coconut, pecan, almond, ivory nut, brazil nut, etc; ground or crushed seed shells (including fruit pits) of seeds of fruits such as plum, olive, peach, cherry, apricot, etc., ground or crushed seed shells of other plants such as maize (e.g., corn cobs or corn kernels), etc., processed wood materials such as those derived from woods such as oak, hickory, walnut, poplar, mahogany, etc., including such woods that have been processed by grinding, chipping, or other form of particalization, processing, etc. Further information on nuts and composition thereof may be found in Encyclopedia of Chemical Technology, edited by Raymond E. Kirk and Donald F. Othmer, Third Edition, John Wiley & Sons, Volume 16, pages 248-273 (entitled "Nuts"), copyright 1981.

Additional information on materials and methods for use thereof may be found in U.S. Pat. No. 6,330,916. Further information on materials and methods may also be found in U.S. patent application Ser. No. 09/579,147, filed May 25, 2000, and U.S. patent application Ser. No. 09/579,146, filed May 25, 2000, each of which is incorporated herein by reference.

Specific examples of suitable materials for use in both relatively low closure stress embodiments and in relatively higher closure stress embodiments (e.g., when treated with a modifying agent as described herein) include, but are not limited to, ground or crushed nut shells available from suppliers such as "COMPOSITION MATERIALS, INC." of Milford, Conn.; "AGRASHELL, INC." of Bath, Pa.; "BAROID", and/or "CALIFORNIA NUT ASSOCIATION"; "WALNUT SHELLING, INC." of Las Molinas, Calif.; and "ECOSHELL" of Corning, Calif. These products include "walnut shell grit" available from "COMPOSITION MATERIALS, INC.", "AD-3" ground walnut hulls from "AGRASHELL" (having a particle size of about 12/20 mesh, an ASG of about 1.2, and a maximum length-based aspect ratio of about 5), as well as "AD-6B" ground walnut shells (having a particle size of about 20/40 mesh, an ASG of about 1.2, and a maximum length-based aspect ratio of about 5). Such ground walnut hull material is available, e.g., for use as a blasting media. Other suitable products include, but are not limited to, ground walnut hull material from "ECOSHELL" or "FRITZ" having a particle size of about 16/30 mesh, an ASG of about 1.3, and a maximum length-based aspect ratio of about 1:1, alternatively of about 2:1.

Figure 2:
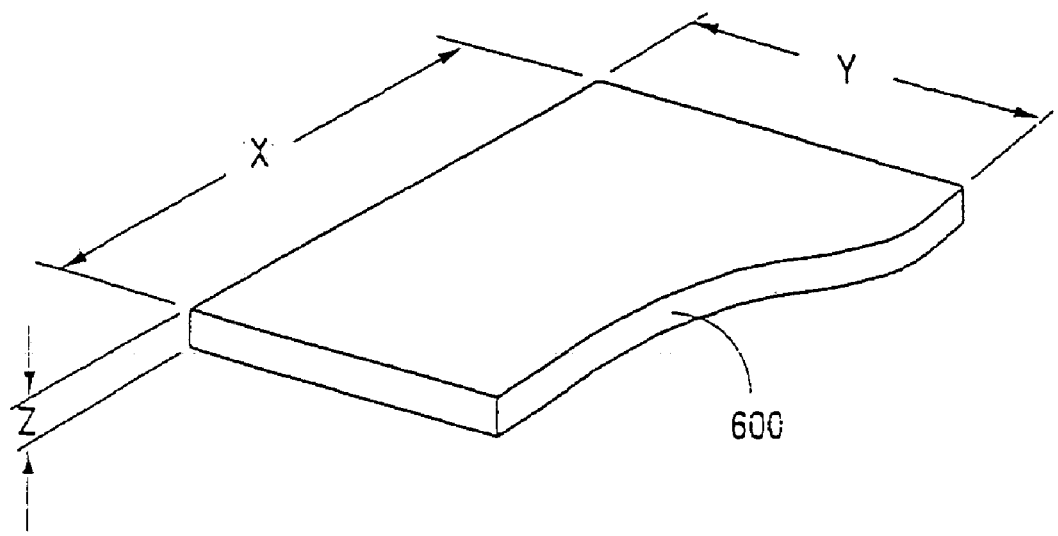
FIG. 2 is a representation of a particle of ground walnut hull material according to one embodiment of the disclosed method.

FIG. 2 shows a simplified representation of a particle 600 of ground walnut hull material having relative dimension ratio of X:Y:Z. In one exemplary embodiment employing ground walnut hull material, values of X, Y and Z may be expressed as a relative ratio (e.g., independent of any particular units of measurement employed) as follows: X may be from about 1 to about 5; Y may be from about 1 to about 5, and Z may be about 1. Alternatively, X may be from about 2 to about 5; Y may be from about 2 to about 5, and Z may be about 1. These given ranges are exemplary only, and relative dimensional values of any one or more of X, Y, and Z may fall outside these value ranges. In alternate embodiments, ground nuts such as ground walnut hulls may be processed to have a substantially spherical or beaded shape as well.

In one exemplary embodiment, ground walnut hulls having a particle size of about 12/20 mesh and a maximum length-based aspect ratio of about 5 may be employed as a proppant and/or sand control particulate. These and other materials may be treated (e.g. with modifying agent and/or coated) for use in these applications as described elsewhere herein.

As previously mentioned, naturally occurring materials may be optionally strengthened or hardened in one embodiment by exposure to a modifying agent that is capable of interacting with compounds present in or on a naturally occurring material in a way that acts to strengthen or harden the naturally occurring material (e.g. by increasing the elastic modulus of the naturally occurring material). In this regard, any naturally occurring material and/or derivatized naturally occurring material may be employed that is suitable for treatment with one or more modifying agent/s in a manner as described elsewhere herein. A suitable naturally occurring material may include, for example, any material or derivatized material that contains naturally occurring and crosslinkable molecules or compounds (e.g. mixtures of naturally occurring resins, lignins and/or polymers that may be crosslinked). Examples of naturally occurring and cross-linkable molecules or compounds include, but are not limited to, those molecules having terminal hydroxyl groups suitable for crosslinking with one or more crosslinking agent/s. Specific examples of such molecules include, but are not limited to, polysaccharides composed of $\beta(1-4)$ linked sugars such as cellulose, mannose, etc. In one exemplary embodiment, individual particles (e.g., granules) of naturally occurring materials (e.g., made from nut hulls, seed shells, processed wood materials, etc.) may be employed. Included are any of the specific examples of nut hulls, seed shells and processed wood materials described elsewhere herein.

Selected modifying agent/s may be advantageously used to modify particles of a given naturally occurring material so that they have increased resistance (e.g., partial or complete resistance) to deformation under in situ formation or downhole conditions as compared to the same type of particles of naturally occurring material that have not been so modified. In this regard, a selected modifying agent/s may be employed to make particles of a given naturally occurring material more suitable for use as a fracture proppant and/or sand control particulate material having increased effectiveness when exposed to higher closure stresses or other mechanical stresses that may be encountered downhole during a well treatment such as a hydraulic fracturing or sand control treatment. In one exemplary embodiment, a modifying agent/s may be characterized as an agent that is effective to increase the hardness or strength of a given naturally occurring material (e.g., one that is effective to increase the elastic modulus of the given naturally occurring material). While not wishing to be bound by theory, it is believed that a modifying agent may increase the resistance to deformation of a given naturally occurring material by reacting (e.g., crosslinking) with components (e.g., resins, polymers, etc.) present in the naturally occurring material.

In one embodiment, one or more modifying agents may be employed to significantly increase the elastic modulus of a given naturally occurring material as measured under standard conditions of temperature and pressure ("STP"). For example, in one exemplary embodiment, particles of ground walnut hulls having an untreated elastic modulus of about 40,000 psi to about 50,000 psi may be treated with one or more of the modifying agents described herein to increase the elastic modulus to a value greater than or equal to about 40,000 psi, alternatively to a value greater than or equal to about 50,000 psi, alternatively to a value from about 40,000 psi to about 1,500,000 psi, alternatively to a value from about 40,000 psi to about 1,000,000 psi, alternatively to a value from about 40,000 psi to about 500,000 psi, alternatively to a value from about 40,000 psi to about 400,000 psi, alternatively to a value from about 50,000 psi to about 1,500,000 psi, alternatively to a value from about 50,000 psi to about 1,000,000 psi, alternatively to a value from about 50,000 psi to about 500,000 psi, alternatively to a value from about 50,000 psi to about 400,000 psi, alternatively to a value of from about of from about 400,000 psi to about 1,500,000 psi, alternatively to a value of from about 500,000 psi to about 1,000,000 psi, alternatively to a value of greater than or equal to about 400,000 psi, alternatively to a value of greater than or equal to about 500,000 psi, alternatively to a value of greater than or equal to about 1,000,000 psi, alternatively to a value of from about 1,000,000 psi to about 1,500,000 psi, with it being understood that these values are exemplary only and that values outside these ranges are also possible. In other embodiments, it is possible that treatment with one or more modifying agents may also serve to at least partially increase the ability of naturally occurring particulate material to withstand damage or degradation from exposure to downhole fluids such as formation, drilling, workover fluids (e.g., salt water, acid, etc.), although it will be understood that this characteristic need not necessarily be present.

In one embodiment, examples of suitable modifying agents include, but are not limited to, any compound or other material effective for modifying (e.g., crosslinking, coupling or otherwise reacting with) one or more components present in the naturally occurring material (e.g., natural resins, lignins and/or cellulosic fibers). In a further embodiment, suitable modifying agents may be optionally further characterized as being effective for modifying one or more components present in a occurring-occurring material without degrading or otherwise damaging strength or hardness of naturally occurring material (e.g., without causing hydrolysis of the resins and polysaccharides), and/or without producing damaging by-products during modification that act to degrade or otherwise damage strength or hardness of naturally occurring material (e.g., without liberating acids such as hydrochloric acid, organic acids, etc.). In one exemplary embodiment, modification by-products produced by a suitable modifying agent may be characterized as substantially non-reactive and non-damaging to the strength or hardness of a given modified occurring-occurring particulate material (e.g., alcohol-based by-product such as methanol being substantially non-damaging to ground walnut hull material). It is also possible that such substantially non-damaging by-products may be optionally released or liberated from the naturally occurring material during post-modification treatment, e.g., drying of a modified occurring-occurring particulate material.

Examples of suitable types of modifying agents include, but are not limited to, compounds containing silicon-oxygen linkages, compounds containing cyanate groups, epoxy groups, etc. Specific examples of suitable modifying agents include, but are not limited to, polyisocyanate-based compounds, silane-based compounds, siloxane-based compounds, epoxy-based combinations thereof, etc.

In one embodiment, a modifying agent may include one or more silane-based compounds having the following chemical formula (I):

$$R\text{—}Si(OR')_3 \tag{I}$$

wherein in one embodiment R is branched or linear aliphatic carbon chain that may be saturated or unsaturated (e.g., containing one or more double and/or triple bonds), and which may have from about 1 to about 10 carbon atoms, alternatively from about 1 to about 5 carbon atoms, and further alternatively about 3 carbon atoms; and wherein each R' is independently branched or linear carbon chain that may be saturated or unsaturated (e.g., containing one or more double and/or triple bonds), and which may have from about 1 to about 4 carbon atoms, alternatively from about 1 to about 2 carbon atoms, and further alternatively about 2 carbon atoms; it being understood that each R' group may be the same or different structure than one or both of the other R' groups. In another embodiment, R may be further characterized as alkanyl or alkenyl carbon chain having the above-properties. In other embodiments, R may be characterized as an aromatic carbon chain or alicyclic carbon chain.

In a further embodiment, one or more of the carbon chains R and/or R' of formula (I) may be optionally and independently derivatized, e.g., the R carbon chain and/or one or more of the R' carbon chains may each contain one or more amino functional groups, one or more halogen groups (e.g., tetrachlorosilane, methyltrichlorosilane, etc.), two or more isocyanate functional groups, two or more epoxy groups, etc. Where halogen groups (e.g., such as chlorine groups) are present, it may be desirable to rapidly neutralize any acidic by-products that may be created during a modification reaction.

In one exemplary embodiment, a silane-based modifying agent may include an amino-functional silane-based compound such as gamma-aminopropyltriethoxy silane, a isocyanate-functional silane-based compound such as gamma isocyanatopropyltriethoxy silane, mixtures thereof, etc.

Examples of commercially available silane-based products that may be employed as modifying agents in the practice of the disclose methods and compositions include, but are not limited to, silane-based products (e.g., as crosslinkers, coupling agents, adhesion promoters, stereomodifiers, endcappers, etc) available from sources such as NALCO/EXXON CHEMICALS and CROMPTON of South Charleston, W. Va. Specific examples of commercially available silane-based products available from CROMPTON include CoatOSil® 1706 Silane (vinyl silane monomer), CoatOSil® 1757 Silane, CoatOSil® 1770 Silane, EURENOR® 5020 (liquid isobuytlisopropyldimethoxysilane), EURENOR® 5021 (liquid diisopropylmethoxysilane), EURENOR® 5022 (liquid diisobutyldimethoxysilane), EURENOR® 5023 (liquid dicyclopentyldimethoxysilane), SILCAT® R Silane (vinylsilane with grafting and crosslinking catalysts), SILCAT® RHE Silane (crosslinking system of silane, peroxide and catalyst), SILCAT® RHS Silane (crosslinking system of silane, peroxide catalyst and antioxidants), SILCAT® VS-735/1 Silane (crosslinking system of silane, peroxide, antioxidants and metal deactivator), SILCAT® VS-758/0 Silane (stabilized crosslinking system of silane, peroxide and catalyst), SILCAT® VS-870 Silane (stabilized crosslinking system of silane, peroxide, catalyst, antioxidants and metal deactivator), SILCAT® VS-928 Silane (stabilized crosslinking system of silane, peroxide, catalyst, antioxidants and metal deactivator), SILCAT® VS-963 Silane (stabilized crosslinking system of silane, peroxide, catalyst, antioxidants and metal deactivator), Silox® VS-911 Silane (liquid silane system), SILQUEST® A-1100™ Silane (gamma-aminopropyltriethoxysilane), SILQUEST® A-1101 Silane (technical grade amino silane), SILQUEST® A-1102 Silane (technical grade amino silane), SILQUEST® A-1110 Silane (primary amino silane), SILQUEST® A-1120 Silane, SILQUEST® A-1126 Silane (amino silane), SILQUEST® A-1128 Silane (amino silane), SILQUEST® A-1160 Silane (ureido silane), SILQUEST® A-1170 Silane (secondary aminofunctional silane), SILQUEST® A-1289 Silane, SILQUEST® A-1310 Silane, SILQUEST® A-137 Silane (monomeric alkylalkoxysilane), SILQUEST® A-151 Silane, SILQUEST® A-1524 Silane (100-percent active ureidosilane), SILQUEST® A-1589 Silane (disulfide silane), SILQUEST® A-171 Silane, SILQUEST® A-172 Silane (vinylfunctional coupling agent), SILQUEST® A-174 Silane, SILQUEST® A-186 Silane (epoxy functional silanes), SILQUEST® A-187 Silane (epoxy functional silanes), SILQUEST® A-189 Silane, SILQUEST® A-2171 Silane (silane compound having vinyl and silane functionality), SILQUEST® Alink 15 Silane (secondary amino silane endcapper), SILQUEST® RC-1 Silane (organosilicone coupling agent), SILQUEST® RC-2 Silane, SILQUEST® Wetlink 78 Silane, SILQUEST® Y-11637 Silane (primary aminosilane), SILQUEST® Y-11683 Silane (di-, tri-functional ethoxy silane), SILQUEST® Y-5997 Silane, XL-PEarl® 31 Blend, XL-PEarl® 50 Blend, XL PEarl® 51 Blend, XL-PEarl® 52 Blend, XL-PEarl® 60 Blend, XL-PEarl® 70 Blend, etc.

In another embodiment, a modifying agent may include one or more siloxane-based compounds having the following chemical formula (II):

$$R—Si(OR')_2—O—Si(OR'')_2—R \quad (II)$$

wherein in one embodiment R is a branched or linear aliphatic carbon chain that may be saturated or unsaturated (e.g., containing one or more double and/or triple bonds), and which may have from about 1 to about 10 carbon atoms, alternatively from about 1 to about 5 carbon atoms, and further alternatively about 3 carbon atoms; wherein each R' and each R'' is independently a branched or linear carbon chain that may be saturated or unsaturated (e.g. containing one or more double and/or triple bonds), and which may have from about 1 to about 4 carbon atoms, alternatively from about 1 to about 2 carbon atoms, and further alternatively about 2 carbon atoms; it being understood that one R' may be the same or different than the other R' group, that one R'' may be the same or different than the other R'' group, and that one or both R' groups may be the same or different than one or both R'' groups. In another embodiment, R may be further characterized as alkanyl or alkenyl carbon chain having the above-properties. In other embodiments, R may be characterized as an aromatic carbon chain or alicyclic carbon chain.

In a further embodiment, one or more of the carbon chains R and/or R' of formula (II) may be optionally and independently derivatized, e.g., the R carbon chain and/or one or more of the R' and/or R'' carbon chains may each contain one or more amino functional groups, two or more isocyanate functional groups, two or more epoxy groups, etc.

Specific examples of siloxane-based compounds include, but are not limited to, an aqueous solution of alcohol-free aminoalkyl siloxane such as SILQUEST® A-1106 Silane available from CROMPTON, and an aqueous solution of aminoalkyl siloxane available from BJ SERVICES as "FSA-1" and from NALCO/EXXON CHEMICALS as "TEK-STIM 3535".

In another embodiment, a modifying agent may include one or more polyisocyanate-based compounds having the following chemical formula (III):

$$OCN—R—NCO \quad (III)$$

wherein R is at least one of phenyl, derivatized phenyl, or an aliphatic carbon chain having from about 2 to about 10 carbon atoms, alternatively having from about 2 to about 6 carbon atoms, and further alternatively having about 6 carbon atoms.

In one exemplary embodiment, a polyisocyanate-based modifying agent may include polyisocyanate-based compounds such as toluene diisocyanate, hexamethylene polyisocyanate, etc.

In another embodiment, a modifying agent may include one or more epoxy-based compounds having two or more epoxy groups.

Individual particles of naturally occurring materials may be strengthened and/or hardened by exposure to a modifying agent using any wet or dry process suitable for causing interaction between the modifying agent and one or more compounds present in or on the natural material in a way that acts to strengthen or harden the naturally occurring material (e.g., by increasing the elastic modulus of the naturally occurring material). Exposure methodologies that are the same as, or that are similar to, resin coating methods described elsewhere herein (e.g., to coat a first core material with a second resin material) may also be employed to expose particles of naturally occurring material to a modifying agent (e.g. by manufacturers such as FRITZ Industries of Mesquite, Tex., etc.). Specific examples of suitable exposure methods include, but are not limited to, by soaking of the naturally occurring material in a modifying agent (e.g., in one embodiment using equal parts of modifying agent and naturally occurring material), by dipping the naturally occurring material in a modifying agent, by spraying a modifying agent on to the naturally occurring material (e.g., as particles continuously move through a pneumatic mover or basket), by mixing naturally occurring particulate material with liquid, atomized and/or gaseous modifying agent in a vertical mixer (e.g., as particles continuously move through a vertical mixer), by flowing modifying agent through a permeable bed or pack of the naturally occurring particles in a pressurized container. Drying of particles after exposure may be accomplished, for example, by continuously dropping through heated air (e.g., at an elevated temperature of about 375° F.).

Exposure conditions may be selected and/or varied to enhance interaction between modifying agent and naturally occurring material, including selected combinations of temperature and/or pressure. For example, naturally occurring particulate material may be raised to an elevated temperature (e.g. from about 100° F. to about 400° F., alternatively from about 150° F. to about 375° F.) during or after exposure to a modifying agent (e.g., using any of the exposure methods described herein) to facilitate the interaction between a modifying agent and the particulate material. Besides serving to dry the naturally occurring material, exposure to an elevated temperature also may serve to further drive the reaction between the modifying agent and reactive components of the naturally occurring material, as well as to burn off softer outer layers of the particles of naturally occurring material that may be present. However, it will be understood that heating is not necessary.

Particles of naturally occurring material may also be partially or completely impregnated using vacuum and/or pressure impregnation methods, such as those methods described elsewhere herein. In one exemplary embodiment, particles of naturally occurring material may be immersed in a liquid modifying agent in a sealed container at room temperature, a vacuum (e.g., of from about −18 to about −20 psi) applied to the container for a period of time (e.g., about 2 hours), and the particles then separated from the liquid modifying agent and dried using dry heat (e.g., at an elevated temperature of about 200° F.). In another exemplary embodiment, particles of naturally occurring material may be immersed in a liquid modifying agent in a sealed container at room temperature, and pressure (e.g., from about 1 psig to about 1000 psig) applied to the container for a period of time (e.g., about 1 hours), and the particles then separated from the liquid modifying agent and dried using dry heat (e.g., for about 1 hour at an elevated temperature of about 200° F.). In yet another exemplary embodiment, combination of vacuum impregnation and pressure impregnation methods may be employed.

Particles of a selected naturally occurring material (e.g., ground walnut hulls) may be exposed to any amount of a selected modifying agent effective for strengthening or hardening the selected naturally occurring material. In this regard, it will be understood that the amount of modifying agent employed relative to naturally occurring materials may be varied as necessary to achieve a desired degree of hardening or strengthening of the naturally occurring material, for example, to fit conditions of a particular application (e.g., particular anticipated downhole conditions), to satisfy cost limitations, etc. It will also be understood that the amount of modifying agent employed relative to naturally occurring material may vary according to the number and types of reactive functional groups present on molecules of the modifying agent. For example, in one embodiment particles of naturally occurring material may be exposed to a modifying agent (e.g., silane-based compound, siloxane-based compound) in an amount of from about 0.001% to about 30% of modifying agent by weight of the particles, from about 0.001% to about 26% of modifying agent by weight of the particles, from about 0.001% to about 10% of modifying agent by weight of the particles, alternatively from about 0.001% to about 2% of modifying agent by weight of the particles, from about 0.001% to about 1% of modifying agent by weight of the particles, alternatively from about 0.01% to about 30% of modifying agent by weight of the particles, from about 0.01% to about 26% of modifying agent by weight of the particles, from about 0.01% to about 10% of modifying agent by weight of the particles, alternatively from about 0.01% to about 2% of modifying agent by weight of the particles, from about 0.01% to about 1% of modifying agent by weight of the particles, alternatively from about 0.1% to about 30% of modifying agent by weight of the particles, from about 0.1% to about 26% of modifying agent by weight of the particles, from about 0.1% to about 10% of modifying agent by weight of the particles, alternatively from about 0.1% to about 2% of modifying agent by weight of the particles, from about 0.1% to about 1% of modifying agent by weight of the particles, alternatively from about 1% to about 2% of modifying agent by weight of the particles.

In an alternative and exemplary embodiment, particles of naturally occurring material (e.g., ground walnut hulls) may be introduced into a vertical mixer, heated to a temperature of from about 100 to about 400° F. and sprayed or otherwise exposed to a modifying agent. For example, ground walnut hulls may be exposed to a siloxane-based compound (e.g., FSA-1) in an amount of about 26% of modifying agent by weight of naturally occurring particulate material. It will be understood that the foregoing ranges of modifying agent amount are exemplary only, and that particles of naturally occurring materials may be exposed to modifying agent/s in other amounts (e.g., including up to and greater than about 100% of modifying agent by weight of the particles). For example, by soaking particles of naturally occurring material in a suitable modifying agent in conjunction with vacuum and/or pressure impregnation, exposure values of from about 0.1% to about 30% alternatively about 10% of modifying agent by weight of naturally occurring particulate material may be achieved.

Modifying agents may be diluted as so desired in a suitable solvent prior to treating particles of a naturally occurring material. Examples of solvent materials with which modifying agents may be diluted include low surface tension solvents. Specific examples of suitable diluting materials include, but are not limited to, ethylene glycol monobutylether ("EGMBE"), alcohols (e.g., methanol, ethanol, etc.), water-based solvents mixed with low surface tension surfactants (e.g., fluoro-surfactants, etc.), organic fluids such as diesel, etc.

Effectiveness of modifying agents may be optionally enhanced, for example, by facilitating interaction between a modifying agent and one or more components present in a naturally occurring material. In this regard interaction between a modifying agent and components present in a naturally occurring material may be facilitated using one or more enhancing agents (e.g., swelling agents, penetrating agents, etc.) and/or by exposing a naturally occurring material to one or more enhancing conditions such as described above that serve to enhance interaction with a modifying agent (e.g., vacuum and/or pressure impregnation). Examples of suitable enhancing agents include, but are not limited to, liquid or gaseous ammonia, dimethyl sulfoxide ("DMSO"), methylpyrrolidone, etc. While not wishing to be bound by theory, it is believed that such enhancing agents act to facilitate interaction between a modifying agent and one or more components present in the naturally occurring material (e.g., natural resins, lignins and/or cellulosic fibers) by opening the matrix (e.g., by causing swelling) of the matrix of the naturally occurring material or otherwise penetrating through the matrix of the naturally occurring material to allow deeper penetration by the modifying agent. By facilitating interaction between modifying agent and naturally occurring material, an enhancing agent may make possible the use of less modifying agent relative to naturally occurring particulate material to produce the same or substantially the same results, reducing cost of treatment.

In one embodiment, selection of appropriate enhancing agent may be made based on compatibility with selected modifying agent. For example, ammonia may be more desirable for use as an enhancing agent when employed with silane-based or siloxane-based modifying agent than with polyisocyanate-based modifying agents, due to low affinity of silane-based and siloxane-based modifying agents for nitrogen atoms relative to polyisocyanate-based modifying agents. In another example, DMSO may be desirable for use as an enhancing agent in conjunction with polyisocyanate-based modifying agents. However, it will be understood that any desired combination of one or more enhancing agent/s and one or more modifying agent/s may be employed to produce modified naturally occurring particulate material having desired characteristics (e.g., strength, hardness, resistance to deformation, etc.) to fit a given application.

Individual particles of naturally occurring materials may be exposed to one or more enhancing agent/s using any methodology suitable for facilitating interaction between the particles of naturally occurring materials and one or more modifying agents to which the naturally occurring material may be exposed. In this regard, particles of naturally occurring material may be exposed to one or more enhancing agents prior to, simultaneously with, and/or after exposure to one or more modifying agents as long as the enhancing agent acts to facilitate interaction between the modifying agent/s and the naturally occurring material particulates. Exposure of naturally occurring particulate material to enhancing agent may be accomplished using any method suitable for contacting the particles with the enhancing agent/s including, for example, the same methods described above for exposing naturally occurring particulate material to a modifying agent, e.g., coating, soaking, dipping, spraying, mixing, flowing, etc. Furthermore, vacuum and/or pressure impregnation, and/or elevated temperatures may be also be employed where applicable and desired to increase effectiveness of an enhancing agent.

In one exemplary embodiment, particles of naturally occurring particulate material (e.g. ground walnut hulls) may be placed in a container through which liquid or gaseous enhancing agent (e.g. liquid, atomized or gaseous ammonia) is flowed to expose the particulate material to the enhancing agent. Following and/or during exposure to the enhancing agent, the particulate may be exposed to liquid, atomized or gaseous modifying agent/s (e.g., gamma-aminopropyltriethoxy silane) in the same container by flowing the modifying agent though the container in a manner similar to the enhancing agent. Alternatively, the particulate may be removed from the container and exposed to modifying agent/s using a separate exposure step, such as by coating, soaking, spraying, etc. In another exemplary embodiment, particles of naturally occurring particulate material (e.g. ground walnut hulls) may be introduced into a vertical mixer through which atomized or gaseous enhancing agent (e.g., atomized or gaseous ammonia) is flowed to expose the particulate material to the enhancing agent. Following and/or during exposure to the enhancing agent, the particulate may be exposed to atomized or gaseous modifying agent/s (e.g., gamma-aminopropyltriethoxy silane) in the same mixer by flowing the modifying agent though the mixer in a manner similar to the enhancing agent. Alternatively, the particulate may be removed from the mixer for exposure to modifying agent/s in a separate exposure step as described immediately above.

Following treatment with modifying agent (with or without optional enhancing agent), particles of naturally occurring material may be employed as proppant and/or sand control particles in any of the embodiments described elsewhere herein. In one embodiment, particles of a modified naturally occurring material may be utilized as relatively lightweight particulate/proppant materials. In such an embodiment, amounts and type of modifying agent may be selected so that the ASG of a naturally occurring particulate material may be affected relatively little, if at all, by treatment with a modifying agent. For example, the ASG of ground walnut hulls treated with about 26% by weight of an aminopropyltriethoxy silane modifying agent may be changed from about 1.2 to about 1.3. Such modified ground walnut hull particulate material may be introduced or pumped into a well as neutrally buoyant particles in a carrier fluid that may be, for example, a 11.5 pound per gallon (ppg) brine.

In one embodiment, particles of a modified naturally occurring material may be utilized as particulate/proppant material suitable for use at more severe or demanding downhole conditions (e.g., at higher downhole temperatures and/or under higher downhole conditions of closure stress) than the conditions under which particles of the same, but un-modified, naturally occurring material may be suitably employed. For example, in one exemplary embodiment modified particulate material may be formulated as described herein and introduced or pumped (e.g., as neutrally buoyant proppant and/or sand control particulate) in any suitable carrier fluid (e.g., saturated sodium chloride solution carrier fluid or other completion or workover brine) into a well for exposure to downhole temperatures of greater than or equal to about 170° F., alternatively greater than or equal to about 200° F., alternatively greater than or equal to about 225° F., alternatively greater than or equal to about 250° F., alternatively greater than or equal to about 270° F. In another exemplary embodiment, modified particulate material may be formulated as described herein and introduced or pumped into a well for exposure to downhole temperatures of up to about 200° F., alternatively up to about 225° F., alternatively up to about 250° F., alternatively up to about 270° F., and further alternatively up to about 300° F. In another exemplary embodiment, modified particulate material may be formulated as described herein and introduced or pumped into a well for exposure to downhole temperatures of from about 100° F. to about 300° F., alternatively from about 170° F. to about 300° F., alternatively from about 200° F. to about 300° F., alternatively from about 225° F. to about 300° F., alternatively from about 250° F. to about 300° F., alternatively from about 270° F. to about 300° F., and further alternatively from about 150° F. to about 250° F.

In another exemplary embodiment, modified particulate material may be so introduced into a well for exposure to closure stresses of greater than or equal to about 4,000 psi, alternatively of greater than or equal to about 5000 psi, alternatively of greater than or equal to about 6000 psi, alternatively of greater than or equal to about 8000 psi, alternatively of greater than or equal to about 10,000 psi, alternatively of from about 4000 psi to about 10,000 psi, alternatively from about 5,000 psi to about 6000 psi, alternatively from about 5000 psi to about 8,000 psi, alternatively from about 5000 psi to about 10,000 psi. In another exemplary embodiment, modified particulate material may be so introduced into a well for exposure to closure stresses of up to about 5000 psi, alternatively up to about 6000 psi, alternatively up to about 8000 psi, alternatively up to about 10,000 psi, alternatively from about 1000 psi to about 4000 psi, alternatively from about 1000 psi to about 5000 psi, alternatively from about 1000 psi to about 6000 psi, further, alternatively from about 1000 psi to about 8000 psi, further alternatively from about 1000 psi to about 10,000 psi. It will be understood that these ranges of temperature and closure stress are exemplary only, and that the disclosed modified particulate materials may be employed as proppant and/or sand control materials at temperatures greater than or equal to about 300° F. and/or at closure stresses greater than or equal to about 10,000 psi, and that combinations of particular naturally occurring materials, particular modifying agents, particular enhancing agents and/or manufacturing conditions may be selected based on the teaching of the disclosure herein to meet and withstand anticipated downhole conditions of a given application.

Naturally occurring particulate material that has been treated with modifying agent may be employed as relatively lightweight particulate/proppant material without further treatment. However, modified particles of naturally occurring material may also be coated or at least partially surrounded with at least one layer of a second material (e.g., resin, epoxy, etc.) that may be selected to act to harden and/or isolate or protect the first material from adverse formation or wellbore conditions in a manner as described below.

In one embodiment, a multi-component relatively lightweight and/or substantially neutrally buoyant proppant/sand control particle may include a first material and at least one additional, or second, different material. The first material and at least one second material may have different values of in situ Young's modulus and/or be of differing composition. Alternatively, the first material and at least one second material may have similar or same values of in situ Young's modulus and/or be of similar or same composition. At least one of the first or second materials may optionally be a naturally occurring material that has been modified by exposure to one or more modifying agents and/or enhancing agents.

In one embodiment, a second material may be present as a protective layer around a first material core, as described further herein. In another embodiment, a second material may be present to alter the overall modulus of a particulate formed therefrom, such as to function as a hardening material. For example, overall in situ Young's modulus of modified or unmodified ground walnut hulls may be increased by coating such particles with a layer of relatively hard resin having a higher in situ Young's modulus. A single material may be present to perform both protective and hardening functions, or separate materials may be present to perform each of these respective functions. As used herein, a "layer" refers to a second material that at least partially or completely surrounds a first core material. A layer includes materials that adhere to or are otherwise disposed on the surface of a core material, and/or to those materials that are at least partially absorbed or permeated into a first core material.

In one embodiment, the two or more materials may be configured in virtually any manner desired to form multi-component particles (for example, as described elsewhere herein) to achieve varying overall density and/or hardness characteristics (or in situ Young's modulus) of such particles, for example, to meet specific formation conditions.

In another embodiment, a first relatively lightweight and/or substantially neutrally buoyant core material may be coated or at least partially surrounded with at least one layer of a second material that may be selected to act to harden and/or isolate or protect the first material from adverse formation or wellbore conditions, for example so as to avoid exposure to acids or other workover/drilling fluids, to avoid saturation with liquids, provide longer fracture proppant/sand control pack life, etc. In this regard, any coating material known in the art and suitable for imparting hardness and/or suitable for at least partially protecting or isolating a first relatively lightweight and/or substantially buoyant core material as so described herein may be employed. Examples of such hardening and/or protective materials include, but are not limited to resins (e.g., urethane, phenolic, melamine formaldehyde, etc.) described for other use in other embodiments elsewhere herein. With benefit of this disclosure, suitable coating material/s may be selected by those of skill in the art to achieve or impart the desired qualities to a first relatively lightweight and/or substantially buoyant core material, considering anticipated wellbore and/or formation conditions. Methods for coating particulates (e.g., fracture proppant particles, etc.) with materials such as resin are known in the art, and such materials are available, for example, from manufacturers listed herein. With regard to coating of the disclosed lightweight and/or substantially neutrally buoyant materials, coating operations may be performed using any suitable methods known in the art. For example, low temperature curing methods may be employed if desired (e.g., using fast setting "cold set" or "cold cure" resins), where heating may be a problem, such as when coating materials which may be sensitive to heat, like ground nuts or fruit pits. Alternatively, indirect heating processes may be employed with such materials when it is necessary to heat a coating material for cure.

Examples of resins that may be employed as layers for protective and/or hardening purposes include, but are not limited to, phenol formaldehyde resins, melamine formaldehyde resins, and urethane resins, low volatile urethane resins (e.g., these and other types of resins available from BORDEN CHEMICAL INC., SANTROL, HEPWORTH of England), etc., and mixtures thereof. Specific examples of suitable resins include, but are not limited to, resins from BORDEN CHEMICAL and identified as 500-series and 700-series resins (e.g., 569C, 794C, etc). Further specific examples of resins include, but are not limited to, "SIGMASET" series low temperature curing urethane resins from BORDEN CHEMICAL (e.g., "SIGMASET", "SIGMASET LV", "SIGMASET XL"), "ALPHASET" phenolic resin from BORDEN, "OPTI-PROP" phenolic resin from SANTROL, and "POLAR PROP" low temperature curing resin from SANTROL. Low temperature curing resins may be applied with little or no heat, which may be desirable when coating heat-sensitive materials such as wood, nut shell material, etc. Alternatively, heat cured resins may be applied and cured using heating methods that are compatible with heat sensitive materials. For example, in one embodiment, ground walnut shells may be coated with SANTROL "OPTI-PROP" resin in a single coating step using indirect heat (e.g., at temperatures of up to about 300° F., or alternatively from about 150° F. to about 200° F.). Where desired, curing characteristics (e.g., curing time, etc) may be adjusted to fit particular layer application methods and/or final product specifications by, for example, adjusting relative amounts of resin components. Still further examples of suitable resins and coating methods include, but are not limited to, those found in European Patent Application EP 0 771 935 A1. In addition, other examples of suitable resins and coating methods include those set forth in U.S. Pat. Nos. 4,869,960; 4,664,819; 4,518,039; 3,929,191; 3,659,651; and 5,422,183, each of the foregoing references being incorporated herein by reference in its entirety.

With benefit of this disclosure, those of skill in the art will understand that first and one or more second materials may be selected to meet particular criteria based on the information and examples disclosed herein, as well as knowledge in the art. In this regard, one or more second material coatings or layers may be present, for example, to substantially protect the ground walnut hull first material from downhole fluids such as formation, drilling, workover fluids (e.g. salt water, acid, etc.), and/or to harden or otherwise modify the first material from closure stress or other mechanical stresses that may be encountered downhole. In this regard, thickness or amount of one or more coatings may be any amount suitable to provide a particle having an altered in situ Young's modulus and/or to provide at least partial protection, for the inner first material, from wellbore or formation conditions.

In one embodiment, a coating of one or more second materials may be from about 0.1% by weight to about 50%, alternatively from about 1% by weight to about 20% by weight, alternatively from about 10% by weight to about 20%, alternatively from about 2% to about 12% by weight of the total weight of the multi-component particle, although greater and lesser amounts are possible. In this way, a first material such as ground walnut shell particulates may be coated with, for example, from about 2% to about 12% of a suitable resin (e.g., BORDEN "SIGMASET LV" resin) by weight of total weight of each particle to form relatively lightweight and/or substantially neutrally buoyant proppant/sand control particulate. Such particles may exhibit increased strength and/or resistance to well fluids over uncoated ground walnut hulls. In one embodiment, it has been found that application of from about 8% to about 12% by weight of total particle weight of "SIGMASET LV" resin to ground walnut hull particulate material serves to permeate the material so as to substantially fill the accessible or permeable porosity of the materials such that a relatively shiny or glazed surface appearance is achieved.

In one exemplary embodiment, about 12/20 mesh ground walnut hulls from "COMPOSITION MATERIALS, INC." having an in situ Young's modulus of from about 1,000,000 psi to about 2,000,000 psi (and described elsewhere herein) may be coated with a second material, such as "SIGMASET LV" or "SIGMASET XL" resin available from BORDEN CHEMICAL (in amounts as described elsewhere herein). Such coated particles may be manufactured and/or supplied, for example, by BORDEN CHEMICAL. It will be understood that a protective resin layer may also function as a hardener to the core material, however, an additional and separate hardener material layer may also be present to impart additional hardness to the core material if so desired. In one exemplary embodiment in which such a separate hardener layer is present, ground walnut shell particulates may be first coated with from about 2% to about 10% by weight (and alternatively about 2% by weight) of total weight of a separate hardener material (e.g., BORDEN "2AC" hardener) and then coated with from about 1% to about 20% by weight (and alternatively about 4% by weight) of another resin (e.g., BORDEN "SIGMASET XL" or "SIGMASET LV" resin). In one exemplary embodiment then, the 12/20 mesh ground walnut shells described above may be coated with about 2% by weight of total weight of BORDEN "2AC" hardener and about 4% by weight of total weight of BORDEN "SIGMASET XL."

It will be understood that the coating amounts given herein are exemplary only, and may be greater or lesser, and that amounts and types of core, separate hardener material and/or other protective layer material/s may be selected with benefit of this disclosure by those of skill in the art to meet or and withstand anticipated downhole conditions of a given application using methods known in the art, such as those described herein (e.g., in Examples 1 and 2). For example, in the embodiment above, ground walnut shell particles having about 2% by weight "SIGMASET XL" may be employed for relatively lower closure stress applications (such as some sand control applications), and ground walnut shell particles having closer to about 10% by weight "SIGMASET XL" may be employed for relatively higher closure stress applications (such as a proppant or fracture pack particulate), although it will be understood that these are exemplary guidelines only.

In one embodiment, the second material coating may be present, for example, to substantially protect the ground walnut hull first material from downhole fluids such as formation, drilling, workover fluids (e.g. salt water, acid, etc.), while at the same time altering the in situ Young's modulus of the particles from a starting value of about 1,000,000 psi to about 2,000,000 psi, to an overall value of from about 2,000,000 to about 3,000,000 psi.

In another exemplary embodiment, ground walnut hulls (or another porous first material) may be partially or completely impregnated with a second material, by for example, vacuum and/or pressure impregnation, spraying with hardener, or a combination thereof. For example, material may be immersed in a second material and then exposed to pressure and/or vacuum to impregnate the material. Such methods are known in the art for impregnating porous materials, such as impregnating core samples with fluids, etc. Alternatively, application of a second material may result in at least partial impregnation, for example, it has been found that up to about 10% to about 12% by weight of total particle weight of resin (such as BORDEN "SIGMASET XL") may be applied and penetrate into the porosity of ground walnut shells. Furthermore, it will be understood that a first relatively lightweight and/or substantially buoyant material may be combined with more than one other material, e.g., using the methods and configurations described elsewhere herein for embodiments involving first and second materials.

It will be understood with benefit of the disclosure that any other material suitable for coating a substantially hard proppant or sand control particulate core and having suitable protective, hardening, and/or specific gravity-altering characteristics as defined elsewhere herein may be employed.

Porous Particulate Treated with Non-Porous Material

The relatively lightweight and/or substantially neutrally buoyant proppant or sand control particulate may further be a selectively configured porous particulate materials as well as a non-selectively configured porous particulate material.

The porous particulate material shall include any naturally occurring or manufactured or engineered porous ceramic particulate material that has an inherent and/or induced porosity. A commercially available instrument, ACCUPYC 1330 Automatic Gas Pycnometer (Micromeritics, Norcross, Ga.), that uses helium as an inert gas and the manufacturer's recommended procedure can be used to determine the internal porosity of the particulates. The internal porosity is generally from about 10 to 75 volume percent. Such particulate material may also have an inherent or induced permeability, i.e., individual pore spaces within the particle are interconnected so that fluids are capable of at least partially moving through the porous matrix, such as penetrating the porous matrix of the particle, or may have inherent or induced non-permeability, individual pore spaces within the particle are disconnected so that fluids are substantially not capable of moving through the porous matrix, such as not being capable of penetrating the porous matrix of the particle. The degree of desired porosity interconnection may be selected and engineered into the non-selectively configured porous particulate material. Furthermore such porous particles may be selected to have a size and shape in accordance with typical fracturing proppant particle specifications (i.e., having a uniform shape and size distribution), although such uniformity of shape and size is not necessary.

The ASG of the porous particulate material is generally less than or equal to 2.4, preferably less than or equal to 2.0, even more preferably less than or equal to 1.75, most preferably less than or equal to 1.25.

In a selectively configured porous particulate material, the particles may be selected based on porosity and/or permeability characteristics so that they have desired lightweight characteristics, such as when suspended in a selected carrier fluid for a well treatment. As before, the inherent and/or induced porosity of a porous material particle may be selected so as to help provide the desired balance between apparent density and strength. Optional materials may be employed along with a glazing, penetrating and/or coating material to control penetration, such as enhancing or impairing penetration. For example, in one embodiment a cationic clay stabilizer, such as CLAY MASTER 5C from BJ Services, may be first applied to the exterior surface of a porous ceramic material to inhibit penetration by coating/penetrating material, such as epoxy or resin described elsewhere herein.

Examples of non-natural porous particulate materials for use in the invention include, but are not limited to, porous ceramic particles such as those particles available from Carbo Ceramics Inc. as "ECONOPROP®", and those fired kaolinitic described in U.S. Pat. No. 5,188,175 which is incorporated herein by reference. As described in this reference such particles may include solid spherical pellets or particles from raw materials (such as kaolin clay) having an alumina content of between about 25% and 40% and a silica content of between about 50% and 65%. A starch binder may be employed. Such particles may be characterized as having a ratio of silicon dioxide to alumina content of from about 1.39 to about 2.41, and an ASG of between about 2.20 and about 2.60 or between about 2.20 and about 2.70.

It will also be understood that porous ceramic particles may be selectively manufactured from raw materials such as those described in U.S. Pat. No. 5,188,175; U.S. Pat. No. 4,427,068; and U.S. Pat. No. 4,522,731, which are each incorporated herein by reference, such as by inclusion of selected process steps in the initial material manufacturing process to result in a material that possesses desired characteristics of porosity, permeability, apparent density or ASG, and combinations thereof. For example, such raw materials may be fired at relatively low temperature of about 1235° F. or about 1300° F. (or about 700° C.) to achieve a desired crystalline structure and a more highly porous and lighter structure. In one exemplary embodiment of such particles, as described elsewhere herein, about 20/40 mesh size porous material fired kaolinitic particles from Carbo Ceramics Inc. may be selected for use in the disclosed method. These particles have the following internal characteristics: bulk apparent density about 1.16, internal porosity about 59.3%. These particles may be treated with a variety of penetrating/coating materials in an amount of from about 0.5 to about 10% by total weight of particle.

In such a case, the particles may be selected based on porosity and/or permeability characteristics so that they have desired lightweight characteristics, such as when suspended in a selected carrier fluid for a well treatment. As before, the inherent and/or induced porosity of a porous material particle may be selected so as to help provide the desired balance between ASG and strength. Optional materials may be employed along with a glazing, penetrating and/or coating material to control penetration such as enhance or impair penetration. For example, in one embodiment an cationic clay stabilizer, such as CLAY MASTER 5C from BJ Services, may be first applied to the exterior surface of a porous ceramic material to inhibit penetration by coating/penetrating material, such as epoxy or resin described elsewhere herein.

In a selectively configured porous particulate material, the porous particulate material is chemically treated in order to impart desired physical properties, such as porosity, permeability, apparent density or ASG, or combinations thereof to the particulate materials. Such desired physical properties are distinct from the physical properties of the porous particulate materials prior to treatment.

The desired physical properties may further be present in non-selectively configured porous particulate materials. Non-selectively configured porous particulate materials shall include naturally occurring porous ceramic materials as well as non-natural (synthetic) materials manufactured in a manner that renders such desired characteristics.

The non-selectively configured particulate material is selected based on desired physical properties, such as porosity, permeability, apparent density, particle size, chemical resistance or combinations thereof.

Such desired physical properties may be imparted to a portion or portions of the porous particulate material of the selectively configured porous particulate material or non-selectively configured porous particulate material, such as on the particle surface of the material particulate, at or in the particle surface of the particulate material, in an area near the particle surface of a particulate material, in the interior particle matrix of a particulate material or a portion thereof, combinations thereof, etc.

The ASG of the selectively configured porous particulate, as well as non-selectively configured porous particulate, is generally less than or equal to 2.4 to meet the pumping and/or downhole formation conditions of a particular application, such as hydraulic fracturing treatment, sand control treatment.

Advantageously, in one embodiment the low ASG of the porous particulate material of the selectively configured porous particulate material or non-selectively configured porous particulate material may be taken advantage of to result in a larger fracture or frac pack width for the same loading, such as pound per square foot of proppant, to give much larger total volume and increased width for the same mass. Alternatively, this characteristic allows for smaller loading of proppant material to be pumped while still achieving an equivalent width.

In a preferred embodiment, selective configuration, such as by using glaze-forming, coating and/or penetrating materials, such as those materials described elsewhere herein, may be selectively employed to modify or customize the ASG of a selected porous particulate material. Modification of particulate ASG, to have a greater or lesser ASG, may be advantageously employed, for example, to provide proppant or sand control particulates of customized ASG for use as a substantially neutrally buoyant particulate with a variety of different weight or ASG carrier fluids.

The selectively configured porous particulate material may comprise porous particulate material selectively altered by treating with a coating or penetrating material using any suitable wet or dry process. Methods for coating particulates, such as fracture proppant particles, with materials such as resin are known in the art, and such materials are available, for example, from manufacturers listed herein. With regard to coating of the disclosed porous particulate materials, coating operations may be performed using any suitable methods known in the art.

As used herein, the term "penetration" shall further refer to partially or completely impregnated with a penetrating material, by for example, vacuum and/or pressure impregnation. For example, porous particulate material may be immersed in a second material and then exposed to pressure and/or vacuum to at least partially penetrate or impregnate the material.

Those of skill in the art will understand that one or more coating and/or penetrating materials may be selected to treat a porous material particulate to meet particular criteria or requirements of given downhole application based on the information and examples disclosed herein, as well as knowledge in the art. In this regard, porous material particle characteristics, such as composition, porosity and permeability characteristics of the particulate material, size, and/or coating or penetrating material characteristics, such as composition, amount, thickness or degree of penetration, may be so selected. The coating or penetrating material is typically non-porous.

The porosity and permeability characteristics of the porous particulate material allows the penetrating material to be drawn at least partially into the porous matrix of the porous particulate material by capillary action, for example, in a manner similar to a sponge soaking up water. Alternatively, one or more penetrating materials may be drawn at least partially into the porous matrix of the porous particulate material using a vacuum, and/or may be forced at least partially into the porous matrix under pressure.

Examples of penetrating materials that may be selected for use include, but are not limited to, liquid resins, plastics, cements, sealants, binders or any other material suitable for at least partially penetrating the porous matrix of the selected particle to provide desired characteristics of strength/crush resistance, ASG, etc. It will be understood that selected combinations of any two or more such penetrating materials may also be employed, either in mixture or in sequential penetrating applications.

Examples of resins that may be employed as penetrating and/or coating materials include, but are not limited to, resins and/or plastics or any other suitable cement, sealant or binder that once placed at least partially within a selected particle may be crosslinked and/or cured to form a rigid or substantially rigid material within the porous structure of the particle. Specific examples of plastics include, but are not limited to, nylon, polyethylene, styrene, etc and combinations thereof. Suitable resins include phenol formaldehyde resins, melamine formaldehyde resins, and urethane resins, low volatile urethane resins, such as these and other types of resins available from Borden Chemical Inc., Santrol, Hepworth of England, epoxy resins and mixtures thereof. Specific examples of suitable resins include, but are not limited to, resins from Borden Chemical and identified as 500-series and 700-series resins (e.g., 569C, 794C, etc.). Further specific examples of resins include, but are not limited to, SIGMASET series low temperature curing urethane resins from Borden Chemical, such as SIGMASET, SIGMASET LV, SIGMASET XL, ALPHASET phenolic resin from Borden Chemical, OPTI-PROP phenolic resin from Santrol, and POLAR PROP low temperature curing resin from Santrol. Where desired, curing characteristics, such as curing time, may be adjusted to fit particular treatment methods and/or final product specifications by, for example, adjusting relative amounts of resin components. Still further examples of suitable resins and coating methods include, but are not limited to, those found in European Patent Application EP 0 771 935 A1. In addition, other examples of suitable resins and coating methods include those set forth in U.S. Pat. Nos. 4,869,960; 4,664,819; 4,518,039; 3,929,191; 3,659,651; and 5,422,183, each of the foregoing references being incorporated herein by reference in its entirety.

In one exemplary embodiment, a curable phenolic resin or other suitable curable material may be selected and applied as a coating material so that individual coated particles may be bonded together under downhole temperature, after the resin flows and crosslinks/cures downhole, such as to facilitate proppant pack/sand control particulate consolidation after placement.

Alternatively, a cured phenolic type resin coat or other suitable cured material may be selected to contribute additional strength to the particles and/or reduce in situ fines migration once placed in a subterranean formation. The degree of penetration of the coating or penetrating fluid into the porous particulate material may be limited by disconnected porosity, such as substantially impermeable or isolated porosity, within the interior matrix of the particulate.

This may either limit the extent of uniform penetration of penetrating material in a uniform manner toward the core, such as leaving a stratified particle cross section having outside penetrating layer with unpenetrated substantially spherical core, and/or may cause uneven penetration all the way to the core, such as bypassing "islands" of disconnected porosity but penetrating all the way to the core. In any event, a penetrating and/or coating material may trap or encapsulate air (or other fluid having ASG less than particle matrix and less than coating/penetrating material) within the disconnected porosity in order to reduce ASG by the desired amount. Such materials coat and/or penetrate the porous particulate without invading the porosity to effectively encapsulate the air within the porosity of the particle. Encapsulation of the air provides preservation of the ultra-lightweight character of the particles once placed in the transport fluid. If the resin coating or transport fluids were to significantly penetrate the porosity of the particle, the density increases accordingly, and the particle no longer has the same lightweight properties. The resin coat also adds strength and substantially enhances the proppant pack permeability at elevated stress.

Coating layers may be applied as desired to contribute to particle strength and/or reduce in situ fines migration once placed in a subterranean formation. The coating significantly increases the strength and crush resistance of the ultra-lightweight ceramic particle. In the case of natural sands the resin coat protects the particle from crushing, helps resist embedment, and prevents the liberation of fines.

The coating or penetrating fluid is typically selected to have an ASG less than the ASG of the porous particulate material so that once penetrated at least partially into the pores of the matrix it results in a particle having a ASG less than that of the porous particulate material prior to coating or penetration, i.e., filling the pore spaces of a porous particulate material results in a solid or substantially solid particle having a much reduced apparent density.

For example, the selected porous particulate material may be treated with a selected penetrating material in such a way that the resultant selectively configured porous particulate material has a much reduced ASG, such as having an ASG closer to or approaching the ASG of a carrier fluid so that it is neutrally buoyant or semi-buoyant in a fracturing fluid or sand control fluid.

Alternatively, a penetrating material may be selected so that it helps structurally support the matrix of the porous particulate material (i.e., increases the strength of the porous matrix) and increases the ability of the particulate to withstand the closure stresses of a hydraulic fractured formation, or other downhole stresses.

For example, a penetrating material may be selected by balancing the need for low ASG versus the desire for strength, i.e., a more dense material may provide much greater strength. In this regard, the inherent and/or induced porosity of the porous particulate material may be selected so as to help provide the desired balance between ASG and strength. It will be understood that other variable, such as downhole temperature and/or fluid conditions, may also impact the choice of penetrating materials.

The coating layer or penetrating material is generally present in the selectively configured porous particulate material in an amount of from about 0.5% to about 10% by weight of total weight. The thickness of the coating layer of the selectively configured porous particulate material is generally between from about 1 to about 5 microns. The extent of penetration of the penetrating material of the selectively configured porous particulate material is from less than about 1% penetration by volume to less than about 25% penetration by volume.

Especially preferred results are obtained when the porous particulate material is a porous ceramic particle having an ASG of 1.25 or less and untreated porosity is approximately 60%. Such materials may be treated with a coating material that does not penetrate the porous matrix of the porous particulate material, or that only partially penetrates the porous matrix of the ceramic particulate material. Such treated ceramic materials may have an ASG from about 1.1 to about 1.8 (alternatively from about 1.75 to about 2.0, and further alternatively about 1.9), a bulk ASG from about 1.03 to about 1.5, and a treated internal porosity from about 10% to about 75% volume. However, values outside these exemplary ranges are also possible.

As an example, a porous ceramic treated with about 6% epoxy has been seen to exhibit a bulk ASG of about 1.29 and a porosity of about 50.6%, a porous ceramic treated with about 8% epoxy exhibits a bulk ASG of about 1.34 and a porosity of about 46.9%, a porous ceramic treated with about 6% phenol formaldehyde resin exhibits a bulk ASG of about 1.32 and a porosity of about 51.8%, and a porous ceramic treated with about 8% phenol formaldehyde resin exhibits a bulk ASG of about 1.20 and a porosity of about 54.1%.

In this embodiment, a coating material or penetrating material may be selected to be present in an amount of from about 0.5% to about 10% by weight of total weight of individual particles. When present, thickness of a coating material may be selected to be from about 1 to about 5 microns on the exterior of a particle. When present, extent of penetration penetrating material into a porous material particle may be selected to be from less than about 1% penetration by volume to less than about 25% penetration by volume of the particle. It will be understood that coating amounts, coating thickness, and penetration amounts may be outside these exemplary ranges as well.

Further, the porous particulate material may be at least partially selectively configured by glazing, such as, for example, surface glazing with one or more selected non-porous glaze materials. In such a case, the glaze, like the coating or penetrating material, may extend or penetrate at least partially into the porous matrix of the porous particulate material, depending on the glazing method employed and/or the permeability (i.e., connectivity of internal porosity) characteristics of the selected porous particulate material, such as non-connected porosity allowing substantially no penetration to occur. For example, a selected porous particulate material may be selectively configured, such as glazed and/or coated with a non-porous material, in a manner so that the porous matrix of the resulting particle is at least partially or completely filled with air or some other gas, i.e., the interior of the resulting particle includes only air/gas and the structural material forming and surrounding the pores. Once again, the inherent and/or induced porosity of a porous material particle may be selected so as to help provide the desired balance between apparent density and strength, and glazing and/or coating with no penetration (or extension of configured area into the particle matrix) may be selected to result in a particle having all or substantially all porosity of the particle being unpenetrated and encapsulated to trap air or other relatively lightweight fluid so as to achieve minimum ASG. In addition to sealing a particle, such as to seal air/gas within the porous matrix of the particle, such selective configuration, such as using glazing and/or coating materials, may be selected to provide other advantages.

In a preferred embodiment, the porous particulate material, such as the above-described fired kaolinitic particles, is manufactured by using a glaze-forming material to form a glaze to seal or otherwise alter the permeability of the particle surface, so that a given particle is less susceptible to invasion or saturation by a well treatment fluid and thus capable of retaining relatively lightweight or substantially neutrally buoyant characteristics relative to the well treatment fluid upon exposure to such fluid. Such glazing may be accomplished using any suitable method for forming a glaze on the surface or in the near surface of a particle, including by incorporating a glaze-forming material into the raw material "green paste" that is then formed such as molded into shape of the particle prior to firing. Those skilled in the art recognize that glazes may be made from a variety of methods, including the application of a smooth, glassy coating such that a hard, nonporous surface is formed. Glazes may be formed from powdered glass with oxides. The mixture of powders is suspended in water and applied to the substrate. The glaze can be dried and then fixed onto the substrate by firing or similar process known to those skilled in the art. Additionally, the use of borates or similar additives may improve the glaze.

Examples of such glaze-forming materials include, but are not limited to, materials such as magnesium oxide-based material, boric acid/boric oxide-based material, etc. During firing, the glaze-forming material/s "bloom" to the surface of the particles and form a glaze. Alternatively, glazing may be accomplished, for example, by applying a suitable glaze-forming material onto the surface of the formed raw material or "green" particles prior to firing such as by spraying, dipping, and similar methods so that glazing occurs during particle firing. Further alternatively, a glaze-forming material may be applied to a fired ceramic particle, and then fired again in a separate glaze-forming step. In one embodiment, the glaze forms a relatively hard and relatively non-porous surface during firing of the particles.

Advantages of such a glazing treatment include maintaining the relatively low apparent density of a relatively lightweight porous particle without the necessity of further alteration, such as necessity of coating with a separate polymer coating although optional coatings may be applied if so desired. Furthermore, the resulting relatively smooth glazed surface of such a particle also may serve to enhance the ease of multi phase fluid flow, such as flow of water and gas and oil, through a particulate pack, such as through a proppant pack in a fracture, resulting in increased fracture conductivity.

It will be understood that the characteristics of glazing materials, penetrating materials and/or coating materials given herein, such as composition, amounts, types, are exemplary only. In this regard, such characteristics may be selected with benefit of this disclosure by those of skill in the art to meet and withstand anticipated downhole conditions of a given application using methods known in the art, such as those described herein.

Examples of suitable porous material particulates that may be selected for use in aqueous based carrier fluids include, but are not limited to porous ceramics, porous polymeric materials or any other porous material or combinations thereof suitable for selection for combination of internal porosity and permeability to achieve desired properties, such as strength and/or ASG, for particular downhole conditions and/or well treatment applications as described elsewhere herein. For example, porous ceramic particles may be manufactured by firing at relatively low temperatures to avoid loss of porosity due to crystallization and driving off of water. Particular examples include, but are not limited to, porous ceramic particles available from Carbo Ceramics Inc. of Irving, Tex. composed of fired kaolinitic clay that is fired at relatively low temperature of about 1235° F. or about 1300° F. (or about 700° C. and that has trace amounts of components such as cristobalite, mullite and opalite), polyolefin particles, and similar components.

Well Treating Aggregates

The relatively lightweight particulates may further comprise a multitude of aggregated components bonded together. Such aggregates may consist of at least one organic lightweight material and at least one weight modifying agent. The ASG of the organic lightweight material is either greater than or less than the ASG of the well treating aggregate. Such aggregates facilitate improved placement of the proppant within the fracture while minimizing settling, thereby enhancing fracture conductivity. The aggregates are particularly effective in reducing fines generation as a result of closure stress applied on the proppant pack. In addition, the aggregates are effective in reducing particulate production.

The weight modifying agent may be a weighting agent having a higher ASG than the organic lightweight material. The presence of the weighting agent renders a well treating aggregate having a ASG greater than the ASG of the organic lightweight material. Alternatively, the weight modifying agent may be a weight reducing agent having a lower ASG than the organic lightweight material. The presence of the weight reducing agent renders a well treating aggregate having a ASG less than the ASG of the organic lightweight material.

The aggregates are comprised of a continuous phase composed of the organic lightweight material and a discontinuous phase composed of a weight modifying material. The volume ratio of resin (continuous phase) to weight modifying agent (discontinuous phase) is approximately 75:25. The aggregate particle diameter is approximately 850 microns. The average diameter of the weight modifying agent particulates is approximately 50 microns.

The compressive strength of the aggregate is greater than the compressive strength of the organic lightweight material. When hardened, the aggregate exhibits a strength or hardness to prevent deformation at temperatures and/or formation closure stresses where substantially deformable materials generally become plastic and soften.

In a preferred embodiment, the weight modifying agent is selected so as to modify or customize the ASG of the aggregate in order to impart to the aggregate the desired ASG. For example, the organic lightweight material may be treated with a weight modifying agent in such a way that the aggregate has a ASG close to the ASG of the carrier fluid so that it is neutrally buoyant or semi-buoyant in a fracturing fluid or sand control fluid.

Alternatively, the weight modifying material may be selected so that the aggregate has the structural support and strength to withstand the closure stresses of a hydraulic fractured formation, or other downhole stresses.

The amount of weight modifying agent in the well treating aggregate is such as to impart to the well treating aggregate the desired ASG. Typically, the amount of weight modifying agent in the well treating aggregate is between from about 15 to about 85 percent by volume of the well treating aggregate, most preferably approximately about 52 percent by volume.

The particle sizes of the weight modifying agent are preferably between from about 10 to about 200 microns.

The organic lightweight material is preferably a polymeric material, such as a thermosetting resin, including polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin. The ASG of the organic lightweight material generally less than or equal to 1.1. In a preferred embodiment, the ASG of the material is between about 0.7 to about 0.8.

The amount of organic lightweight material in the aggregate is generally between from about 10 to about 90 percent by volume. The volume ratio of organic lightweight material: weight modifying agent in the aggregate is generally between from about 20:80 to about 85:15, most preferably about 25:75. As an example, using an organic lightweight material having an ASG of 0.7 and a weight modifying agent, such as silica, having an ASG of 2.7, a 20:80 volume ratio would render an aggregate ASG of 2.20 and a 85:15 volume ratio would render an ASG of 1.0; a 75:25 volume ratio would render an ASG of 1.20.

In a preferred mode, the ASG of the well treating aggregate is at least about 0.35. In a most preferred mode, the ASG of the well treating aggregate is at least about 0.70, more preferably 1.0, but not greater than about 2.0.

The weight modifying agent may be sand, glass, hematite, silica, sand, fly ash, aluminosilicate, and an alkali metal salt or trimanganese tetraoxide. In a preferred embodiment, the weight modifying agent is selected from finely ground sand, glass powder, glass spheres, glass beads, glass bubbles, ground glass, glass bubbles, borosilicate glass or fiberglass. Further, the weight modifying agent may be a cation selected from alkali metal, alkaline earth metal, ammonium, manganese, and zinc and an anion selected from a halide, oxide, a carbonate, nitrate, sulfate, acetate and formate. For instance, the weight modifying agent may include calcium carbonate, potassium chloride, sodium chloride, sodium bromide, calcium chloride, barium sulfate, calcium bromide, zinc bromide, zinc formate, zinc oxide or a mixture thereof.

Glass bubbles and fly ash are the preferred components for the weight reducing agent.

The aggregates are generally prepared by blending the organic lightweight material with weight modifying agent for a sufficient time in order to form a slurry or a mud which is then formed into sized particles. Such particles are then hardened by curing at temperatures ranging from about room temperature to about 200° C., preferably from about 50 to about 150° C. until the weight modifying agent hardens around the organic lightweight material.

In a preferred mode, the organic lightweight material forms a continuous phase; the weight modifying forming a discontinuous phase.

The ASG of the well treating aggregate is generally less than or equal to 2.0, preferably less than or equal to 1.5, to meet the pumping and/or downhole formation conditions of a particular application, such as hydraulic fracturing treatment, sand control treatment.

Further, the aggregates exhibit a Young's modulus of between about 500 psi and about 2,000,000 psi at formation conditions, more typically between about 5,000 psi and about 500,000 psi, more typically between about 5,000 psi and 200,000 psi at formation conditions, and most typically between about 7,000 and 150,000 psi at formation conditions. The Young's modulus of the aggregate is substantially higher than the Young's modulus of the organic lightweight material or the weighting agent.

In one embodiment, such a material may be employed as proppant/sand control particulate material at temperatures up to about 250° F., and closure stresses up to about 8000 psi. However, these ranges of temperature and closure stress are exemplary only, it being understood that the disclosed materials may be employed as proppant/sand control materials at temperatures greater than about 250° F. and/or at closure stresses greater than about 8000 psi.

In a preferred embodiment the relatively lightweight proppant or particulates are suspended in a carrier fluid and introduced into the subterranean formation at a pressure above a fracturing pressure of the subterranean formation. In this method, at least a portion of the individual particles of the particulate material are substantially neutrally buoyant in the carrier fluid.

Further, the relatively lightweight and/or substantially neutrally buoyant proppant or particulate is used in a sand control method for a wellbore penetrating a subterranean formation and may be introduced into the wellbore in a slurry with a carrier fluid; the particulate material being placed adjacent the subterranean formation to form a fluid-permeable pack that is capable of reducing or substantially preventing the passage of formation particles from the subterranean formation into the wellbore while at the same time allowing passage of formation fluids from the subterranean formation into the wellbore. In this method at least a portion of the individual particles of the particulate material may be substantially neutrally buoyant in the carrier fluid.

When employed in well treatments, the relatively lightweight and/or substantially neutrally buoyant particulates may be introduced into the wellbore at any concentration deemed suitable or effective for the downhole conditions to be encountered. For example, a well treatment fluid may include a suspension of proppant or sand control aggregates. Alternatively, it is possible that a well treatment fluid may include a suspension that contains a mixture of any of the above referenced relatively lightweight and/or substantially neutrally buoyant particulates or a mixture of any of the above referenced relatively lightweight and/or substantially neutrally buoyant particulates and conventional fracture proppant or sand control particulates, such as sand.

When used in hydraulic fracturing, a suspension of relatively lightweight and/or substantially neutrally buoyant particulates in a carrier fluid may be injected into a subterranean formation in conjunction with a hydraulic fracturing treatment or other treatment at pressures sufficiently high enough to cause the formation or enlargement of fractures or to otherwise expose the aggregates to formation closure stress. Such other treatments may be near wellbore in nature (affecting near wellbore regions) and may be directed toward improving wellbore productivity and/or controlling the production of fracture proppant or formation sand. Particular examples include gravel packing and frac-packs. Moreover, such aggregates may be employed alone as a fracture proppant/sand control particulate, or in mixtures in amounts and with types of fracture proppant/sand control materials, such as conventional fracture or sand control particulate.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the relatively lightweight and/or substantially neutrally buoyant particulates and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of the relatively lightweight and/or substantially neutrally buoyant particulates. In the latter case, the balance of the particulate material of the slurry may be another material, such as a conventional gravel pack or sand control particulate.

As an alternative to use of a screen, the sand control method may use the relatively lightweight and/or substantially neutrally buoyant particulates in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

The relatively lightweight and/or substantially neutrally buoyant particulate may be formed from materials that are chipped, ground, crushed, or otherwise processed to produce particulate material having any particle size or particle shape suitable for use in the methods disclosed herein. In one exemplary embodiment, particle sizes include, but are not limited to, sizes ranging from about 4 mesh to about 200 mesh, alternatively from about 12 mesh to about 50 mesh. In another exemplary embodiment, particle sizes include, but are not limited to, sizes ranging from about 8 mesh to about 40 mesh, alternatively from about 14 mesh to about 40 mesh, alternatively from about 16 mesh to about 40 mesh, alternatively from about 20 mesh to about 30 mesh. Shapes of such particles may vary, but in one embodiment may be utilized in shapes having maximum length-based aspect ratio values as described elsewhere herein for particles, and in one embodiment may have a maximum length-based aspect ratio of less than or equal to about 5. Once again, the preceding ranges of values are exemplary only, and values outside these ranges are also possible.

Particle size of the disclosed particulate materials may be selected based on factors such as anticipated downhole conditions and/or on relative strength or hardness of the particulate material/s selected for use in a given application. In this regard, larger particle sizes may be more desirable in situations where a relatively lower strength particulate material is employed. For example, 12/20 mesh ground walnut hulls may be desirable for use where closure stresses of up to about 1500 psi are anticipated. Smaller particle sizes may be more desirable in situations where a relatively higher strength particulate material is employed. For example 20/40 mesh ground walnut hulls treated with a modifying agent described elsewhere herein may be desirable for use where closure stresses of up to about 3000 psi, alternatively up to about 4000 psi are anticipated.

Type/s of particulate materials for use as a particulate as disclosed herein may also be selected based on factors such as anticipated downhole conditions. In one exemplary embodiment, walnut hull-based particulates may be desirable for use where downhole temperatures of up to about 200° F. are anticipated, and apricot pit-based particulates may be desirable for use where downhole temperatures of up to about 250° F., alternatively of up to about 275° F. are anticipated. However, it will be understood that walnut hull-based materials may also be employed at temperatures greater than about 200° F., and apricot pit-based materials may be employed at temperatures greater than about 275° F. In this regard, type/s of particulate materials may be selected with benefit of this disclosure for use in a given application by those of skill in the art to meet requirements of a given application, (e.g., including to withstand anticipated downhole conditions), for example, using one or more testing methods such as those disclosed elsewhere herein. Furthermore, given particulate material/s may be treated (e.g., exposed to a modifying agent, coated with protective and/or hardening layers, etc.) so as to render a given particulate material suitable for the requirements of a given application.

In another disclosed embodiment, blends of two or more different types of relatively lightweight particulates having different characteristics, such as different porosity, permeability, ASG or setting velocity in the carrier fluid, may be employed in well treatment. Such blends may be further employed in any type of well treatment application, including in any of the well treatment methods described elsewhere herein. In one exemplary embodiment, such blends may be employed to optimize hydraulic fracture geometries to achieve enhanced well productivity. Choice of different materials and amounts thereof to employ in such blends may be made based on one or more well treatment considerations including, but not limited to, objective/s of well treatment, such as for sand control and/or for creation of propped fractures, well treatment fluid characteristics, such as ASG and/or rheology of carrier fluid, well and formation conditions such as depth of formation, formation porosity/permeability, formation closure stress, type of optimization desired for geometry of downhole-placed particulates such as optimized fracture pack propped length, optimized sand control pack height, optimized fracture pack and/or sand control pack conductivity and combinations thereof. Such different types of aggregates may be selected, for example, to achieve a blend of different ASGs relative to the selected carrier fluid.

In one exemplary embodiment, selected blends of conventional sand proppant, relatively lightweight particulates of ground or crushed nut shells at least partially surrounded by at least one layer component of protective or hardening coating, and selectively configured porous materials such as relatively lightweight porous material fired kaolinitic particles treated with a penetrating/coating materials described herein may be employed in a hydraulic fracture treatment utilizing ungelled or weakly gelled carrier fluid. In such an embodiment, these different types of particles may be employed in any relative volume or weight amount or ratio suitable for achieving desired well treatment results.

In another specific example, these different types of particles may be employed in a well treatment particulate composition including about ⅓ by weight of conventional sand proppant by total weight of well treatment particulate, about ⅓ by weight of relatively lightweight particulate, such as core of ground or crushed nut shells at least partially surrounded by at least one layer component of protective or hardening coating) by total weight of well treatment particulate, and about ⅓ by weight of selectively configured relatively lightweight porous material, such as fired kaolinitic particles treated with a penetrating/coating materials described herein, by total weight of well treatment particulate. It will be understood that the foregoing relative amounts are exemplary only and may be varied, for example, to achieve desired results and/or to meet cost objectives of a given treatment. It will also be understood that the disclosed methods and compositions may also be practiced with such blends using other types of relatively lightweight particulate materials as described elsewhere herein, such as porous polymeric materials, such as polyolefins, styrene-divinylbenzene based materials, polyalkylacrylate esters and modified starches. Further, any of the disclosed porous materials may be employed in "neat" or non-altered form in the disclosed blends where apparent density and other characteristics of the particle are suitable to meet requirements of the given well treating application.

A suspension of the relatively lightweight proppant in a carrier may serve as a storable aqueous pumpable suspension when the relatively lightweight proppant is substantially neutrally buoyant. Such suspensions exhibit sufficient suspension stability for short to moderate term storage. Such suspensions may then be pumped or placed downhole as is or diluted on the fly. The relatively lightweight proppant is preferably a ULW proppant.

The carrier fluid has an ASG substantially equal to the ASG of the substantially neutrally buoyant particulate. The relatively lightweight particulate is preferably suspended in either a weighted carrier fluid or a weakly gelled carrier fluid or a combination of thereof. The carrier fluid may be weighted by the addition of a salt, such as sodium chloride, potassium chloride, etc.

The ASG of the relatively lightweight particulate is preferably the same as, but no greater than 0.25 higher than, the ASG of the carrier fluid; preferably the ASG of the relatively lightweight particulate is no greater than 0.20 higher than the ASG of the carrier fluid. For example, LiteProp™ 125 lightweight proppant, a product of BJ Services Company, having an ASG of 1.25 is neutrally buoyant in a 10.4 lb/gal (ppg) brine and is easily suspended in such brine. As such, the particulate is used to weight the suspension fluid. A brine lower in ASG than the particulate and having slight viscosity could be employed.

When suspended in a weakly gelled carrier fluid, the carrier fluid may further contain a friction reducing agent, the amount of friction reducing agent being between from about 0 to about 10 pounds per thousand gallons of carrier fluid. Suitable friction reducing agents include guar, hydroxypropyl guar, acrylamides including acrylamide copolymers, aliphatic alcohols, aliphatic acids, aliphatic amines, aliphatic amides, and alkoxylated alkanolamides.

The weakly gelled carrier fluid further is slightly viscosified by common low cost gelling agent and typically exhibits a viscosity of from about 1 to about 20 cps, preferably from about 1 to about 10 cps.

The carrier fluid preferably may further contain a suspending or thixotropic agent. Suitable suspending/thixotropic agents include welan gum, xanthan gum, cellulose and cellulosic derivatives such as hydroxyethyl dellulose (HEC), carboxymethyl-hydroxyethyl-cellulose, guar and its derivatives, starch and polysaccharides, succinoglycan, polyalkylene oxides such as polyethylene oxide, bentonite, attapulgite, mixed metal hydroxides, clays such as bentonite and attapulgite, mixed metal hydroxides, oil in water emulsions created with paraffin oil and stabilized with ethoxylated surfactants, poly(methyl vinyl ether/maleic anhydride) decadiene copolymer, etc.

The preferred suspending agent is either carrageenan or scleroglucan. Carrageenan, a high molecular weight polysaccharide derived from seaweed, and scleroglucan, a water soluble natural polymer produced by fermentation of the filamentous fungi *Sclerotium rofsii*, provide better stability and minimize the risk of settling.

Although any carrageenan suitable for forming gels and/or otherwise acting as a suspension agent may be employed (including those carrageenans having a molecular weight greater than about 500,000 and less than about 75,000), typically a carrageenan has a molecular weight of between about 75,000 and about 500,000. (Unless otherwise noted, all molecular weights expressed herein refer to weight average molecular weight.) More typically, the carrageenan has a molecular weight of between about 150,000 and about 250,000, and even more typically a carrageenan has a molecular weight of about 200,000. Specific carrageenan types include kappa, iota and lambda carrageenans. Typically, iota carrageenan is employed. Mixtures of carrageenan types are also possible. A specific example of a suitable iota carrageenan for use in the disclosed method is "LSS-1" from BJ Services Company. Other suitable carrageenans include carrageenan gums and are disclosed in U.S. Pat. No. 6,173,778, herein incorporated by reference.

Some iota carrageenan materials may require heating to above the solubility temperature to achieve hydration, for example to about 80° C. In other cases, an iota carrageenan material may be hydrated without prior heating especially in the presence of sodium ions. Examples of such iota carrageenan materials include "cold water soluble" iota carrageenans, which are soluble at temperatures of about 20° C. without prior heating as long as sodium is present, such as in the form of sodium hydroxide or sodium carbonate.

Further preferred as the suspending agent for use in the invention are scleroglucans including scleroglucan gums. Suitable scleroglucan gums include those commercially available as Biovis, a product of SKW. Specific examples of suspending agents useful for the purposes of the present invention include such polysaccharides as welan gums "BIO-ZAN", Kelco, San Diego, Calif., polyanionic cellulose "DRISPAC", Drilling Specialties, Bartlesville, Okla., succinoglycan "SHELLFLO-S", Shell International Chemical Co., Ltd., London, England; polyethylene oxide "POLYOX PEO"; and mixed metal hydroxides "POLYVIS", SKW, Trostberg, Germany.

The amount of suspending agent used in the storable slurry ranges from about 0.025 to about 1.0 weight percent of the suspension.

The carrier fluid may further contain a gelling agent, crosslinking agent, gel breaker, surfactant, biocide, surface tension reducing agent, foaming agent, defoaming agent, demulsifier, non-emulsifier, scale inhibitor, gas hydrate inhibitor, polymer specific enzyme breaker, oxidative breaker, buffer, clay stabilizer, acid or a mixture thereof and other well treatment additives known in the art. The addition of such additives to the carrier fluids minimizes the need for additional pumps required to add such materials on the fly.

Figure 3:
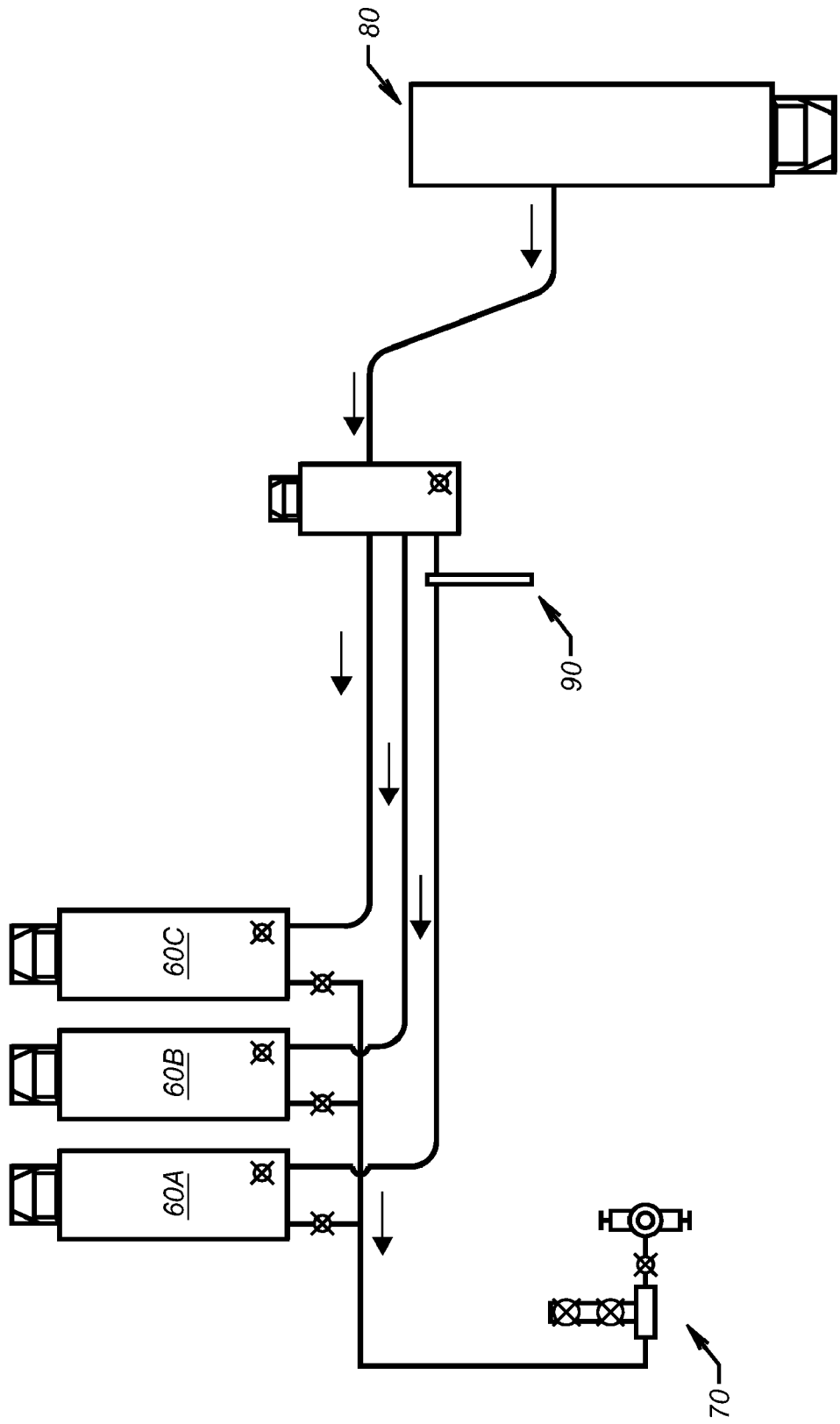
FIG. 3 exemplifies the base equipment for a hydraulic fracturing treatment using a pre-slurried relatively lightweight proppant stored in accordance with the invention.

As set forth in FIG. 3, use of a storable pumpable suspension offers significant operational, logistical and economic advantages. First, the slurries may be pre-mixed at a remote site and transported to location. Alternatively, the slurry could be mixed on location prior to treatment.

Further, the use of a relatively lightweight particulate containing slurry eliminates the need for a slurry blender, as well as fluid mixing unit, on location since a simple configuration of metering valves and a pump would allow the neat slurry to be diluted in-line with water to the desired concentration. As set forth in FIG. 3, a prototypical set-up may consist of storable suspension storage unit 80. At least one high pressure pump, shown as a series of pumps 60A, 60B and 60C, serve to inject the pre-slurry into wellhead 70. Transfer pump 90, optionally with proportioning capabilities, may be used to assist in the transport of the pumpable slurry into the wellhead via high pressure pumps 60A, 60B and 60c. The mixing equipment need only include such equipment that is capable of (a) mixing the brine (dissolving soluble salts), and (b) homogeneously dispersing in the substantially neutrally buoyant particulate material.

Figure 4:
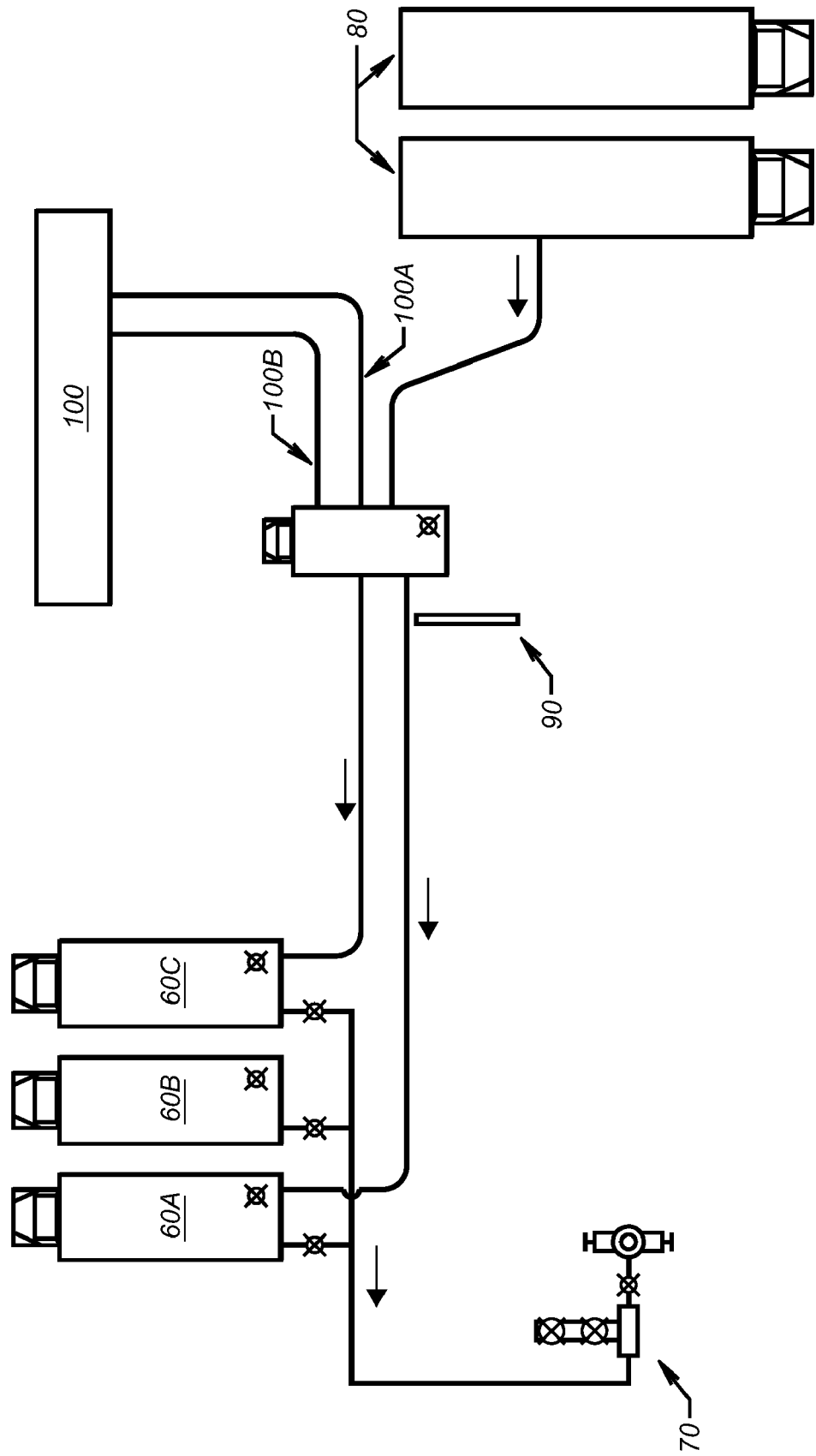
FIG. 4 exemplifies alternative base equipment with water storage for dilution for use in a hydraulic fracturing treatment using a pre-slurried relatively lightweight proppant stored in accordance with the invention.

In FIG. 4, water storage unit 100 may contain egress lines 100A and 100B for proportioning with dilution fluid inline to the stored slurry, thus enabling extremely accurate ramping. The proportional slurry is then directed to the high pressure pumps for injection into the well.

Thus, the use of relatively lightweight and/or substantially neutrally buoyant particles in accordance with the invention eliminates the need for a fracturing blender on location; the more simpler configuration of metering valves and pumps allowing the pumpable slurry to be diluted in-line to the desired concentration. A further benefit is the improved control of concentrations of proppants, especially since liquids are more accurately metered than solids.

The elimination of equipment on location has several economic advantages in that it saves on equipment costs and, in areas where job location space is at a premium, such as at mountainside locations, wells that were previously incapable of being stimulated become realistic targets. Further, the suspension of the invention provides the opportunity to pump the slurry concentrate from a transport located some distance from the well location versus conventional systems which require proppant transport near the blender and wellhead.

EXAMPLES

The following examples are illustrative and should not be construed as limiting the scope of the invention or claims thereof.

Example 1

Conductivity tests were performed according to API RP 61 ($1^{st}$ Revision, Oct. 1, 1989) using an API conductivity cell with Ohio sandstone wafer side inserts. Each particulate material sample was loaded into the cell and closure stress applied to the particulate material using a "DAKE" hydraulic press having a "ROSEMOUNT" differential transducer (#3051C) and controlled by a "CAMILE" controller. Also employed in the testing was a "CONSTAMETRIC 3200" constant rate pump which was used to flow deionized water through each particulate sample.

The coated ground walnut particulate material employed was ground walnut hulls from "COMPOSITION MATERIALS, INC." having a size of about 12/20 mesh and having an in situ Young's modulus of from about 1,000,000 psi to about 2,000,000 psi. The ground walnut particulate material was coated with a layer of BORDEN "SIGMASET LV" low volatility resin in an amount of about 12% by weight of total particulate weight, and the particles were manufactured by "BORDEN CHEMICAL". The coated ground walnut particulate material was tested alone, with no other particulate material blended in. It will be understood with benefit of this disclosure that other particles having a similar modulus described elsewhere herein (e.g., ground or crushed nut shells, ground or crushed seeds, etc.) may also be employed in such applications as the sole proppant or sand control particulate component of a fracturing fluid, frac pack composition, or sand control blend.

Experimental parameters for the coated walnut shell conductivity evaluation are shown in Tables I-III below.

TABLE I

| Fluid | Deionized Water |
|---|---|
| Particulate (grams) | 63 |
| Top Core (cm) | 0.91 |
| Bot Core (cm) | 0.968 |
| Initial Total Width (cm) | 5.462 |
| Width Pack, initial (cm) | 1.134 |

TABLE II

| Temperature | 150 | Particulate Size | 12/20 |
|---|---|---|---|
| Closure Pressure | 500-2000 psi | Concentration | 2 lbs/ft2 |
| Fluid Pressure (psi) | 387 | Baseline | 238 Darcies |
|  |  | @ | 1000 psi |

TABLE III

| Test Data *Time (Hours) | Temp °C. | Water Rate mls/min | Viscosity cp | DP psi | Width inches | Conductivity md-ft | Permeability darcies | Closure Stress psi |
|---|---|---|---|---|---|---|---|---|
| 0 | 68.45 | 7.89 | 0.41 | 0.00386 | 0.433 | 22,608 | 626 | 524 |
| 10 | 65.20 | 16.27 | 0.43 | 0.01195 | 0.427 | 15,756 | 442 | 456 |
| 20 | 65.19 | 7.73 | 0.43 | 0.00613 | 0.406 | 14,585 | 432 | 1001 |
| 30 | 65.15 | 7.80 | 0.43 | 0.01445 | 0.355 | 6,251 | 211 | 2029 |
| 40 | 65.21 | 7.87 | 0.43 | 0.01469 | 0.351 | 6,203 | 212 | 2019 |
| 50 | 65.21 | 7.82 | 0.43 | 0.01483 | 0.348 | 6,106 | 211 | 2021 |
| 70 | 65.22 | 7.79 | 0.43 | 0.01516 | 0.346 | 5,947 | 206 | 2021 |

*Values given represent an average of an hour's data at each given point.

As may be seen from the results of this example, a relatively lightweight particulate that is substantially neutrally buoyant in a 10 pound per gallon brine, may advantageously be employed to yield a proppant pack having relatively good conductivity. At 1,000 psi closure stress, the pack of relatively lightweight proppant material exhibited permeabilities equal to or exceeding any of the conventional proppants (sand, etc.).

Example 2

Using a procedure similar to that of Example 1, the same type of 12/20 mesh ground walnut hull core material was tested with different types of resin layers from BORDEN. Testing was carried out for all samples at 150° F. and closure stresses ranging from 500 psi to 2000 psi. For two of samples, testing was also carried out at 200° F. and closure stress of 2200 psi. Resin type and amounts used in each sample are identified in Table IV. Results of this testing is given in Tables V and VI, and in FIGS. 5 and 6.

TABLE IV

BORDEN Resin Layers on 12/20 Mesh Ground Walnut Shell Material

| Sample Identifier | Layer Type and Amount (% by Weight of Total Weight of Particle)* |
|---|---|
| A | Inner layer of 2% by weight BORDEN "2AC" with Outer Layer of 4% by weight BORDEN "SIGMASET LV" |
| B | Layer of 6% by weight BORDEN "SIGMASET LV" resin (Coated particles having Borden identification code "66040") |
| C | Layer of 6% by weight BORDEN "SIGMASET LV" resin (Coated particles having Borden identification code "66535") |
| D | BORDEN Two Coat Resin - Inner layer of 2% by weight separate hardener material and outer layer of 3% by weight "SIGMASET LV" (Coated particles having Borden identification code "2PN3x") |
| E | Layer of 12% by weight BORDEN "SIGMASET LV" |

*In Table IV, BORDEN product identification codes 66040 and 66535 denote particles coated with "SIGMASET LV" resin having modified curing characteristics, i.e., the first digit in the code represents the % by weight of resin applied as a percentage of total particle weight (e.g., 6%), the second and third digits in the code represent weight percentage of the first resin component (e.g., 60% and 65% respectively), and the fourth and fifth digits represent weight percentage of the second resin component (e.g., 40% and 35% respectively).

TABLE V

Permeability, Darcies

| Closure Stress, psi | Sample A | Sample B | Sample C | Sample D | Sample E |
|---|---|---|---|---|---|
| 500 | 453 | 205 | 383 | 429 | 432 |
| 1000 | 303 | 146 | 200 | 153 | 319 |
| 2000 | 220 | 46 | 94 | 88 | 206 |
|  | 105 |  |  |  | 76 |

TABLE VI

Cell Width, Inches

| Closure Stress, psi | Sample A | Sample B | Sample C | Sample D | Sample E |
|---|---|---|---|---|---|
| 500 | 0.43 | 0.43 | 0.41 | 0.41 | 0.43 |
| 1000 | 0.41 | 0.4 | 0.38 | 0.39 | 0.406 |
| 2000 | 0.36 | 0.345 | 0.3 | 0.35 | 0.35 |
| 2200 | 0.32 |  |  |  | 0.299 |

Figure 5:
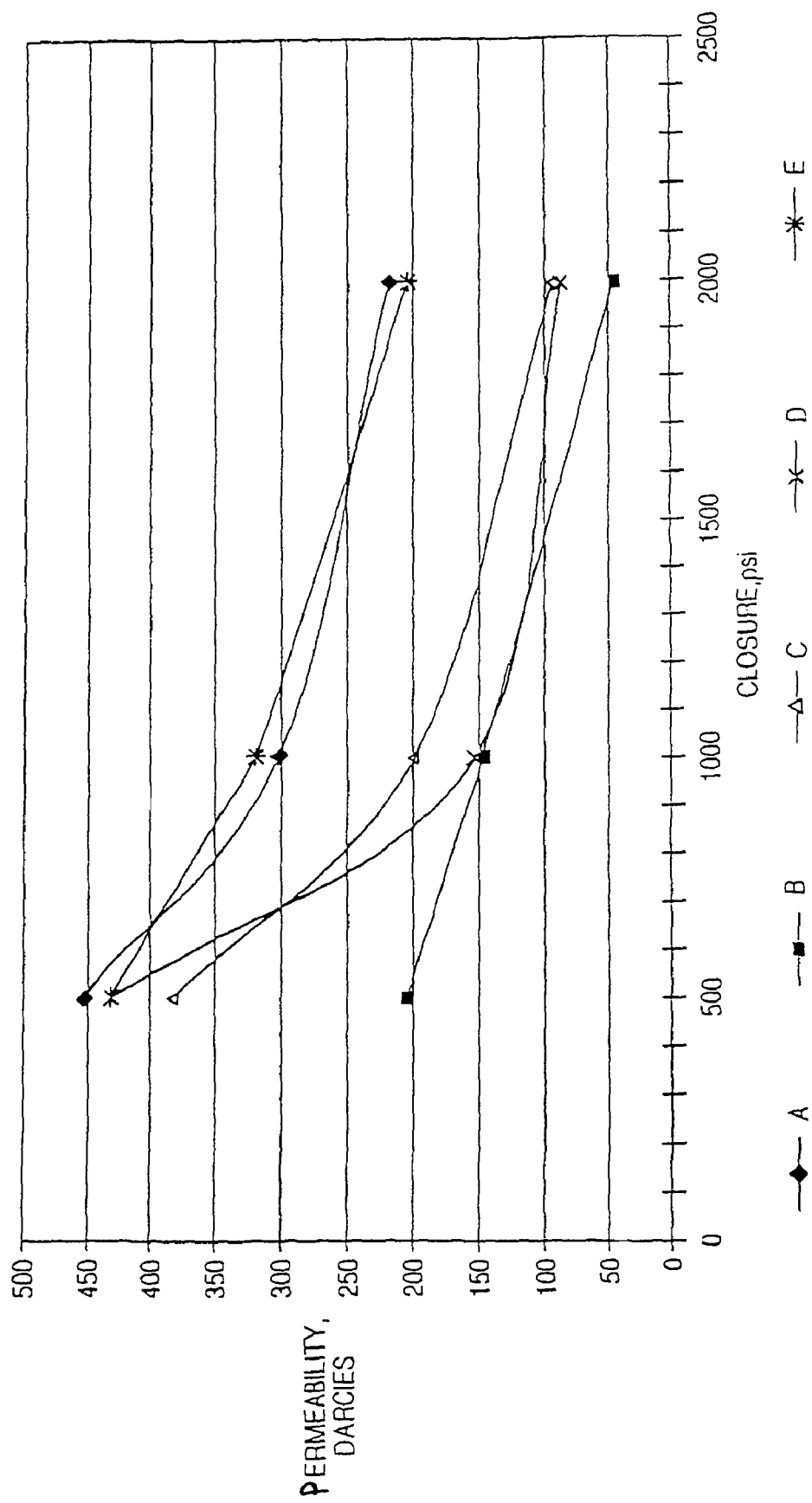
FIG. 5 shows permeability versus closure stress for particulate according to one embodiment of the disclosed method.

FIG. 5 shows the permeability of the relatively lightweight particulate core materials having the various types of resin layers of this example at 500, 1000 and 2000 psi closure stresses and 150° F.

Figure 6:
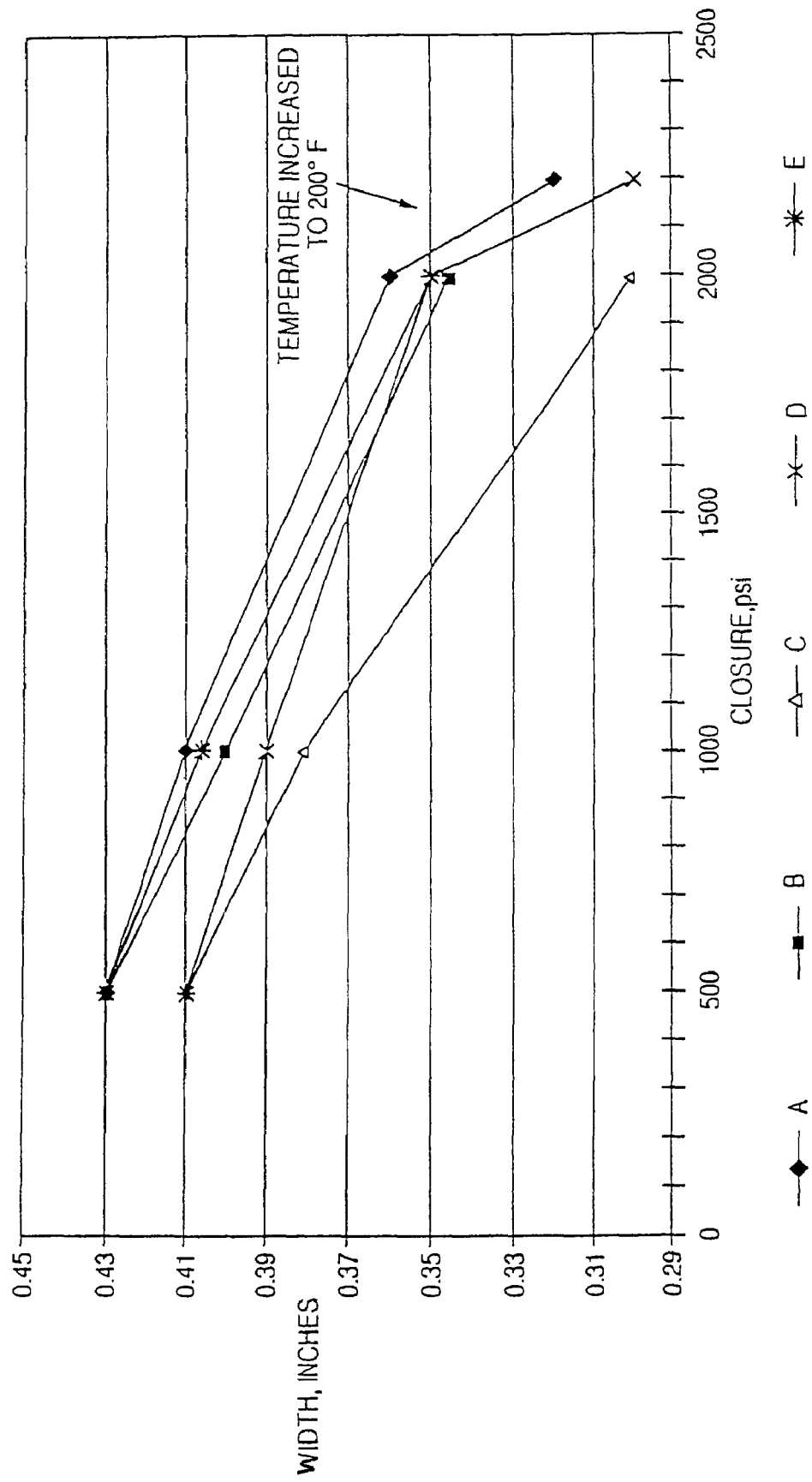
FIG. 6 shows cell width versus closure stress for particulate according to one embodiment of the disclosed method.

FIG. 6 shows pack or conductivity cell width of the relatively lightweight particulate core materials having the various types of resin layers of this example at 500, 1000 and 2000 psi closure stresses and 150° F. Also shown is cell or pack width of the relatively lightweight particulate materials Samples A and E at 2200 psi closure stress and 200° F.

The results of Examples 1 and 2 illustrate just one way that relatively lightweight particulate core materials may be evaluated with various types and/or amounts of resins to fit particular conditions, for example, anticipated wellbore or formation conditions. With benefit of this disclosure, those of skill in the art will understand that using this or other methods known in the are suitable for simulating anticipated downhole conditions, types of relatively lightweight material core materials and coatings (or combinations of two or more coatings) may be selected or tailored for use in a give desired application.

Example 3

Using a procedure similar to that of Example 1, conductivity tests were performed on three different samples of 12/20 mesh ground walnut shells at 150° F. and at a concentration of 1 lb/ft$^2$: Sample A (treated with inner layer of phenol formaldehyde resin and outer layer of urethane epoxy resin); Sample B (soaked for 4 hours at room temperature in FSA-1 siloxane-based compound); and Sample C (spray treated with FSA-1 in an amount of 26% by weight of the ground walnut hull material). The particles of Samples A and C were manufactured by FRITZ, while the particles of Sample B were manufactured in the laboratory. Results of this testing is shown in Table VII and FIG. 7.

TABLE VII

| Closure Stress, psi | Permeability, Darcies | | |
|---|---|---|---|
| | Sample A | Sample B | Sample C |
| 1000 | 91 | 240 | 250 |
| 2000 | 86 | 170 | 120 |
| 3000 | 30 | 100 | 80 |

Figure 7:
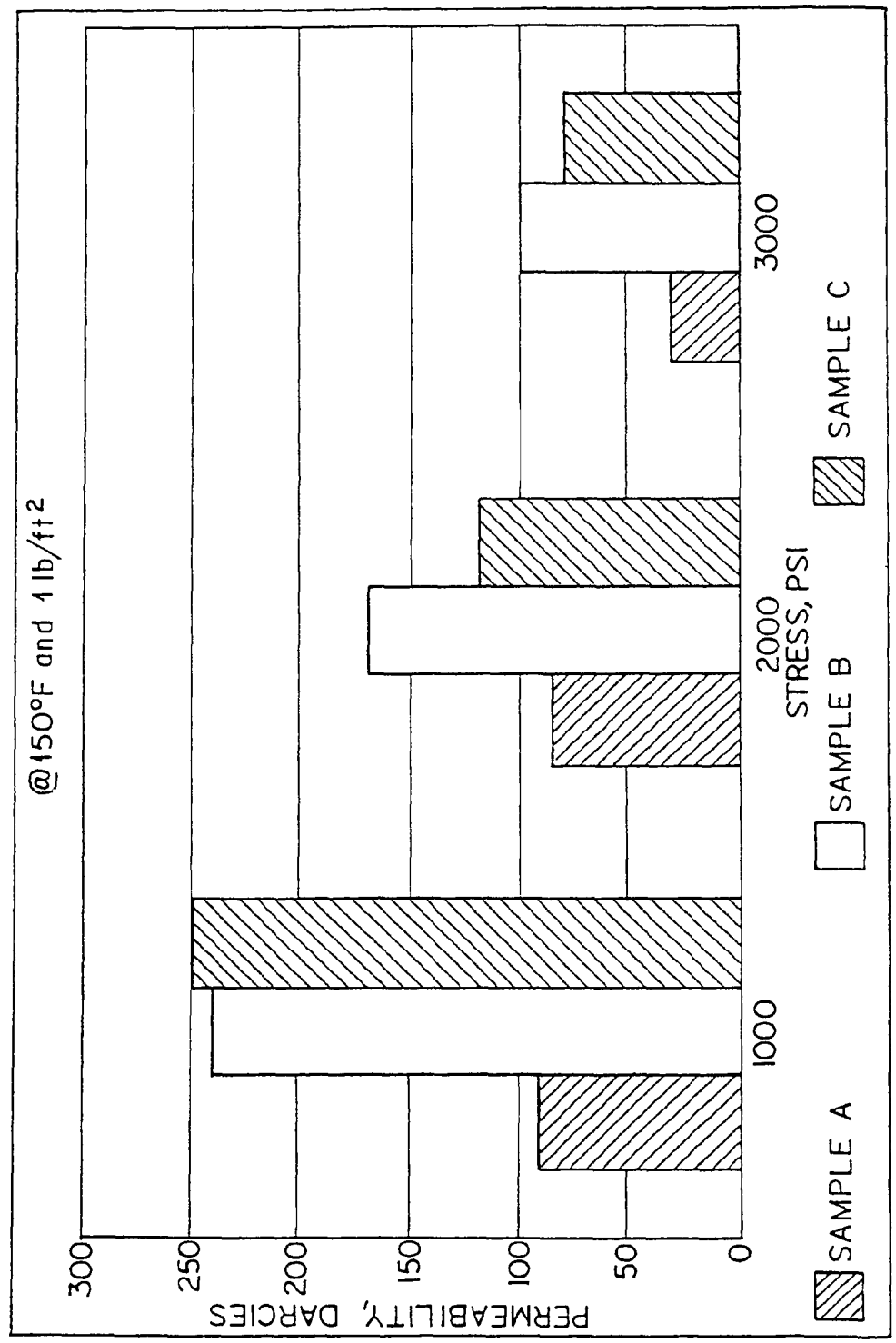
FIG. 7 shows permeability versus closure stress for particulate according to one embodiment of the disclosed method.

FIG. 7 shows the permeability of the ground walnut hull materials of the three samples of this example at 500, 1000 and 2000 psi closure stresses and 150° F.

The results of this example illustrate how ground walnut hull materials modified with silane-based modifying agent may be used to form particulate packs having good permeability at increasing closure stresses.

Example 4

Using a procedure similar to that of Example 1, conductivity tests were performed on two different samples of 12/20 mesh ground walnut shells at 150° F. and at a concentration of 2 lb/ft$^2$: Sample A (treated with urethane resin) and manufactured by FRITZ; and Sample B (soaked for 4 hours at room temperature in FSA-1 siloxane-based compound). Results of this testing is shown in Tables VIII-XI.

TABLE VIII

Sample A: Resin Coated Ground Walnut Hulls

| Temperature | 150 | Particulate Size | 12/20 |
|---|---|---|---|
| Closure Pressure | 3000 psi | Concentration | 2 lbs/ft2 |
| Fluid Pressure (psi) | 200 | | |

TABLE IX

Sample A: Resin Coated Ground Walnut Hulls

| Test Data *Time (Hours) | Temp ° C. | Water Rate mls/min | Viscosity cp | DP psi | Width inches | Conductivity md-ft | Permeability darcies | Closure Stress Psi |
|---|---|---|---|---|---|---|---|---|
| 0 | 64.47 | 8.48 | 0.44 | 0.00635 | 0.59 | 15,637 | 318 | 1094 |
| 10 | 65.00 | 8.81 | 0.43 | 0.00909 | 0.55 | 11,253 | 246 | 1105 |
| 20 | 65.00 | 8.51 | 0.43 | 0.00969 | 0.55 | 10,190 | 222 | 1083 |
| 30 | 64.99 | 8.50 | 0.43 | 0.01567 | 0.39 | 6,302 | 194 | 2059 |
| 40 | 65.00 | 8.43 | 0.43 | 0.01669 | 0.39 | 5,861 | 180 | 2036 |
| 50 | 65.01 | 8.56 | 0.43 | 0.01926 | 0.39 | 5,162 | 159 | 2711 |
| 60 | 64.99 | 8.62 | 0.43 | 0.02654 | 0.37 | 3,772 | 124 | 3021 |
| 70 | 64.99 | 8.52 | 0.43 | 0.02861 | 0.37 | 3,458 | 114 | 2992 |

*Values given represent an average of an hour's data at each given point.

TABLE X

Sample B: Ground Walnut Hulls Treated with Modifying Agent

| Temperature | 150° | Particulate Size | 12/20 |
|---|---|---|---|
| Closure Pressure | 3000 psi | Concentration | 2 lbs/ft2 |
| Fluid Pressure (psi) | 450 | | |

TABLE XI

Sample B: Ground Walnut Hulls Treated with Modifying Agent

| Test Data *Time (Hours) | Temp ° C. | Water Rate mls/min | Viscosity cp | DP psi | Width inches | Conductivity md-ft | Permeability darcies | Closure Stress psi |
|---|---|---|---|---|---|---|---|---|
| 0 | 64.46 | 8.21 | 0.44 | 0.00372 | 0.590 | 25,829 | 525 | 1412 |
| 10 | 65.00 | 8.20 | 0.43 | 0.00722 | 0.550 | 13,187 | 288 | 1405 |
| 20 | 65.00 | 8.21 | 0.43 | 0.00796 | 0.550 | 11,970 | 261 | 1413 |
| 30 | 64.99 | 8.20 | 0.43 | 0.02105 | 0.390 | 4,524 | 139 | 2379 |
| 40 | 65.00 | 8.20 | 0.43 | 0.02352 | 0.370 | 4,049 | 131 | 2379 |
| 50 | 65.01 | 9.18 | 0.43 | 0.03442 | 0.360 | 3,097 | 103 | 3039 |
| 60 | 64.98 | 8.20 | 0.43 | 0.04794 | 0.340 | 1,987 | 70 | 3074 |
| 70 | 65.00 | 8.20 | 0.43 | 0.05317 | 0.334 | 1,790 | 64 | 3043 |

*Values given represent an average of an hour's data at each given point.

The results of this example also illustrate how ground walnut hull materials modified with silane-based modifying agent may be used to form particulate packs having good permeability at increasing closure stresses.

Example 5

Using equipment similar to that employed for Example 1, stress tests were performed on particulate packs formed from four different particulate packs formed from four respective samples of 12/20 mesh naturally occurring particulate material: Sample A (ground apricot pits); Sample B (ground walnut hulls having about 2% by weight moisture content); Sample C (ground walnut hulls having about 5% by weight moisture content); and Sample D (ground olive pits). The particles of each of Samples A through D were obtained from FRITZ, and were soaked for 4 hours at room temperature in FSA-1 siloxane-based compound. Each of the particulate samples was loaded into a test cell at a concentration of 1 lbs/ft$^2$ for testing at 150° F. During the test of each particulate pack, increasing compressive stress was applied to the pack and the resulting width of the pack within the cell measured using a sensitive linear variable differential transducer.

Figure 8:
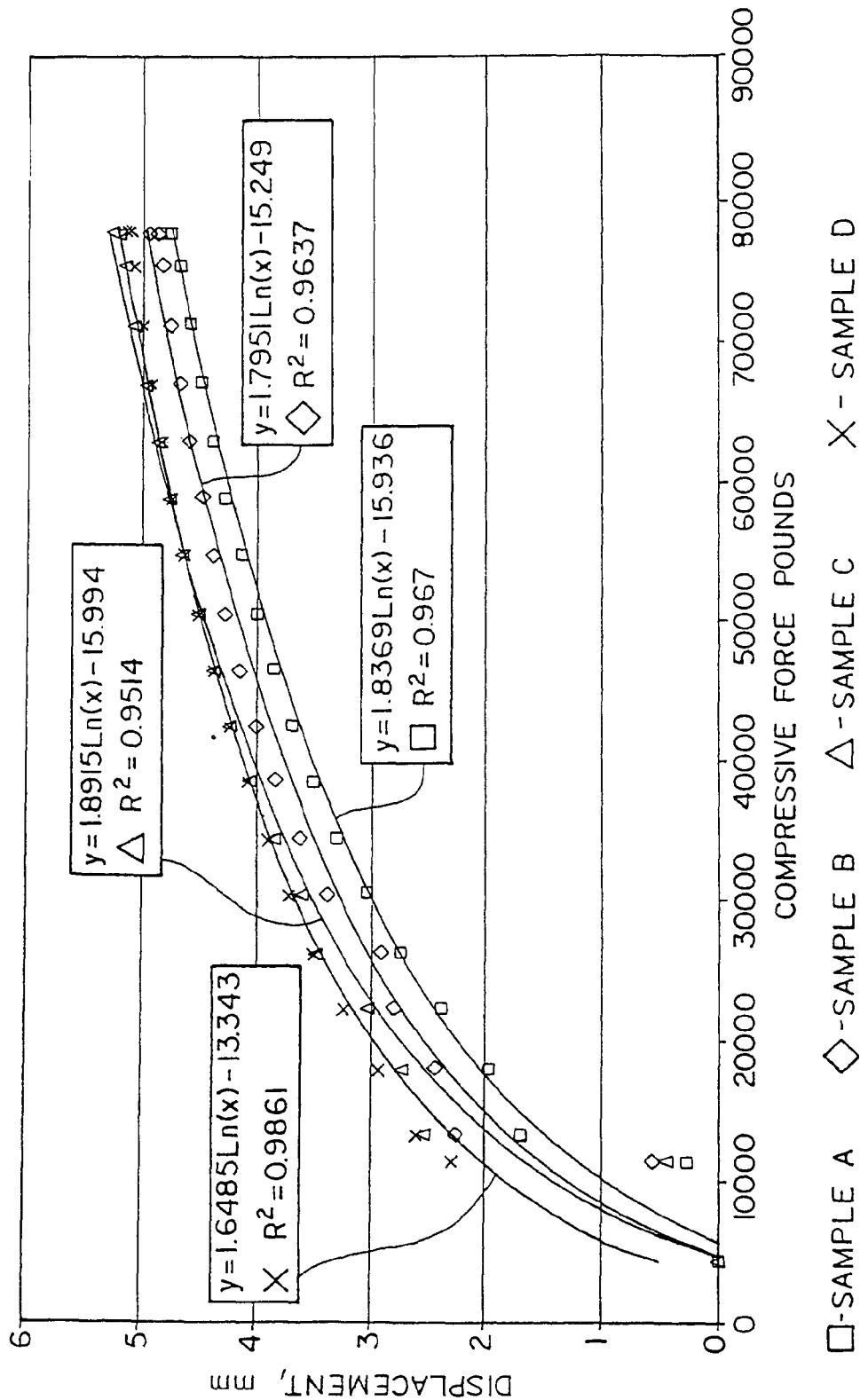
FIG. 8 shows pack width displacement versus closure stress for particulate according to one embodiment of the disclosed method.

Results of this testing is shown in FIG. 8 as a plot of pack width displacement (i.e. reduction in pack width) in millimeters versus increasing compressive force. As may be seen in FIG. 8, the modified ground apricot pits of Sample A exhibited the least pack width reduction with increasing force, translating into most retained permeability of the four samples at a given stress level. The modified ground olive pits of Sample D showed the most pack width reduction with increasing stress, translating into least retained permeability of the four samples at a given stress level. The modified ground walnut hulls of Samples B and C exhibited pack width reduction values in-between those of Samples A and D at most stress levels. In this regard, the modified ground walnut hulls of Sample B (having a moisture content of about 2%) exhibited less pack width reduction than the modified ground walnut hulls of Sample C (having a moisture content of about 5%) at a given stress level, showing that lower moisture levels may translate into increased strength or hardness for a given naturally occurring material. For example, in one embodiment of the disclosed compositions and methods, naturally occurring particulate material (e.g., ground walnut hull material) having a moisture content of from about 2% by weight of the material to about 5% by weight of the material may be employed.

Example 6

To obtain the data for this example, the following procedure was followed: Measured mass of 25 ml of sample on a graduate cylinder. Cylinder was tapped several times on the countertop and the volume adjusted to an even 25 ml prior to weighing. Mass/volume=bulk density.

The data of this example is shown in Table XII:

TABLE XII

| Bulk Densities | |
|---|---|
| Sand | 1.721 |
| CarboLite | 1.747 |
| Porous Ceramic-Neat | 1.191 |
| Porous Ceramic-2/2 | 1.238 |
| Porous Ceramic-6% | 1.293 |
| Porous Ceramic-8% P-A | 1.224 |

TABLE XII-continued

| Bulk Densities | |
|---|---|
| Porous Ceramic-8% P-B | 1.198 |
| Porous Ceramic-10% P | 1.32 |

Figure 9:
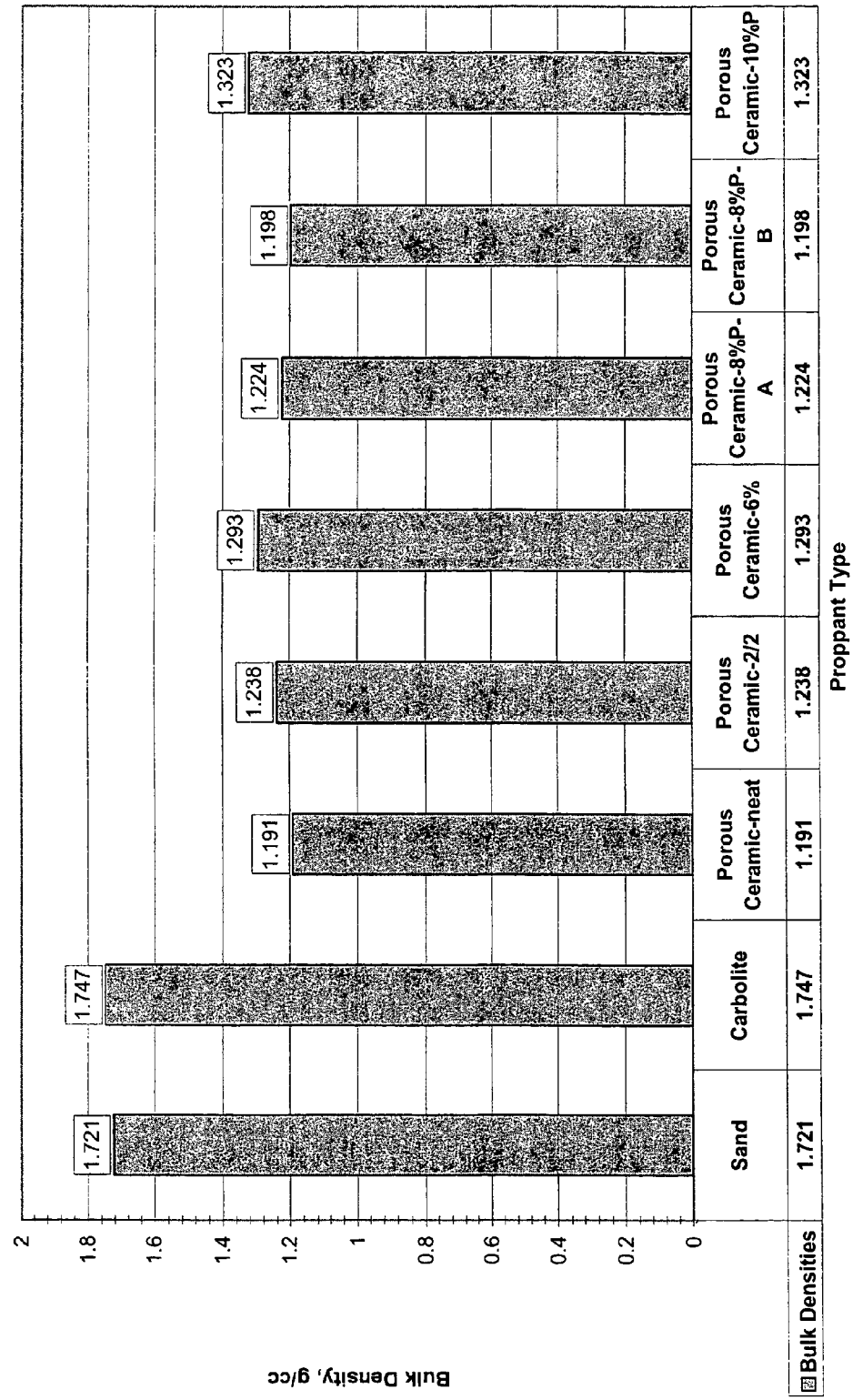
FIG. 9 is a graph depicting bulk apparent density comparison of the data of Example 6.

FIG. 9 illustrates comparisons of the bulk densities of various proppants/sand control materials to samples of a selected porous ceramic material (from Carbo Ceramics, Inc.).

In the examples, "Carbolite" is a commercial proppant available from Carbo Ceramics, Inc. "Neat" is untreated porous ceramic material from Carbo Ceramics, Inc., "2/2" is porous ceramic material from Carbo Ceramics, Inc. treated with 2% by weight of particle epoxy inner coating/penetrating material (epoxy is reaction product of epichlorohydrin and bis-phenol A) and with 2% by weight of particle phenol formaldehyde resin outer coating material, "6%" is porous ceramic material from Carbo Ceramics, Inc. treated with 6% by weight of particle coating/penetrating material (epoxy is reaction product of epichlorhidian and bis-phenol A), "8% P-A" is porous ceramic material from Carbo Ceramics, Inc. treated with 8% by weight of particle phenol formaldehyde resin (Sample A), "8% P-B" is porous ceramic material from Carbo Ceramics, Inc. treated with 8% by weight of particle phenol formaldehyde resin (Sample B), and "10% P" is porous ceramic material from Carbo Ceramics, Inc. treated with 10% by weight of particle phenol formaldehyde resin.

Data is presented for both the untreated porous material particle, and for the porous material particle treated with various types and concentrations of selected penetrating materials. As may be seen, the bulk apparent density of the resulting particles varies with varying degree of infiltration or penetration of the penetrating material into the porous ceramic particle. The samples designated as 2/2 and 8% P-B may be characterized from SEM thin section analysis as having limited penetration towards the core of the particle, apparent effective encapsulation of the air in the particle core porosity, yet substantial enhancement of the particle strength as illustrated by the conductivity tests.

Figure 10:
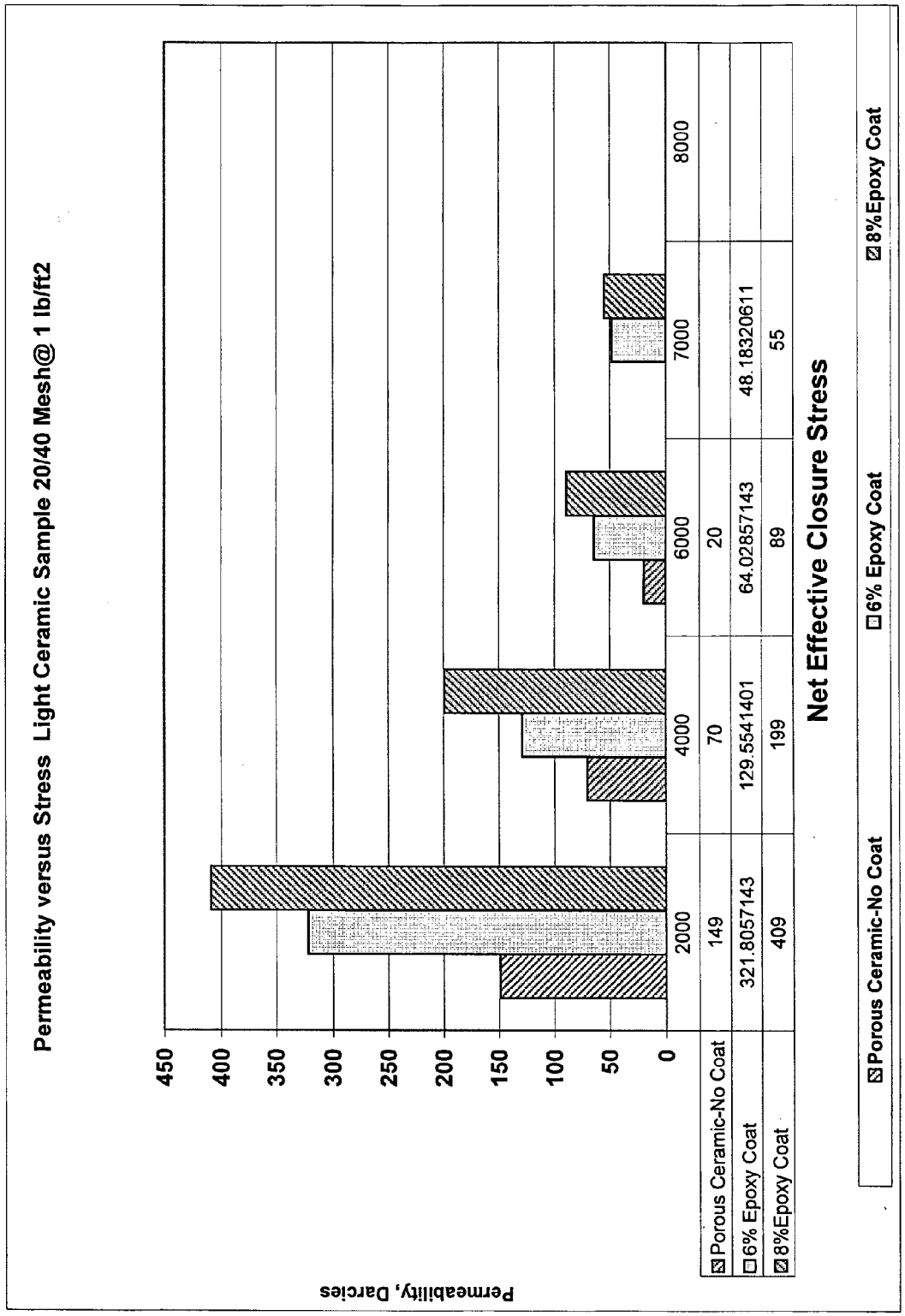
FIG. 10 is a graph depicting permeability versus closure stress data of Example 6.
Figure 11:
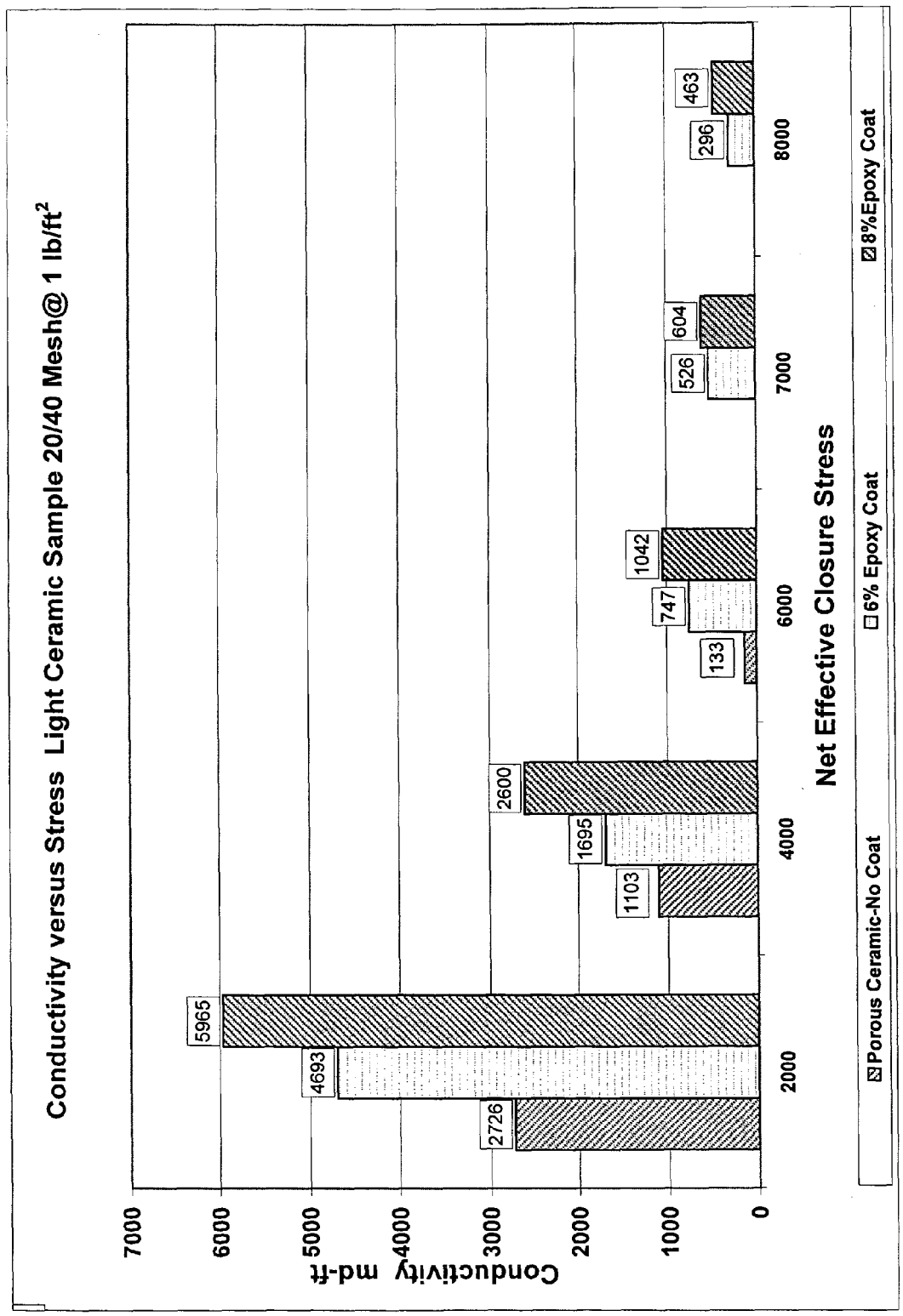
FIG. 11 is a graph depicting conductivity versus closure stress data of Example 6.
Figure 12:
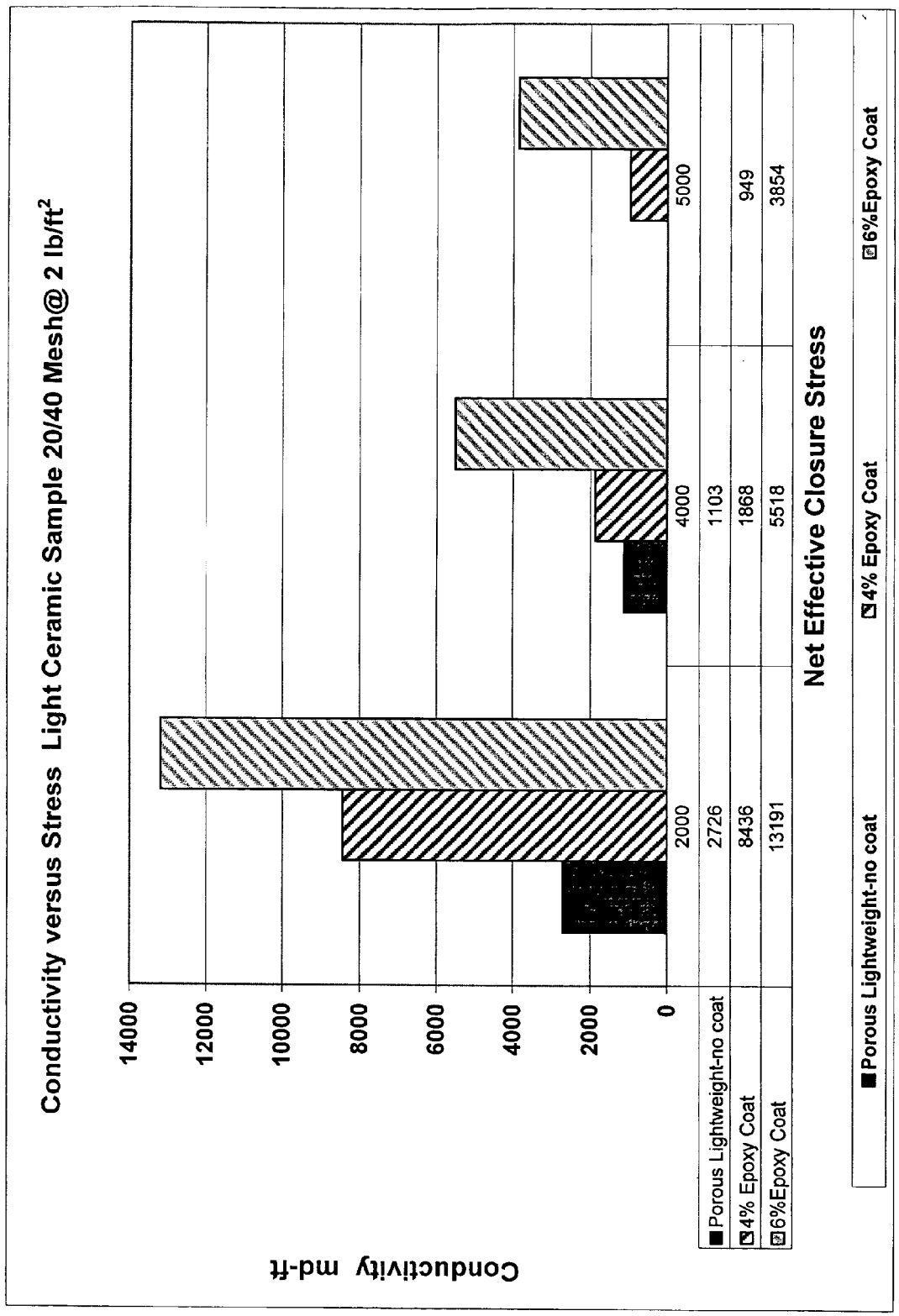
FIG. 12 is a graph depicting conductivity versus closure stress data of Example 7.
Figure 13:
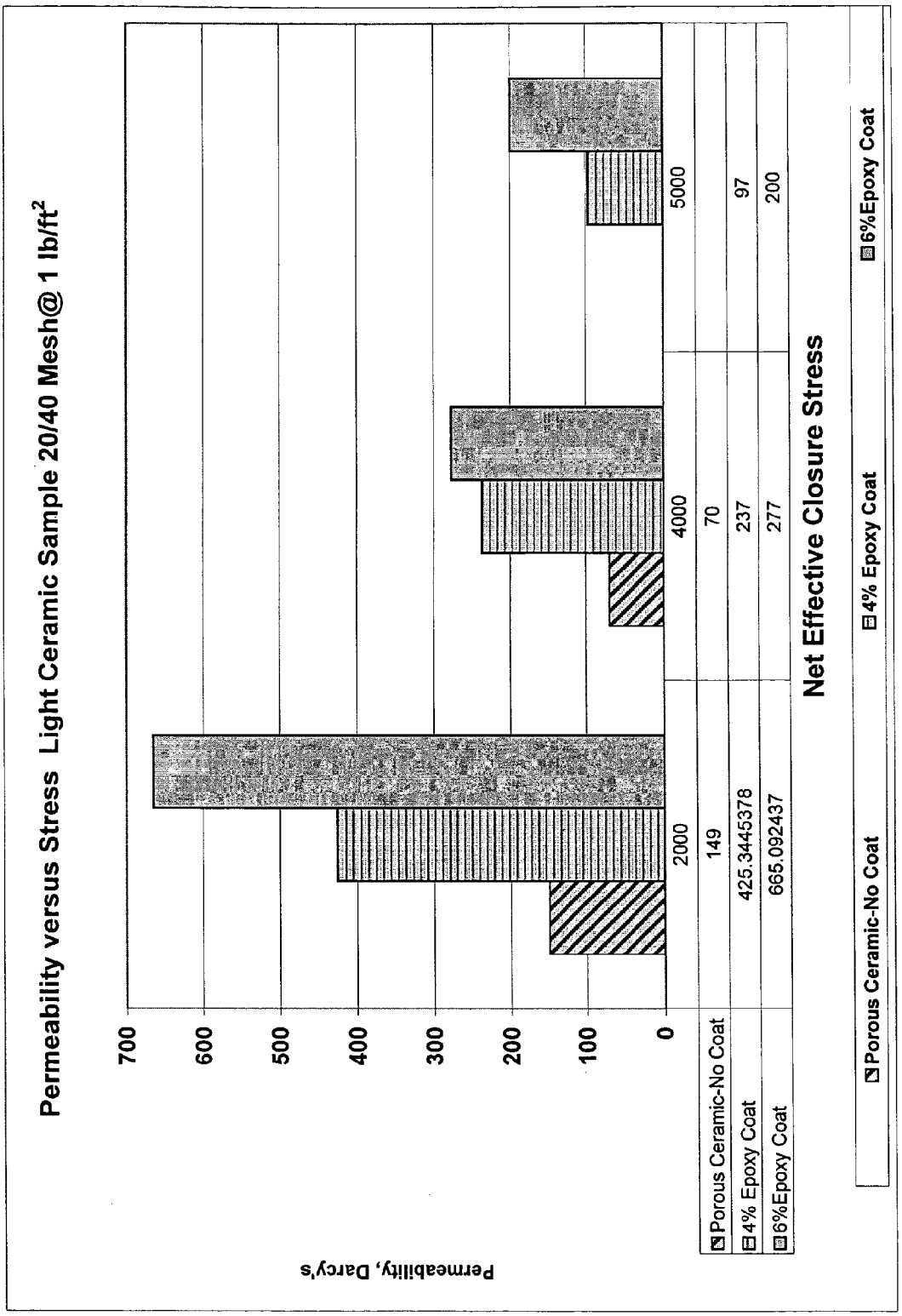
FIG. 13 is a graph depicting permeability versus closure stress data of Example 7.
Figure 14:
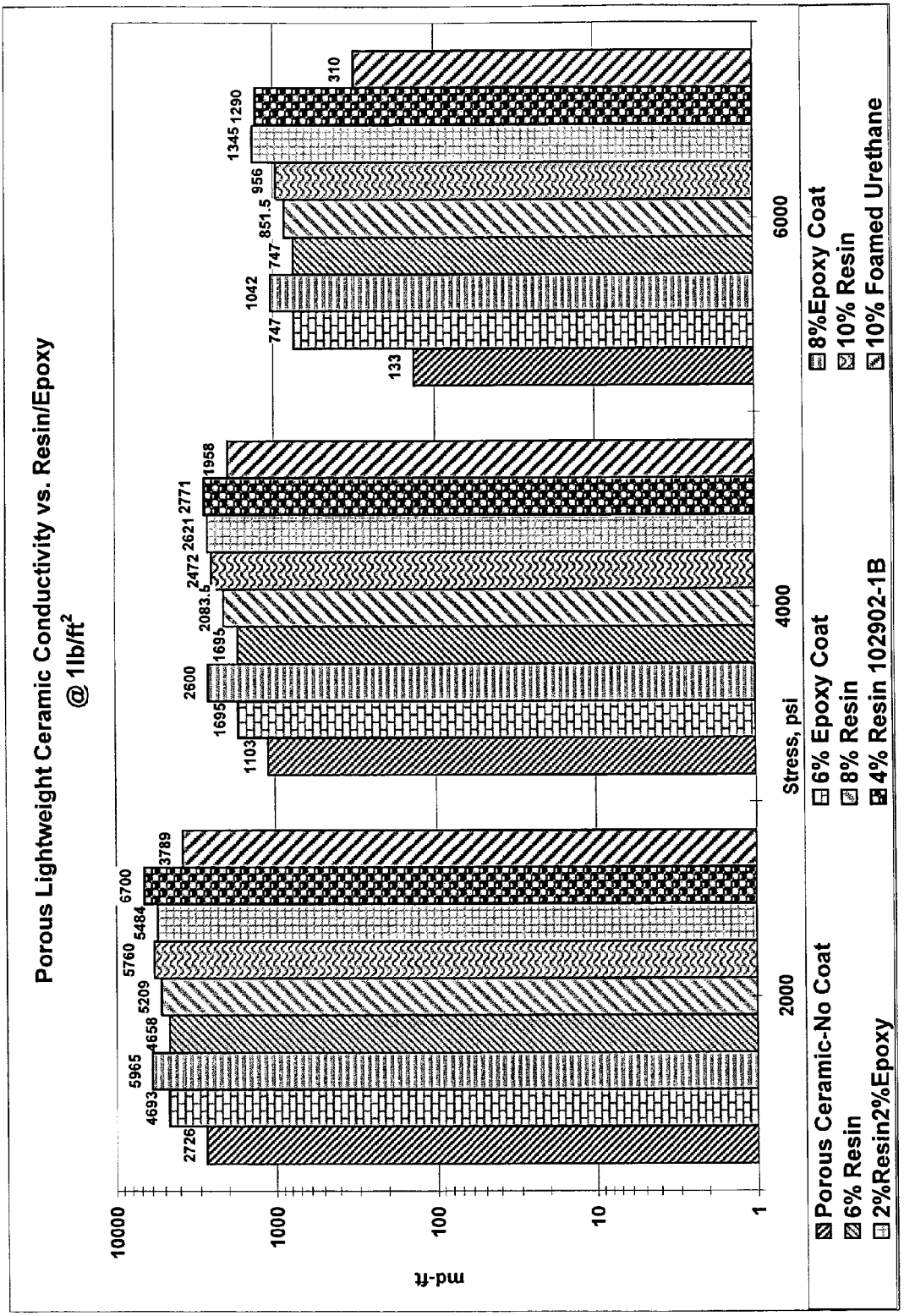
FIG. 14 is a graph depicting conductivity comparison data of Example 7.
Figure 15:
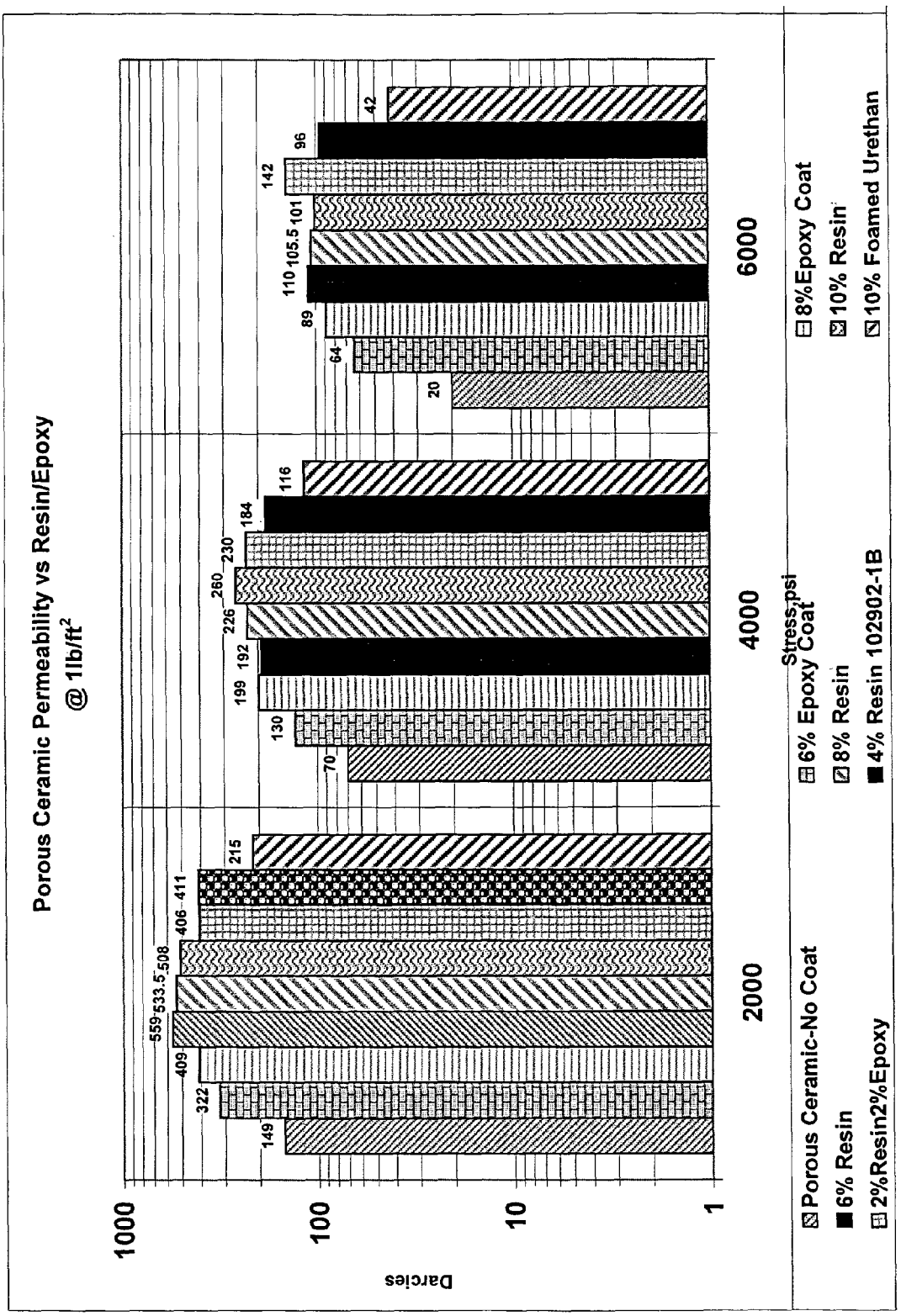
FIG. 15 is a graph depicting permeability comparison data of Example 7.

FIGS. 10 and 11 illustrate the permeability versus closure stress for coated and uncoated ceramic ULW particulates. As shown, resin coating and impregnation of the ULW particle imparts significant strength across the closure range and in particular, enhances the low to mid-range performance of the material. The data represents equal pack widths for all of the proppants with adjustments made for each respective density. Both the coated and uncoated ceramics ULW were tested at 1.4 pounds per square foot (33.2 kg/m$^2$). Each of these tests had nearly identical width measurements for ease of comparison.

Example 7

The porous particulate material employed was from "Carbo Ceramics" having a size of about 20/40 mesh. The particulate material was treated with various penetrating/coating materials corresponding to the same epoxy or phenol formaldehyde materials used above. The treated particulate material was tested alone, with no other particulate material blended in. Comparison materials include Jordan Sand, "ECONOPROP®" proppant from Carbo Ceramics, "Econoflex" (coated ECONOPROP®" proppant), Hickory sand (Brady Sand), "PR6000" 2% coated Ottawa sand from BORDEN, and "Carbolite" proppant from Carbo Ceramics.

Conductivity tests were performed according to API RP 61 (1$^{st}$ Revision, Oct. 1, 1989) using an API conductivity cell with Ohio sandstone wafer side inserts. Each particulate material sample was loaded into the cell and closure stress applied to the particulate material using a "DAKE" hydraulic press having a "ROSEMOUNT" differential transducer (#3051C) and controlled by a "CAMILE" controller. Also employed in the testing was a "CONSTAMETRIC 3200" constant rate pump which was used to flow deionized water through each particulate sample.

Table XIII shows the proppant pack Permeability and Conductivity data generated for this example.

as high a confining (or closure) stress as possible, which is reflected more directly by the permeability data. Thus a certain amount of fracture conductivity at a given stress/temp condition may be maintained without increasing the cost, and/or by offsetting any cost increase with improved value. Even in the event of increased particulate material cost, substantially less particulate material may be employed to achieve a substantially equivalent conductivity due to the lesser mass/unit volume.

TABLE XIII

Porous Ceramic Worksheet

|  | PC neat | PC-4% Epoxy | PC-6% epoxy | PC-8% epoxy | PC-2% &2% | PC-6% resin | PC-8% resin | PC 10% resin | 20/40 Jordan | 20/40 Econoprop | 20/40 Econoflex | 20/40 Hickory | 20/40 PR 6000 | 20/40 Carbolite |
|---|---|---|---|---|---|---|---|---|---|---|---|---|---|---|
| Bulk Dens | 1.198 |  | 1.292 | 1.34 | 1.238 | 1.293 | 1.224 | 1.32 | 1.6 | 1.6 | 1.5 | 1.6 | 1.54 | 1.6 |
| Acid Solubility | 5.7% |  |  |  |  |  |  |  | 1.20% | 1.90% | 0.30% | 0.50% | 0.30% | 1.70% |
| Porosity |  |  | 50.2% | 46.9% |  | 51.8% | 54.1% |  |  |  |  |  |  |  |
| Crush |  |  |  |  |  |  |  |  |  |  |  |  |  |  |
| 2000 | 3.65 |  |  |  |  |  |  |  | .1 |  |  | 0.4 | 0.1 |  |
| 3000 |  |  |  |  |  |  |  |  | .3 |  |  | 1.8 | 0.2 |  |
| 4000 | 7.52 | 4.54 |  |  |  |  |  |  | 1.6 |  | 0.1 | 9.8 | 0.4 |  |
| 5000 |  |  |  |  |  |  |  |  | 2.6 |  |  | 13.6 | 0.7 |  |
| 6000 | 16.88 | 16.36 |  |  |  |  |  |  |  |  | 0.1 |  | 1.9 |  |
| 7000 | 21.00 |  |  |  |  |  |  |  |  |  |  |  |  |  |
| 7500 |  |  |  |  |  |  |  |  |  | 4.7 |  |  | 3.1 | 1.5 |
| 8000 |  | 20.87 |  |  |  |  |  |  |  |  | 0.2 |  | 4.5 |  |
| 10000 |  |  |  |  |  |  |  |  |  | 13.3 | 0.5 |  | 10.7 | 12.1 |

| Permeability | PC neat | PC 4% Epoxy | PC-6% epoxy | PC-8% epoxy | PC-2% &2% | PC-6% resin | PC-8% resin | PC 10% resin | 20/40 Jordan | 20/40 Econoprop | 20/40 Econoflex | 20/40 Hickory | 20/40 PR 6000 | 20/40 Carbolite |
|---|---|---|---|---|---|---|---|---|---|---|---|---|---|---|
| 2000 | 149 | 425 | 322 | 409 | 406 | 559 | 1193 | 508 | 228 | 342 | 287 | 224 | 275 | 500 |
| 3000 | 110 | 331 | 226 | 304 | 318 | 376 | 994 | 384 | 170 | 319 | 274 | 144 | 241 | 466 |
| 4000 | 70 | 237 | 130 | 190 | 230 | 192 | 786 | 260 | 113 | 295 | 262 | 64 | 208 | 433 |
| 5000 |  | 97 | 110 | 131 | 185 | 151 | 671 | 181 | 80 | 257 | 255 | 42 | 168 | 376 |
| 6000 |  |  | 64 | 89 | 142 | 110 | 546 | 101 | 47 | 220 | 248 | 21 | 127 | 319 |
| 7000 |  |  | 48 | 55 |  | 78 | 361 |  | 32 | 178 | 225 | 12 | 94 | 252 |
| 8000 |  |  | 28 | 44 |  | 46 | 175 |  | 18 | 135 | 202 | 4 | 61 | 186 |

| Conductivity | PC-#1 neat | PC-4% Epoxy | PC-6% epoxy | PC-8% epoxy | PC-2% &2% | PC-6% resin | PC-8% resin | PC-10% resin | 20/40 Jordan | 20/40 Econoprop | 20/40 Econoflex | 20/40 Hickory | 20/40 PR 6000 | 20/40 Carbolite |
|---|---|---|---|---|---|---|---|---|---|---|---|---|---|---|
| 2000 | 2726 | 8436 | 4693 | 5965 | 5484 | 4658 | 13522 | 5760 | 2116 | 3423 | 2586 | 2020 | 2550 | 4755 |
| 3000 | 1915 | 5152 | 3194 | 4283 | 4053 | 3177 | 10275 | 4116 | 1564 | 3132 | 2382 | 1276 | 2201 | 4383 |
| 4000 | 1103 | 1868 | 1695 | 2600 | 2621 | 1695 | 7028 | 2472 | 1013 | 2842 | 2178 | 532 | 1852 | 4011 |
| 5000 |  | 949 | 1356 | 1616 | 1983 | 1221 | 5406 | 1729 | 709 | 2442 | 2036 | 344 | 1468 | 3445 |
| 6000 |  |  | 747 | 1042 | 1345 | 747 | 3783 | 986 | 405 | 2042 | 1895 | 157 | 1085 | 2879 |
| 7000 |  |  | 526 | 604 |  | 522 | 2455 |  | 279 | 1621 | 1650 | 94 | 790 | 2255 |
| 8000 |  |  | 296 | 463 |  | 296 | 1127 |  | 154 | 1201 | 1405 | 31 | 495 | 1637 |

Data is presented graphically in FIGS. 10-14.

Conductivity is a function of the width times the permeability. Advantageously, as disclosed herein in one embodiment, a selected porous material particulate may be treated with a selected coating and/or penetrating material to produce a relatively lightweight particulate sample that at the same lb/sq ft loading as a conventional sand will occupy a greater width. Even if the pack permeability is the same, the conductivity, and thus the proppant pack productability will be higher. Thus, as represented by the conductivity data, the benefit of the combination of increased width and the improved permeability may be achieved. Further, as disclosed herein in one embodiment, a selected porous material particulate may be treated with a selected coating and/or penetrating material so that particle strength is maintained to Example 8

Using the selected treated material of Examples 6-7, particles may be produced that are capable for use, such as having sufficient crush resistance for use or do not crush, under conditions of 2000 psi closure stress or greater, alternatively 2500 psi closure stress or greater, alternatively 3000 psi closure stress or greater, alternatively up to at least about 6000 psi closure stress, alternatively up to at least about 7000 psi closure stress, and alternatively at least about 8000 psi closure stress, i.e., almost as resistant to crush as commercial ceramic proppants which are heavier (e.g., commercial ceramic proppant (CarboLite) is about 40% heavier). In another embodiment, particles may be produced that are capable for use (e.g., have sufficient crush resistance for use or do not crush) under conditions of from about 2000 psi closure stress to about 8000 psi closure stress, alternatively from about 2500 psi closure stress to about 8000 psi closure stress, alternatively from about 3000 psi closure stress to about 8000 psi closure stress. However, it will be understood that particles may produced that are capable of use at higher closure stresses than 8000 psi and lower closure stresses than about 2000 psi as well.

FIGS. 16-23 are cross-sectional and surface SEM photographs of various treated and untreated samples of porous ceramic materials from CARBO CERAMICS. Where indicated as "epoxy" or as "resin", the particular coating/penetrating material is either the same epoxy or phenol formaldehyde resin employed and identified in Example 1.

Figure 16:
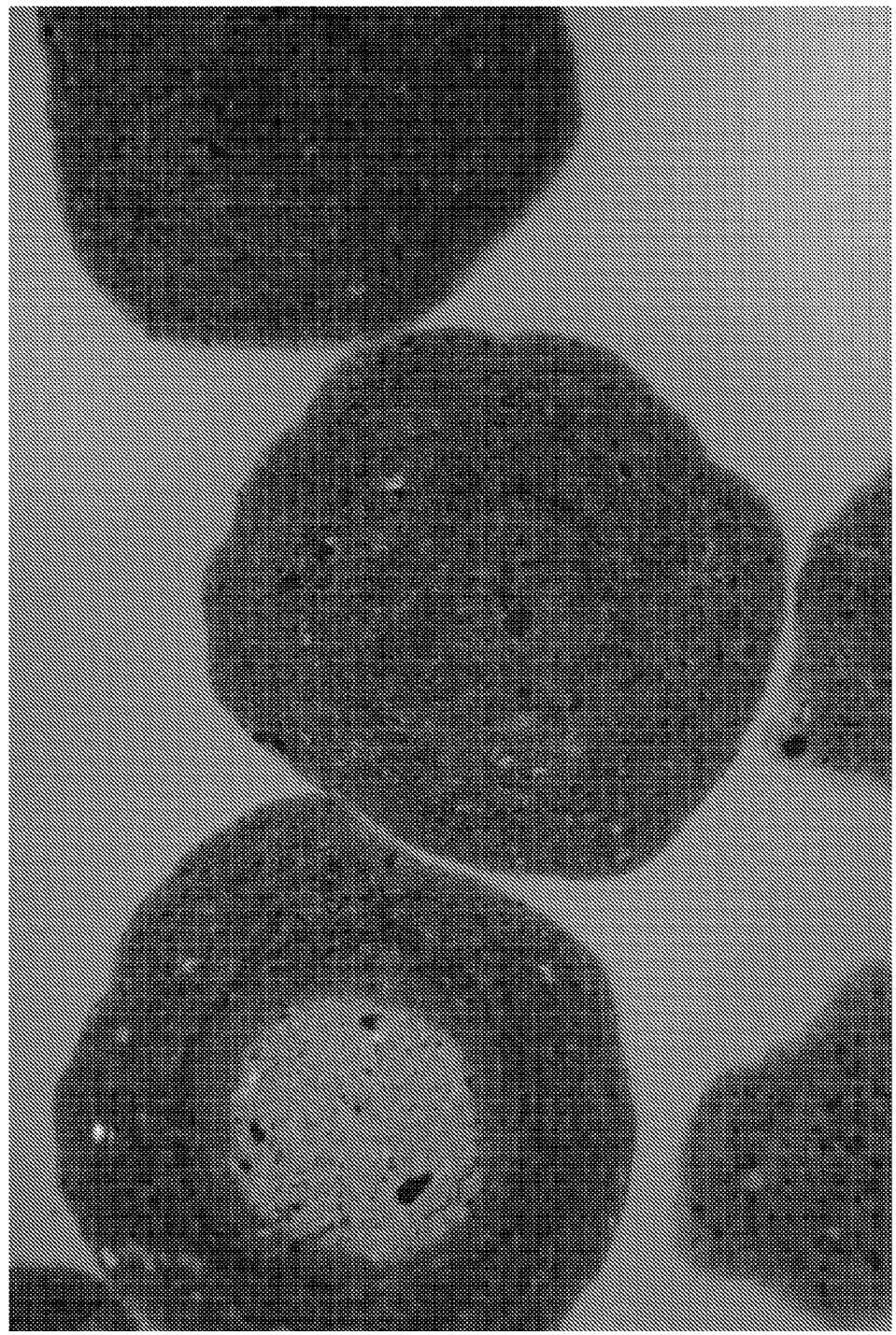
FIG. 16 is a SEM photograph of a porous material particle of Example 8.
Figure 17:
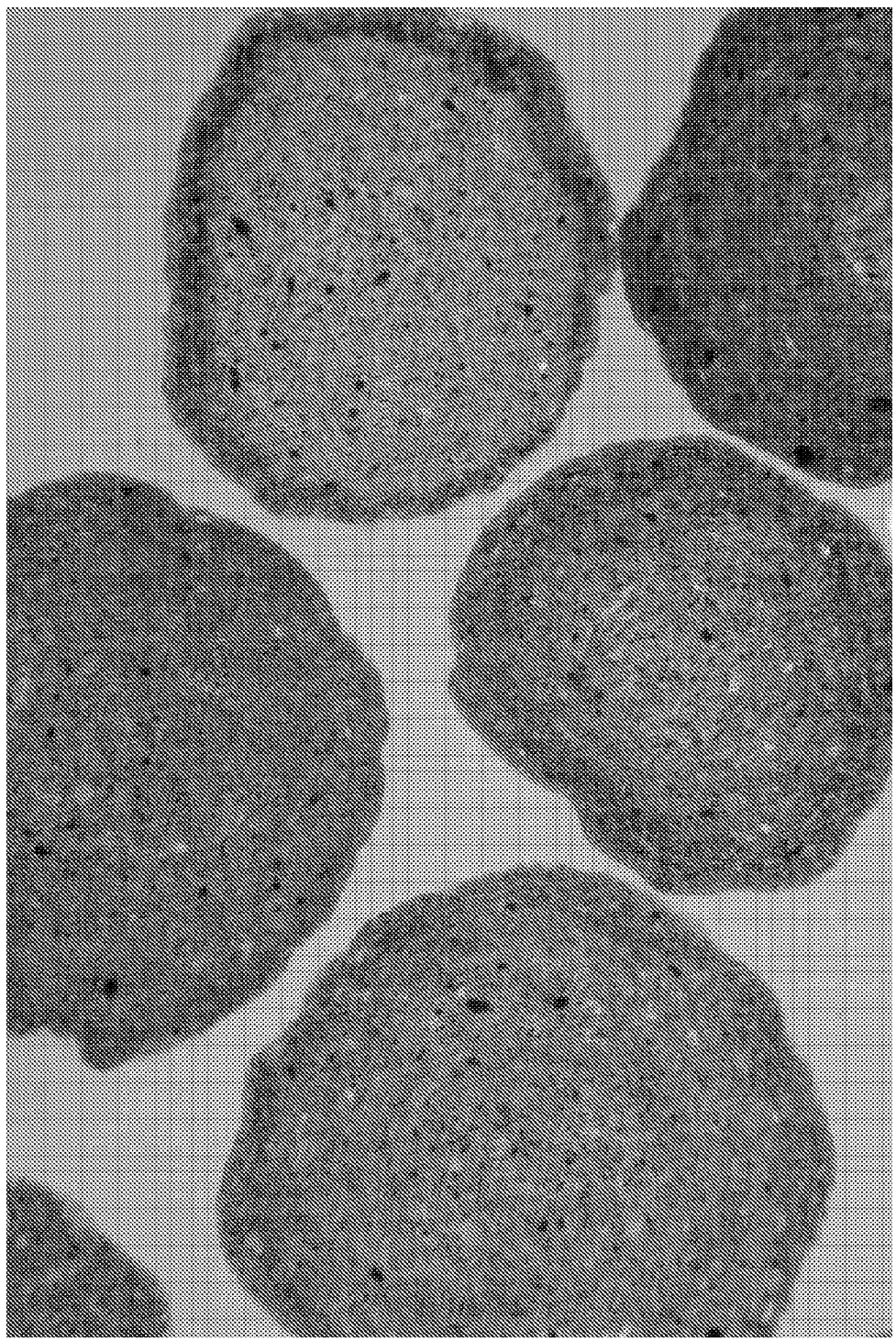
FIG. 17 is a SEM photograph of a porous material particle of Example 8.
Figure 18:
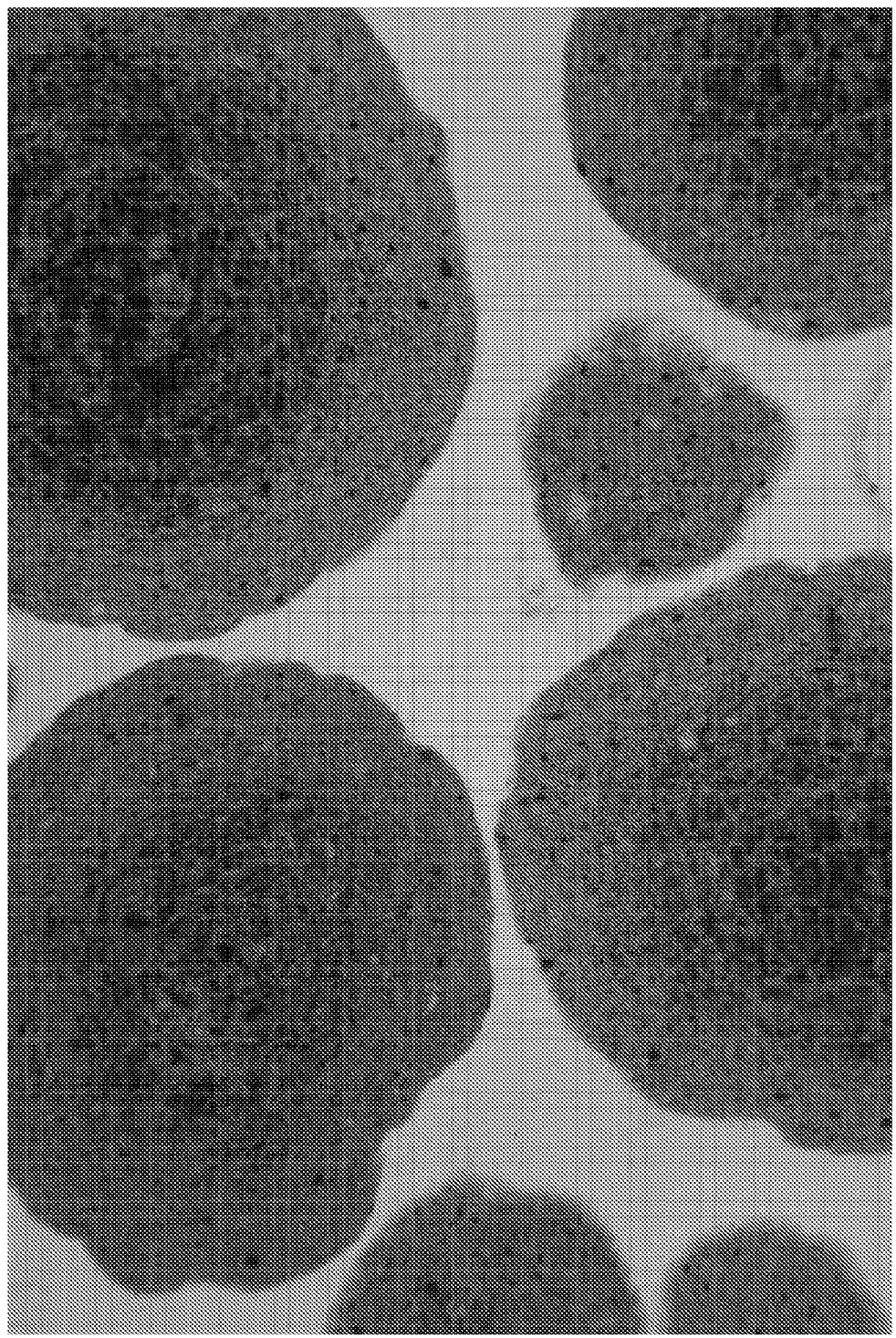
FIG. 18 is a SEM photograph of a porous material particle of Example 8.
Figure 19:
FIG. 19 is a SEM photograph of a porous material particle of Example 8.
Figure 20:
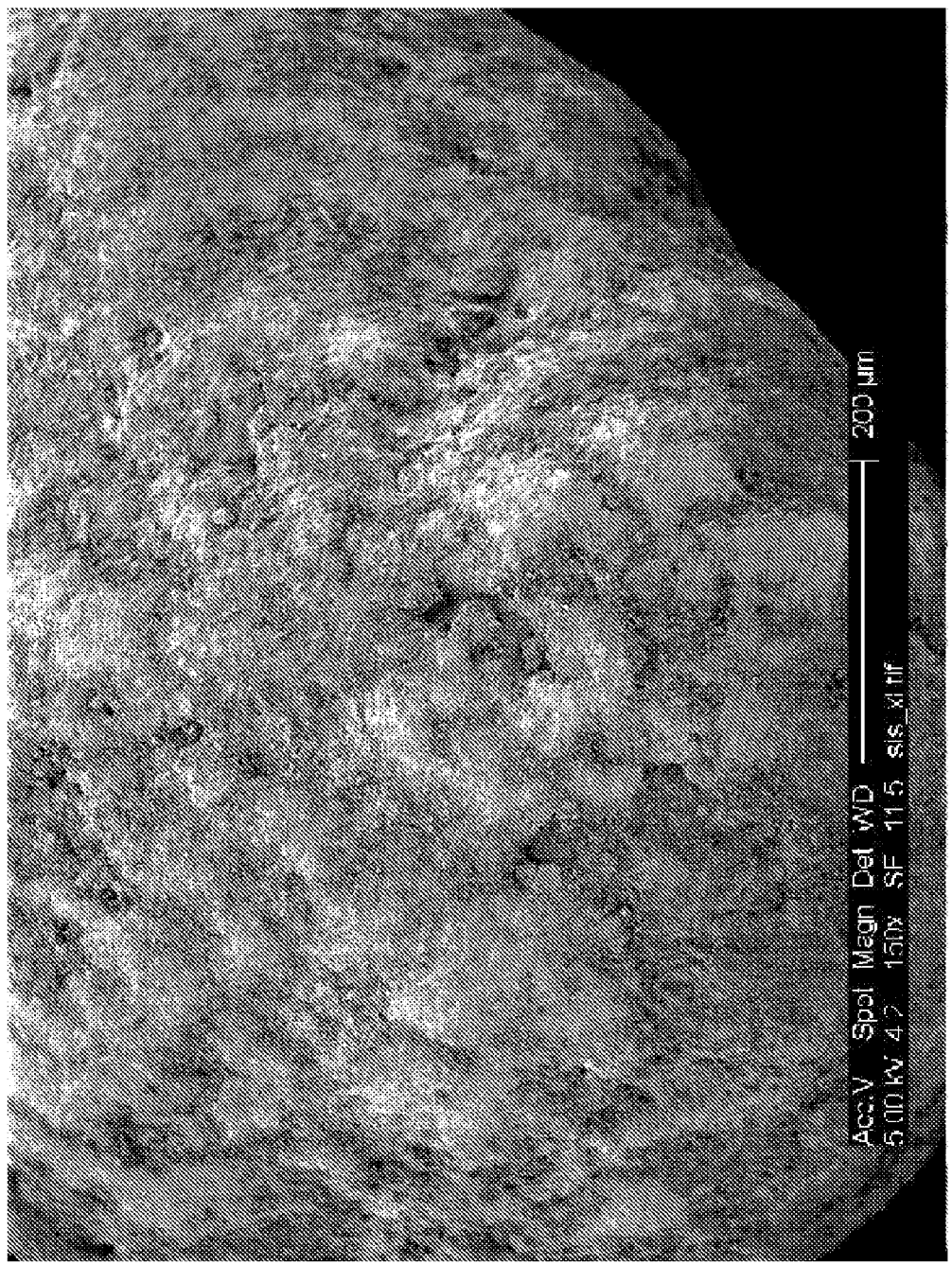
FIG. 20 is a SEM photograph of a porous material particle of Example 8.
Figure 21:
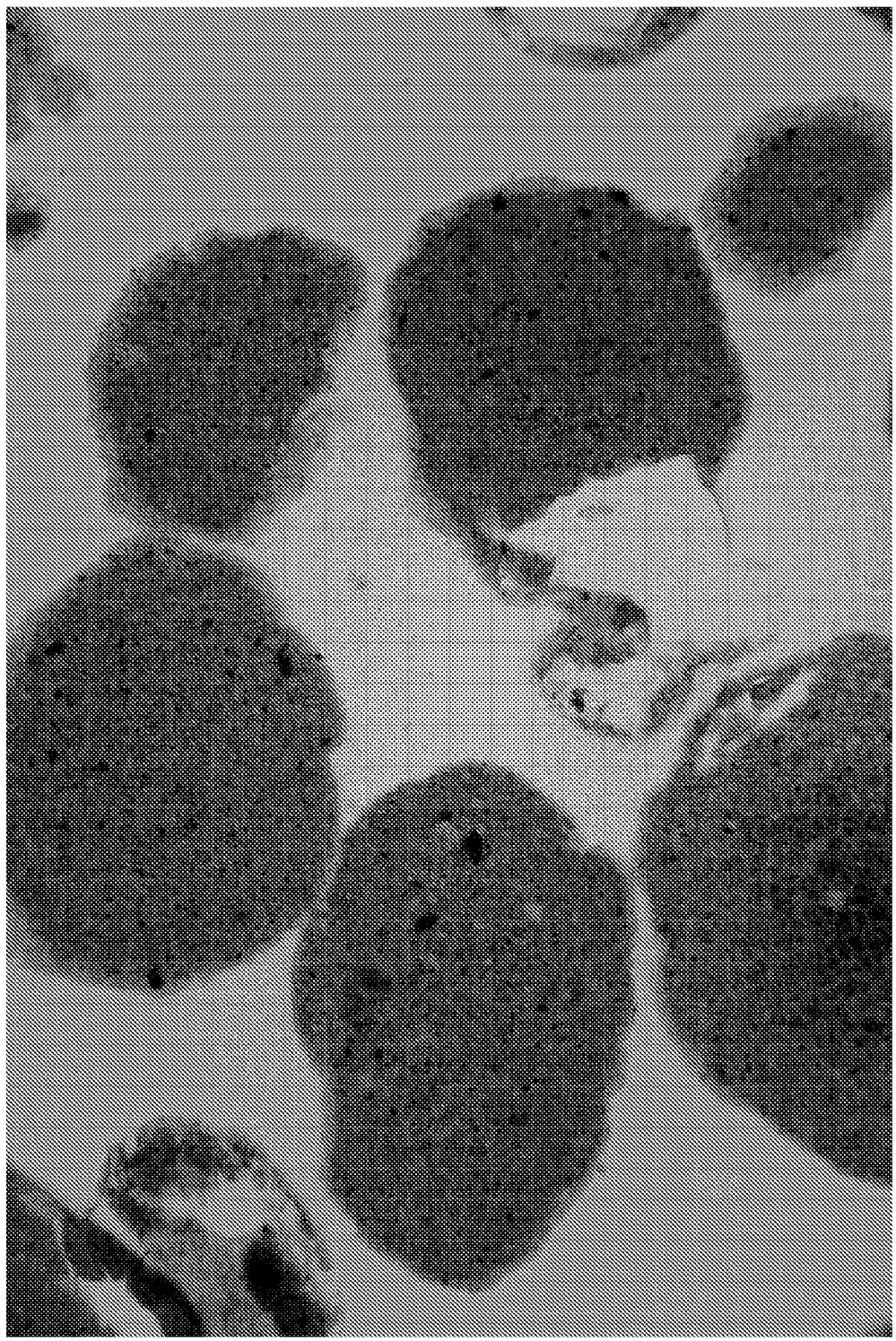
FIG. 21 is a SEM photograph of a porous material particle of Example 8.
Figure 22:
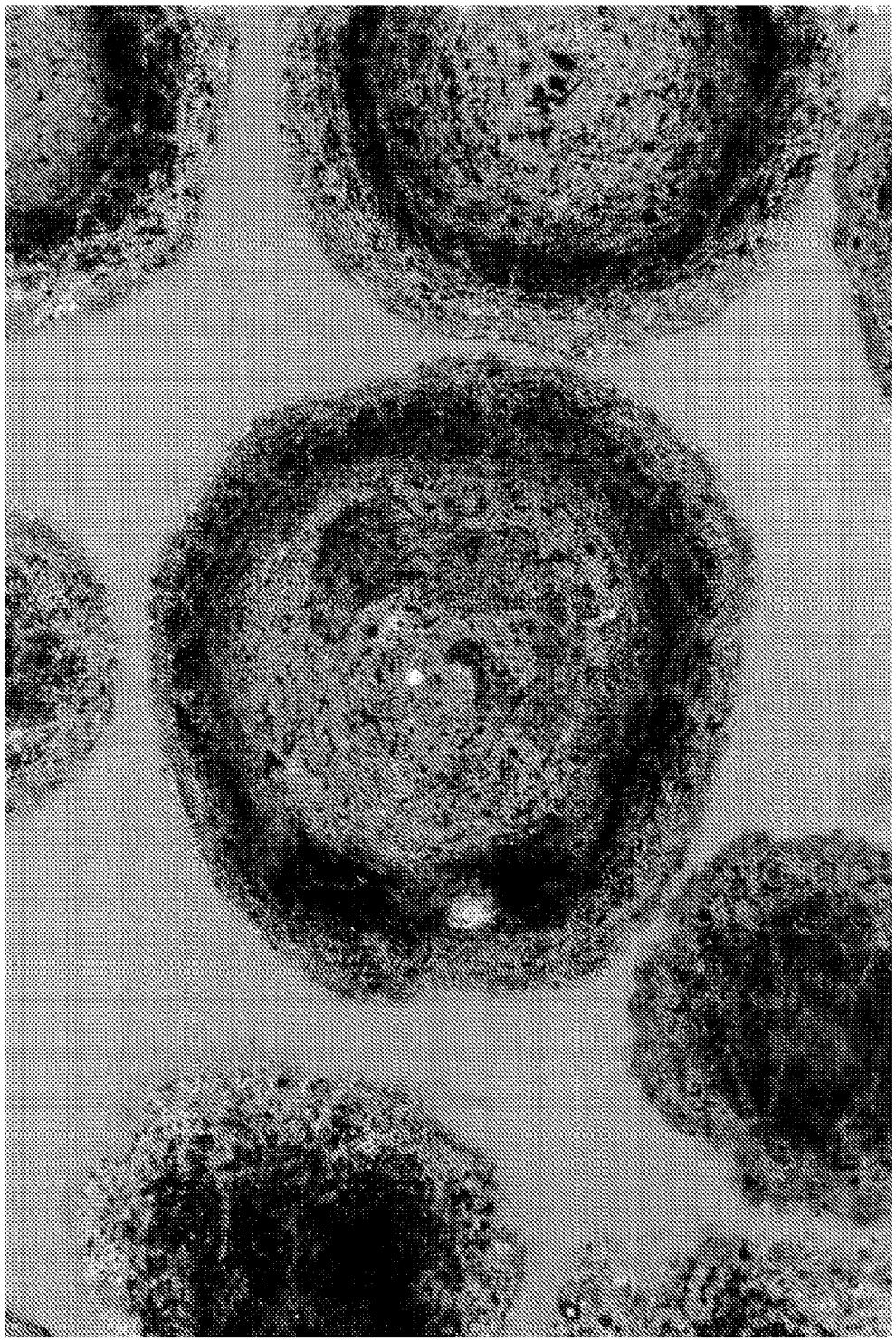
FIG. 22 a SEM photograph of a porous material particle of Example 8.
Figure 23:
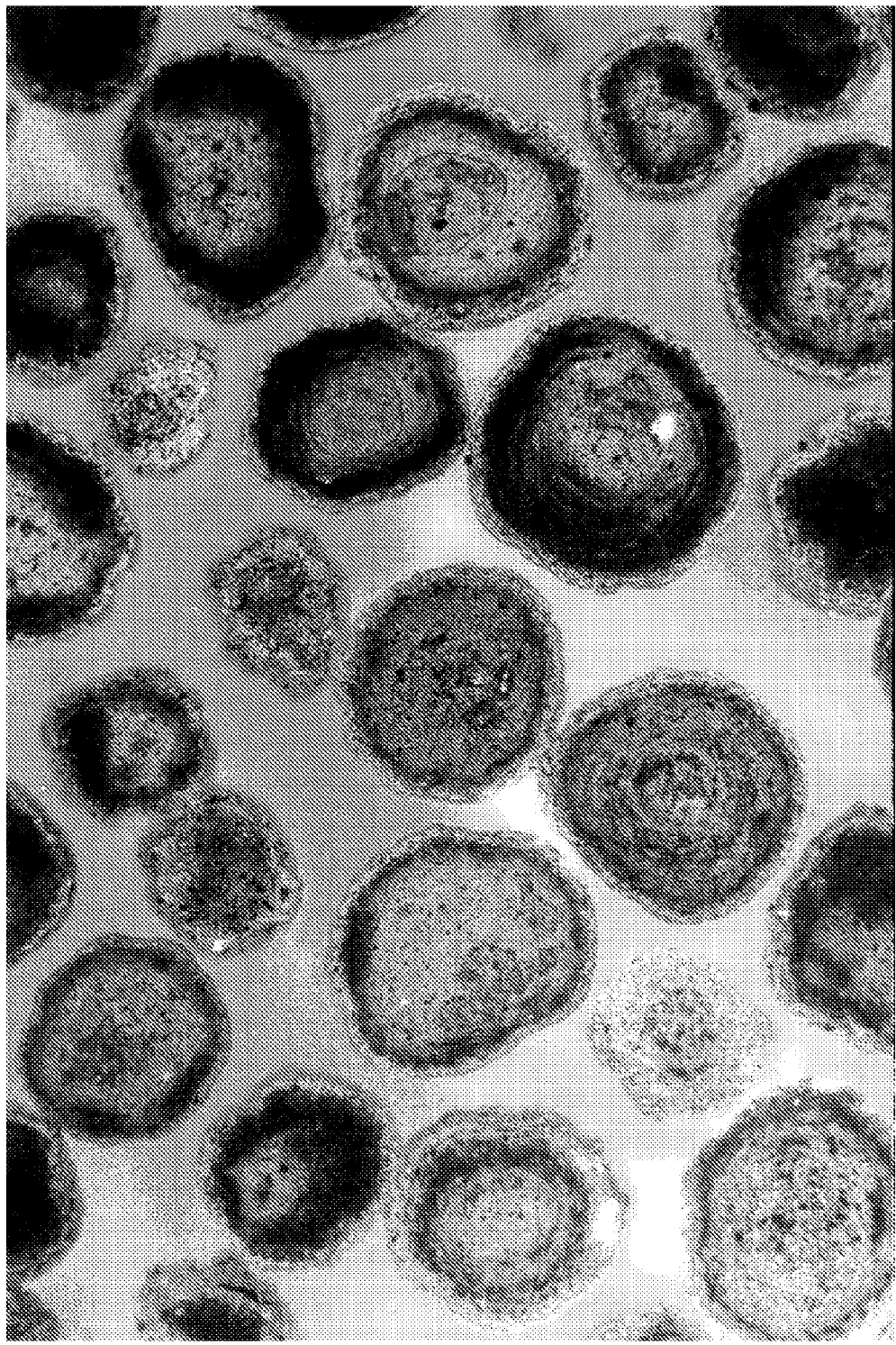
FIG. 23 is a SEM photograph of a porous material particle of Example 8.

FIG. 16 shows particles treated with about 10% by weight of particle resin. FIG. 17 shows particles treated first with 2% by weight epoxy and second with 2% by weight resin. FIG. 18 shows untreated particles. FIG. 19 shows particles treated first with 2% by weight epoxy and second with 2% by weight resin. FIG. 20 shows surface of untreated particle. FIG. 21 shows untreated particles. FIG. 22 shows particles treated with 8% by weight epoxy. FIG. 23 shows particles treated with 6% by weight epoxy.

Example 9

A storable pumpable suspension containing LiteProp 125 neutrally buoyant in a 11.2 ppg sodium bromide brine and containing 15 pounds per thousand gallons of carboxymethylhydroxyethylcellulose (CMHEC) was prepared by adding to 11.2 pounds of sodium bromide brine (prepared by adding 163.8 pounds of sodium bromide to 36.8 gallons of water), 0.63 lbs of CMHEC and stirring at room temperature. To the resulting mixture was added 630 pounds of LiteProp 125. The mixture was stirred at room temperature to obtain the pumpable slurry.

Example 10

A storable pumpable suspension containing LiteProp 175 neutrally buoyant in a 15.5 ppg calcium bromide/zinc bromide brine and containing 40 pounds per thousand gallons of CMHEC was prepared. A 15.5 ppg zinc bromide/calcium bromide brine solution was prepared by adding 26 weight percent of a 19.2 lb calcium bromide/zinc bromide mixture to 74 weight percent fresh water and stirring. To 260 gallons of the resulting brine solution was added 740 gallons of water, 40 lbs of CMHEC and 10,000 pounds of LiteProp 175 and stirring at room temperature. The mixture was stirred at room temperature to obtain the pumpable slurry.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims.

What is claimed is:

1. A method of hydraulic fracturing a subterranean formation which comprises the steps of:
    (a) formulating a storable aqueous suspension at a site remote from the site where hydraulic fracturing is to occur, the storable aqueous suspension comprising (1) an ultra lightweight (ULW) proppant having an apparent specific gravity less than or equal to 2.45, wherein the ULW proppant exhibits crush resistance at closure stresses greater than about 1500 psi at downhole in situ conditions and (2) a carrier fluid; wherein the ULW proppant is suspended in the carrier fluid, as a substantially neutrally buoyant particulate, to form the storable aqueous suspension, and further wherein the carrier fluid is either:
        (i.) a weighted carrier fluid, wherein the apparent specific gravity of the ULW proppant is no greater than 0.25 higher than the apparent specific gravity of the carrier fluid; or
        (ii.) a weakly gelled carrier fluid which contains either a friction reducing agent in an amount between from about 0 to about 10 pounds per thousand gallons of carrier fluid or has a viscosity of from about 1 to about 20 cps; or
        (iii.) a combination of (i.) and (ii.);
    (b) transferring the storable aqueous suspension of step (a) to the site where hydraulic fracturing is to occur and storing the suspension at the site until required for fracturing;
    (c) diluting the storable suspension of step (b) in-line to a desired concentration;
    (d) injecting the diluted storable aqueous suspension under pressure into the formation by pumping the diluted storable aqueous suspension through at least one pump at a pressure sufficient to initiate a fracture in the formation.

2. The method of claim 1, wherein the storable aqueous pumpable suspension of step (a) is formulated by mixing the ULW proppant and carrier fluid at room temperature.

3. The method of claim 1, wherein the ULW proppant exhibits crush resistance at closure stresses greater than about 2500 psi at downhole in situ conditions.

4. The method of claim 1, wherein the ULW proppant has an apparent specific gravity less than 2.35.

5. The method of claim 4, wherein the ULW proppant has an apparent specific gravity less than 2.25.

6. The method of claim 5, wherein the ULW proppant has an apparent specific gravity less than 2.00.

7. The method of claim 6, wherein the ULW proppant has an apparent specific gravity less than 1.75.

8. The method of claim 7, wherein the ULW proppant has an apparent specific gravity less than 1.25.

9. The method of claim 1, wherein the ULW proppant is a modified naturally occurring material resistant to deformation.

10. The method of claim 9, wherein the ULW proppant is selected from the group consisting of ground or crushed nut shells, ground or crushed seed shells, ground or crushed fruit pits, processed wood, or a mixture thereof.

11. The method of claim 10, wherein the ULW proppant is at least partially surrounded by at least one layer of a protective or hardening coating.

12. The method of claim 1, wherein the apparent specific gravity of the ULW proppant is no greater than 0.25 higher than the apparent specific gravity of the carrier fluid.

13. The method of claim 1, wherein the ULW proppant is an aggregate of an organic lightweight material and a weight modifying agent.

14. The method of claim 13, wherein the organic lightweight material is polymeric.

15. The method of claim 13, wherein at least 52% by volume of the aggregate is the weight modifying agent.

16. The method of claim 13, wherein the apparent specific gravity of the aggregate is at least one and a half times the apparent specific gravity of the organic lightweight material.

17. The method of claim 1, wherein the ULW proppant is an aggregate comprising, as the continuous phase, an organic lightweight material having an apparent specific gravity less than about 1.1 and, as the discontinuous phase, a weighting agent, wherein the apparent specific gravity of the aggregate is at least 1.25.

18. The method of claim 1, wherein the carrier fluid is weakly gelled.

19. The method of claim 1, wherein the carrier fluid further comprises at least one member selected from the group consisting of a gelling agent, crosslinking agent, gel breaker, surfactant, biocide, surface tension reducing agent, foaming agent, defoaming agent, demulsifier, non-emulsifier, scale inhibitor, gas hydrate inhibitor, polymer specific enzyme breaker, oxidative breaker, buffer, clay stabilizer, acid or a mixture thereof.

20. A method of fracturing a subterranean formation penetrated by a wellbore which comprises the steps of:
   (a) formulating at a location remote from where the fracturing is to occur a storable aqueous suspension comprising an ultra lightweight (ULW) proppant having an apparent specific gravity less than or equal to 2.45 suspended in a carrier fluid as a substantially neutrally buoyant particulate;
   (b) transferring the storable aqueous suspension to a storage unit to the site where the fracturing is to occur;
   (c) transferring the storable aqueous suspension of step (b) to at least one pump located above the wellhead at the site wherein the fracturing is to occur; and
   (d) transferring water from a water storage unit to said at least one pump located above the wellhead at the site where the fracturing is to occur such that the water from the water storage unit dilutes the storable aqueous suspension transferred to the at least one pump;
   (e) injecting the diluted storable aqueous suspension of step (d) under pressure into the formation by pumping the diluted storable aqueous suspension from the at least one pump above the wellhead into the formation, wherein said pressure is that sufficient to create a fracture in the formation.

21. The method of claim 20 wherein the carrier fluid is either:
   (i.) a weighted carrier fluid, wherein the apparent specific gravity of the ULW proppant is no greater than 0.25 higher than the apparent specific gravity of the carrier fluid; or
   (ii.) a weakly gelled carrier fluid which either contains a friction reducing agent in an amount between from about 0 to about 10 pounds per thousand gallons of carrier fluid or has a viscosity of from about 1 to about 20 cps; or
   (iii.) a combination of (i.) and (ii.).

22. The method of claim 20, wherein the storable aqueous pumpable suspension is pumped with the dilution fluid through a transfer pump into the at least one pump of step (d).

23. A method of fracturing a subterranean formation penetrated by a wellbore which comprises the steps of:
   (a) formulating at a remote location a storable aqueous pumpable suspension comprising an ultra lightweight (ULW) proppant having an apparent specific gravity less than or equal to 2.45 suspended in a carrier fluid as a substantially neutrally buoyant particulate;
   (b) transferring the storable aqueous pumpable suspension to a storage unit to the site where the fracturing is to occur;
   (c) diluting the storable aqueous pumpable suspension in-line by adding a dilution fluid to the storable aqueous pumpable suspension from the storage unit; and
   (d) injecting the diluted storable aqueous pumpable suspension under pressure into the formation by pumping the diluted storable aqueous pumpable suspension from at least one pump above the wellhead into the formation, wherein said pressure is that sufficient to create a fracture in the formation.

24. The method of claim 23, wherein the storable aqueous pumpable suspension is pumped with the dilution fluid through a transfer pump into the at least one pump of step (d).

25. The method of claim 23, wherein the storable aqueous pumpable suspension comprises at least one ultra lightweight (ULW) proppant suspended in either:
   (i.) a weighted carrier fluid, wherein the apparent specific gravity of the ULW proppant is no greater than 0.25 higher than the apparent specific gravity of the carrier fluid; or
   (ii.) a weakly gelled carrier fluid wherein either the weakly gelled carrier fluid contains a friction reducing agent in an amount between from about 0 to about 10 pounds per thousand gallons of carrier fluid or has a viscosity of from about 1 to about 20 cps; or
   (iii.) a combination of (i.) and (ii.).

\* \* \* \* \*